(12) United States Patent
Straitiff et al.

(10) Patent No.: US 10,143,983 B2
(45) Date of Patent: Dec. 4, 2018

(54) PASTE BASED LUBRICATING SYSTEM

(71) Applicant: Android Industries LLC, Auburn Hills, MI (US)

(72) Inventors: Donald Graham Straitiff, Howell, MI (US); Barry Allan Clark, Ortonville, MI (US); Lawrence J. Lawson, Troy, MI (US); Joshua James Hicks, Grand Blanc, MI (US); Robert Reece, Clarkston, MI (US); David Henry Larson, Swartz Creek, MI (US)

(73) Assignee: Android Industries LLC, Auburn Hills, MI (US)

( * ) Notice: Subject to any disclaimer, the term of this patent is extended or adjusted under 35 U.S.C. 154(b) by 249 days.

(21) Appl. No.: 15/046,221

(22) Filed: Feb. 17, 2016

(65) Prior Publication Data

US 2016/0158718 A1    Jun. 9, 2016

Related U.S. Application Data

(63) Continuation-in-part of application No. 14/297,347, filed on Jun. 5, 2014, now Pat. No. 9,821,615.
(Continued)

(51) Int. Cl.
*B01F 13/10* (2006.01)
*B60C 25/00* (2006.01)
(Continued)

(52) U.S. Cl.
CPC .............. *B01F 13/10* (2013.01); *B01F 7/22* (2013.01); *B01F 11/0094* (2013.01);
(Continued)

(58) Field of Classification Search
None
See application file for complete search history.

(56) References Cited

U.S. PATENT DOCUMENTS

| 3,893,655 A | 7/1975 | Sandiford |
| 4,212,339 A | 7/1980 | Dobson |

(Continued)

FOREIGN PATENT DOCUMENTS

| EP | 2108532 A1 | 10/2009 |
| WO | WO2005108849 | * 6/2004 |

OTHER PUBLICATIONS

Supplemental European Search Report for Application No. 14807582 dated Apr. 11, 2017.
(Continued)

*Primary Examiner* — Nathan T Leong
(74) *Attorney, Agent, or Firm* — Honigman Miller Schwartz and Cohn LLP

(57) ABSTRACT

A system includes a processing station and a lubricant supply system in fluid communication with the processing station. The processing station is operable to process at least one of a tire and a wheel prior to joining the tire and the wheel to form a tire-wheel assembly. The processing station includes at least one of a tire lubricating sub-station or a wheel lubricating sub-station. The lubricant supply system includes a storage container configured to store a lubricant and a whipping device received by the lubricant container and operable to whip or blend the lubricant from a semi-solid state to a whipped state. The lubricant supply system also includes a pump operable to pump the lubricant in the whipped state out of the storage container.

21 Claims, 24 Drawing Sheets

Related U.S. Application Data

(60) Provisional application No. 61/982,162, filed on Apr. 21, 2014, provisional application No. 61/859,641, filed on Jul. 29, 2013, provisional application No. 61/832,422, filed on Jun. 7, 2013.

(51) Int. Cl.
| | |
|---|---|
| *B01F 7/22* | (2006.01) |
| *B01F 11/00* | (2006.01) |
| *B01F 15/02* | (2006.01) |
| *B01F 15/06* | (2006.01) |
| *B01F 15/00* | (2006.01) |
| *B60C 25/05* | (2006.01) |
| *F16N 5/00* | (2006.01) |

(52) U.S. Cl.
CPC .... *B01F 15/00396* (2013.01); *B01F 15/0278* (2013.01); *B01F 15/065* (2013.01); *B60C 25/00* (2013.01); *B60C 25/0596* (2013.01); *F16N 5/00* (2013.01)

(56) References Cited

U.S. PATENT DOCUMENTS

| | | |
|---|---|---|
| 5,450,887 A | 9/1995 | Habay et al. |
| 6,575,269 B1* | 6/2003 | Skoff .................. 184/5.1 |
| 2002/0157470 A1 | 10/2002 | Noetzel et al. |
| 2003/0221761 A1 | 12/2003 | Cowart et al. |
| 2004/0218463 A1* | 11/2004 | Allen .................. 366/164.6 |
| 2008/0185086 A1 | 8/2008 | Ingram et al. |
| 2009/0283221 A1 | 11/2009 | Lawson |
| 2014/0360677 A1 | 12/2014 | Straitiff et al. |

OTHER PUBLICATIONS

International Search Report of PCT/US2014/041309 dated Dec. 8, 2015.
International Search Report of PCT/US2014/041309 dated Oct. 15, 2014.
International Search Report of PCT/US2017/017782 dated May 22, 2017.
Canadian Office Action for Canadian Application No. 2909475 dated Aug. 15, 2017.

\* cited by examiner

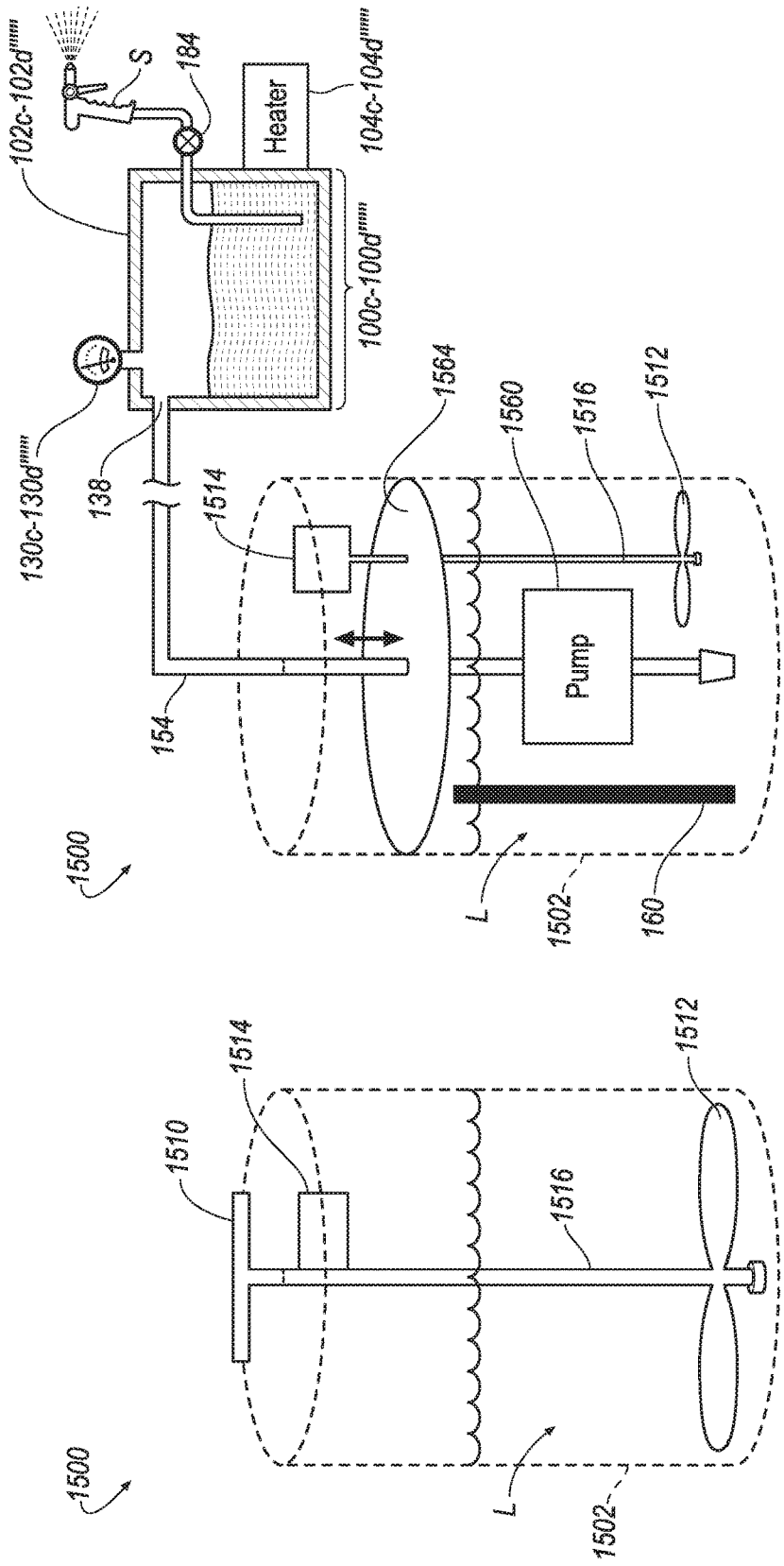

PASTE BASED LUBRICATING SYSTEM

CROSS-REFERENCE TO RELATED APPLICATIONS

This U.S. patent application is a continuation-in-part of U.S. application Ser. No. 14/297,347, filed on Jun. 5, 2014, which claims the benefit of U.S. Provisional Application 61/832,422, filed on Jun. 7, 2013, U.S. Provisional Application 61/859,641, filed on Jul. 29, 2013, and U.S. Provisional Application 61/982,162, filed on Apr. 21, 2014, the disclosures of which are considered part of the disclosure of this application and are hereby incorporated by reference in their entirety.

FIELD OF THE INVENTION

The disclosure relates to tire-wheel assemblies and to a system and method for assembling a tire-wheel assembly.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method for assembling a tire-wheel assembly.

BRIEF DESCRIPTION OF THE DRAWINGS

The disclosure will now be described, by way of example, with reference to the accompanying drawings, in which:

FIG. 2A' is an enlarged view of the lubricant according to line 2A' of FIG. 2A.

FIG. 2B' is an enlarged view of the lubricant according to line 2B' of FIG. 2B.

FIG. 6A' is a view of a wheel lubricating sub-station for lubricating an upper beat seat and a lower beat seat of a wheel in accordance with an exemplary embodiment of the invention.

FIG. 6B' is a view of a tire lubricating sub-station for lubricating an upper beat and a lower beat of a tire in accordance with an exemplary embodiment of the invention.

FIG. 7A' is a view of a wheel lubricating sub-station for lubricating an upper beat seat and a lower beat seat of a wheel in accordance with an exemplary embodiment of the invention.

FIG. 7B' is a view of a tire lubricating sub-station for lubricating an upper beat and a lower beat of a tire in accordance with an exemplary embodiment of the invention.

FIG. 10A' is a view of a wheel lubricating sub-station for lubricating an upper beat seat and a lower beat seat of a wheel in accordance with an exemplary embodiment of the invention.

FIG. 10B' is a view of a tire lubricating sub-station for lubricating an upper beat and a lower beat of a tire in accordance with an exemplary embodiment of the invention.

FIG. 11A' is a view of a wheel lubricating sub-station for lubricating an upper beat seat and a lower beat seat of a wheel in accordance with an exemplary embodiment of the invention.

FIG. 11B' is a view of a tire lubricating sub-station for lubricating an upper beat and a lower beat of a tire in accordance with an exemplary embodiment of the invention.

FIG. 18A is a view of a lubricant supply system including a storage container and a mixing device operable to mix a lubricant from a semi-solid state to a whipped state.

FIG. 18B is a view of a lubricant supply system including the storage container of FIG. 18A in fluid communication with a lubrication conditioning system.

SUMMARY

Figure 1A:
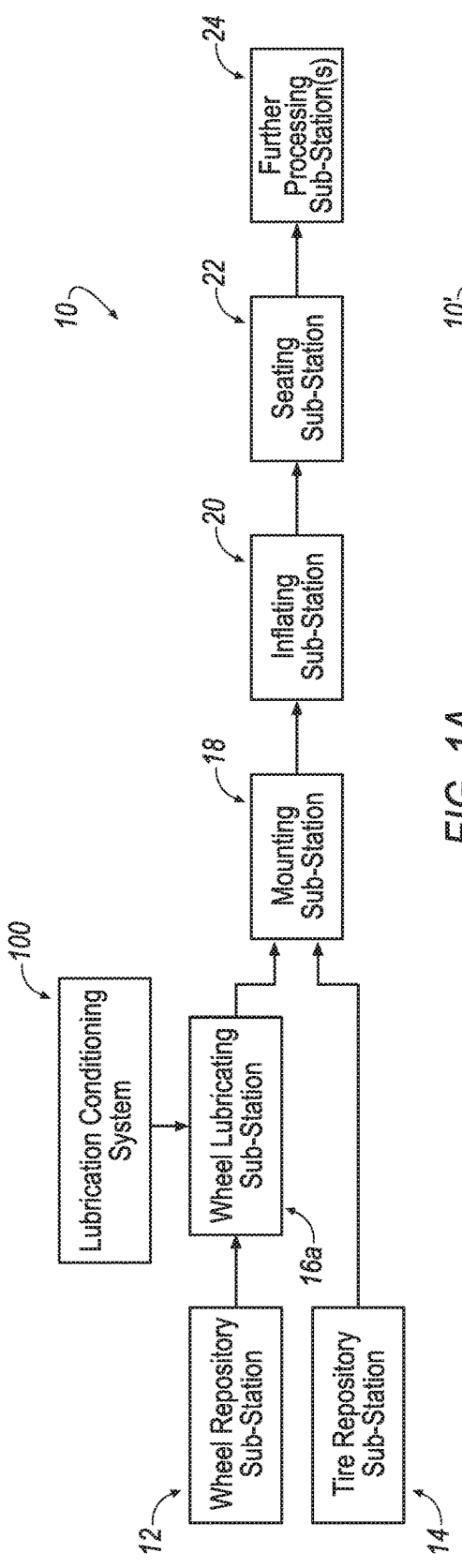
FIG. 1A is block diagram view of an apparatus for processing a tire and a wheel in accordance with an exemplary embodiment of the invention.
Figure 1B:
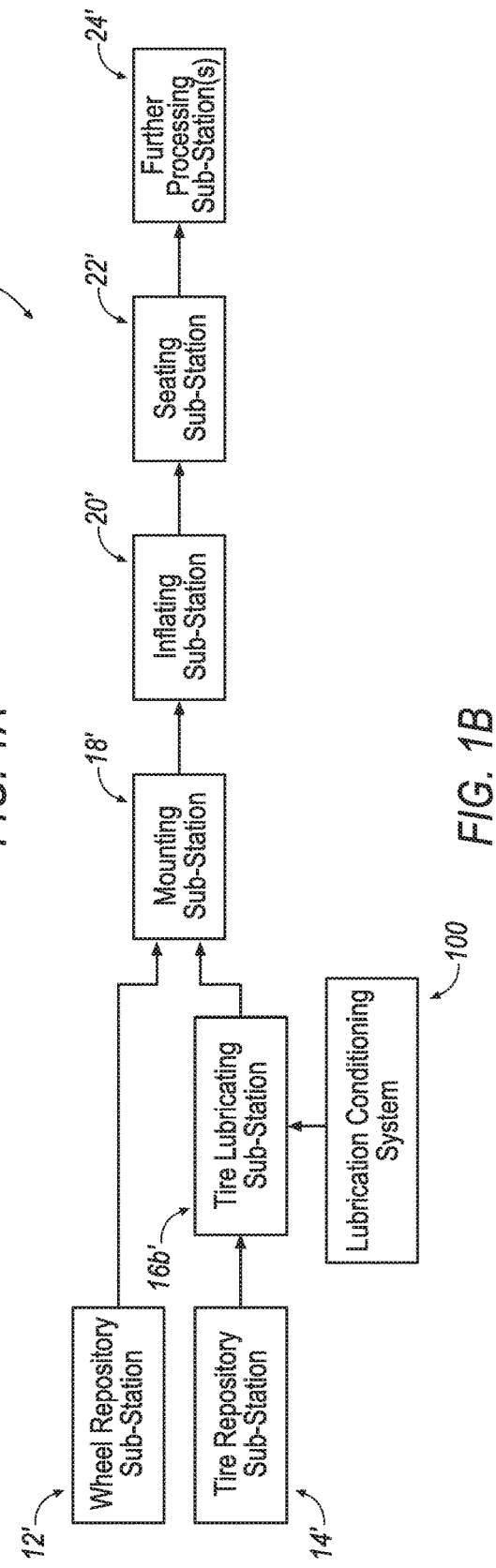
FIG. 1B is block diagram view of an apparatus for processing a tire and a wheel in accordance with an exemplary embodiment of the invention.
Figure 1C:
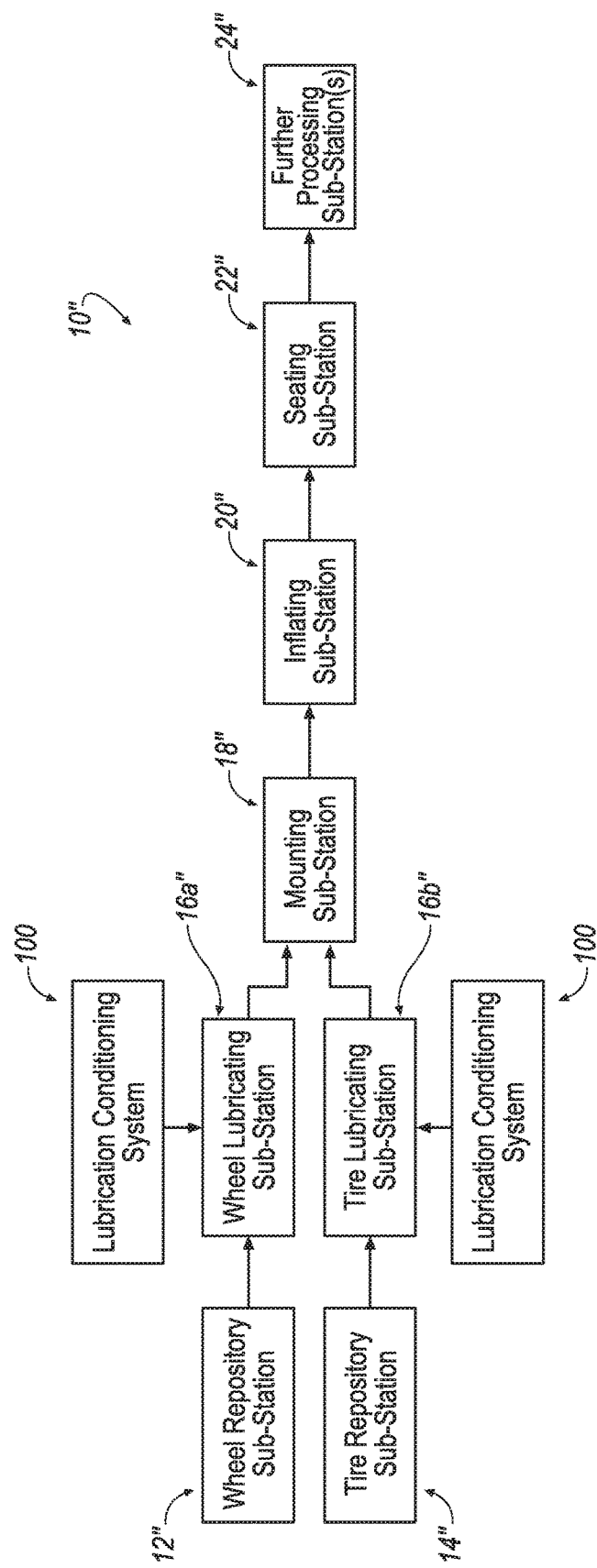
FIG. 1C is block diagram view of an apparatus for processing a tire and a wheel in accordance with an exemplary embodiment of the invention.

One aspect of the disclosure provides a processing station and a lubricant supply system in fluid communication with the processing station. The processing station is operable to process at least one of a tire and a wheel prior to joining the tire and the wheel to form a tire-wheel assembly. The processing station includes at least one of a tire lubricating sub-station or a wheel lubricating sub-station. The lubricant supply system includes a storage container configured to store a lubricant and a whipping device received by the lubricant container and operable to whip or blend the lubricant from a semi-solid state to a whipped state. The lubricant supply system also includes a pump operable to pump the lubricant in the whipped state out of the storage container.

In some implementations, the system also includes a lubrication conditioning system in fluid communication with the lubricant supply system and the processing station. In these implementations, the lubrication conditioning system includes a lubricant reservoir operable to receive the lubricant in the whipped state from the storage container; a lubricant temperature modifier arranged proximate to the lubricant reservoir; a lubricant temperature sensor arranged within the lubricant reservoir and operable to measure a temperature of the lubricant received within the lubricant reservoir; and a controller operatively coupled to the lubricant temperature modifier and the lubricant temperature sensor. The controller is operable to control the lubricant temperature modifier to change the temperature of the lubricant from a first temperature to a second temperature greater than the first temperature based on the temperature of the lubricant measured by the lubricant temperature sensor.

In some examples, pump of the lubricant supply system pumps the lubricant in the whipped state out of the storage container to the lubricant reservoir of the lubrication conditioning system when the lubricant is at the first temperature. The temperature may include an ambient temperature or a room temperature and the lubricant reservoir may define a smaller volume than a volume defined by the storage container. In some configurations, the lubrication conditioning system also includes a lubricant moving device arranged within the lubricant reservoir and operatively coupled to the controller, wherein the lubricant moving device is configured to transport the lubricant from the lubricant reservoir to the processing system when the lubricant is substantially equal to the second temperature.

In some implementations, the whipping device includes an impeller attached to a first end of a shaft inserted into the storage container in contact with the lubricant and a motor attached to a second end of the shaft and mechanically coupled to the impeller. In these implementations, the motor is configured to drive the impeller causing it to rotate around the shaft to whip or blend the lubricant into the whipped state.

In some implementations, the whipping device includes a shaking apparatus configured to retain and support the storage container, the shaking apparatus operative to undergo vibratory or shaking motions to whip or blend the lubricant into the shipped state.

In some implementations, the whipping device includes at least one of mechanical agitators, blenders, stirrers, ultrasonic devices, or air bubblers suitable for whipping or blending the lubricant into the whipped state.

In some configurations, the pump of the lubricant supply system includes a piston-type pump driven by an engine or a motor. In some implementations the storage container includes a cylindrical drum. In these implementations, the pump of the lubricant supply system includes a circumferential disc received within the storage container upon a top surface of the lubricant, wherein the circumferential disc operable to translate relative to the storage container to pump the lubricant out of the storage container via a lubricant supply conduit. In some examples, the circumferential disc includes a diameter operative to create a fluid-tight seal with inner circumferential surfaces of the storage container.

Another aspect of the disclosure provides a method for pre-whipping a lubricant. The method includes inserting a whipping device into a storage container containing a quantity of lubricant; controlling the whipping device to whip or blend the lubricant from a semi-solid state to a whipped state; and pumping out a portion of the quantity of lubricant into the whipped state from the storage container using a pump. The pump is inserted into the storage container and in fluid communication with the quantity of lubricant. The method also includes providing the lubricant to a processing station operable to process at least one of a tire and a wheel prior to joining the tire and the wheel to form a tire-wheel assembly. The processing station includes at least one of a tire lubricating sub-station or a wheel lubricating sub-station.

In some implementations, the method also includes, prior to providing the lubricant to the processing station, providing the pumped out portion of the quantity of lubricant in the whipped state to a lubricant reservoir. In these implementations, the lubricant reservoir is operable to increase the temperature of the lubricant from a first temperature to a second temperature greater than the first temperature using a lubricant temperature modifier disposed within the lubricant reservoir, and provide the lubricant to the processing system. In some examples, pumping out the portion of the quantity of lubricant in the whipped state includes pumping out the portion of the quantity of lubricant in the whipped state from the storage container to the lubricant reservoir when the lubricant is at the first temperature. Additionally, the lubricant reservoir may define a smaller volume than a volume defined by the storage container.

In some implementations, the whipping device includes an impeller attached to a first end of a shaft inserted into the storage container in contact with the lubricant and a motor attached to a second end of the shaft and mechanically coupled to the impeller. In these implementations, the motor is configured to drive the impeller causing it to rotate around the shaft to whip or blend the lubricant into the whipped state.

In some implementations, the whipping device includes at least one of mechanical agitators, blenders, stirrers, a shaking device, ultrasonic devices, or air bubblers suitable for whipping or blending the lubricant into the whipped state.

In some examples, the pumping out the portion of the quantity of lubricant in the whipped state includes translating a circumferential disc associated with the pump and inserted into the storage container on top of the quantity of lubricant in the whipped state. The translating circumferential disc causes the portion of the quantity of lubricant in the whipped state to flow out of the storage container via a lubricant supply conduit.

DETAILED DESCRIPTION OF THE INVENTION

The Figures illustrate exemplary embodiments of apparatuses and methods for assembling a tire-wheel assembly. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 16A-16D, which illustrates an exemplary tire, T. In the present disclosure, reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure that supports the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 16A), a lower sidewall surface, $T_{SL}$ (see, e.g., FIG. 16D), and a tread surface, $T_T$ (see, e.g., FIGS. 16B-16C), that joins the upper sidewall surface, $T_{SU}$, to the lower sidewall surface, $T_{SL}$. Referring to FIG. 16B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$.

As seen in FIG. 16B, when the tire, T, is in a relaxed, unbiased state, the upper bead, $T_{BU}$, forms a circular, upper tire opening, $T_{OU}$; similarly, when the tire, T, is in a relaxed, unbiased state, the lower bead, $T_{BL}$, forms a circular, lower tire opening, $T_{OL}$. It will be appreciated that when an external force is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include an oval shape.

Referring to FIG. 16B, when in the relaxed, unbiased state, each of the upper tire opening, $T_{OU}$, and the lower tire opening, $T_{OL}$, form, respectively, an upper tire opening diameter, $T_{OU-D}$, and a lower tire opening diameter, $T_{OL-D}$. Further, as seen in FIGS. 16A-16B, when in the relaxed, unbiased state, the upper sidewall surface, $T_{SU}$, and the lower sidewall surface, $T_{SL}$, define the tire, T, to include a tire diameter, $T_D$.

Figure 16A:
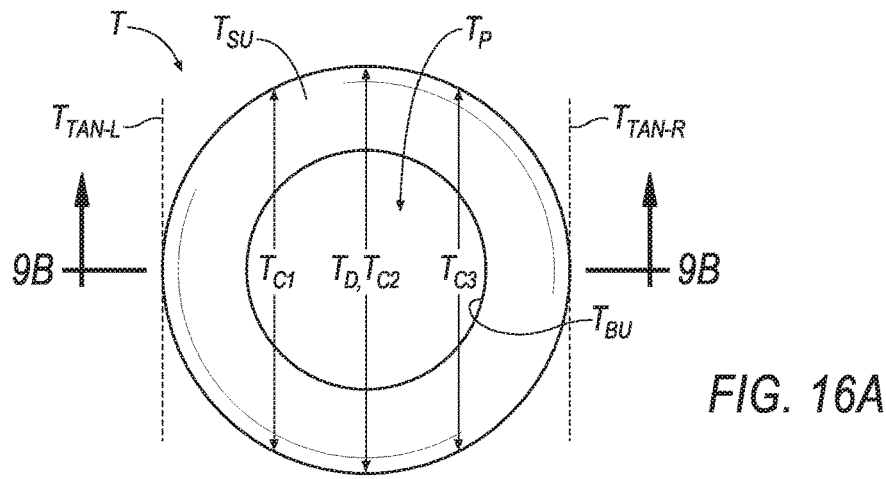
FIG. 16A is a top view of an exemplary tire.
Figure 16B:
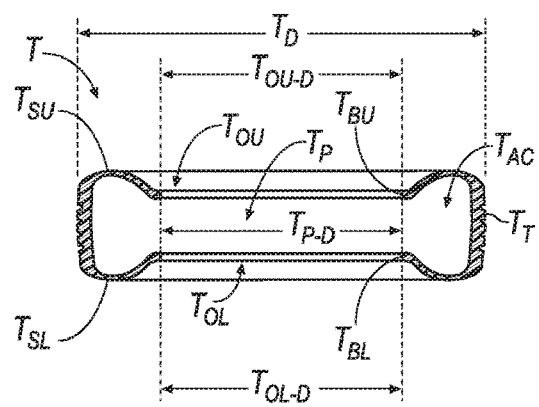
FIG. 16B is a cross-sectional view of the tire according to line 16B-16B of FIG. 16A.
Figure 16C:
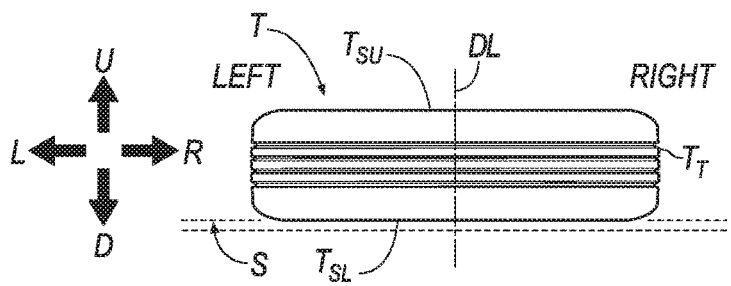
FIG. 16C is a side view of the tire of FIG. 16A.
Figure 16D:
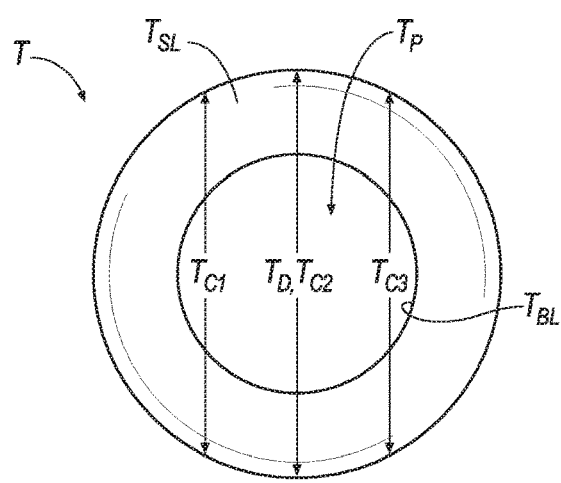
FIG. 16D is a bottom view of the tire of FIG. 16A.

Referring to FIGS. 16A-16B and 16D, the tire, T, also includes a passage, $T_P$. Access to the passage, $T_P$, is permitted by either of the upper tire opening, $T_{OU}$, and the lower tire opening, $T_{OL}$. Referring to FIG. 16B, when the tire, T, is in a relaxed, unbiased state, the upper tire opening, $T_{OU}$, and the lower tire opening, $T_{OL}$, define the passage, $T_P$, to include a diameter, $T_{P-D}$. Referring also to FIG. 16B, the tire, T, includes a circumferential air cavity, $T_{AC}$, that is in communication with the passage, $T_P$. After joining the tire, T, to a wheel, W, pressurized air is deposited into the circumferential air cavity, $T_{AC}$, for inflating the tire, T.

When the tire, T, is arranged adjacent structure or a wheel, W (see, e.g., FIGS. 17A-17B), as described in the following disclosure, the written description may reference a "left" portion or a "right" portion of the tire, T. Referring to FIG. 16C, the tire, T, is shown relative to a support member, S; the support member, S, is provided (and shown in phantom) in order to establish a frame of reference for the "left" portion and the "right" portion of the tire, T. In FIG. 16C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center dividing line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 16A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C2}$,/tire diameter, $T_D$.

In order to reference the location of the left chord, $T_{C1}$, and the right chord, $T_{C3}$, reference is made to a left tire tangent line, $T_{TAN-L}$, and a right tire tangent line, $T_{TAN-R}$. The left chord, $T_{C1}$, is spaced apart approximately one-fourth (¼) of the tire diameter, $T_D$, from the left tire tangent line, $T_{TAN-L}$. The right chord, $T_{C3}$, is spaced apart approximately one-fourth (¼) of the tire diameter, $T_D$, from the right tire tangent line, $T_{TAN-R}$. Each of the left and right tire chords, $T_{C1}$, $T_{C3}$, may be spaced apart about one-fourth (¼) of the tire diameter, $T_D$, from the central chord, $T_{C2}$. The above spacings referenced from the tire diameter, $T_D$, are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 16C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Figure 17A:
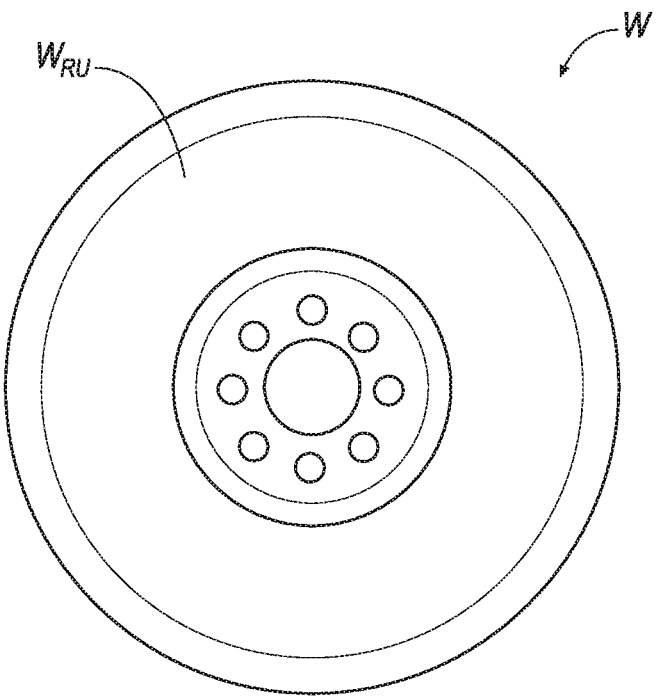
FIG. 17A is a top view of an exemplary wheel.
Figure 17B:
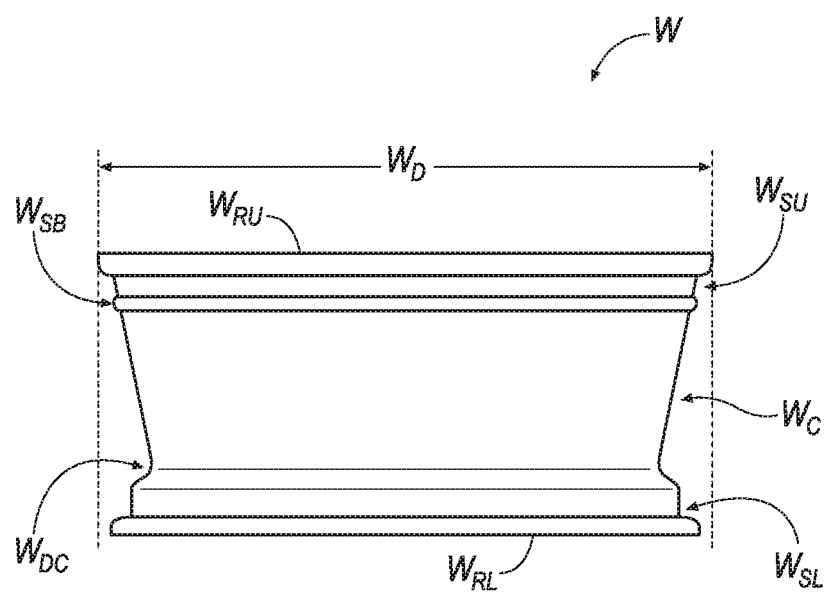
FIG. 17B is a side view of the wheel of FIG. 17A.

Prior to describing embodiments of the invention, reference is made to FIGS. 17A-17B, which illustrate an exemplary wheel, W. In the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure that supports the wheel, W. Accordingly, the above nomenclature should not be utilized to limit the scope of the claimed invention and is utilized herein for exemplary purposes in describing an embodiment of the invention.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 17B, the upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be frictionally-secured to the wheel, W, as a result of the wheel diameter, $W_D$, being approximately the same as, but slightly greater than the diameter, $T_{P-D}$, of the passage, $T_P$, of the tire, T.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, $W_{RL}$. Upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$.

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead (not shown); however, upper and/or lower safety beads may be included with the wheel, W, as desired, and are not required in order to practice the invention described in the following disclosure.

Referring to FIGS. 1A, 1B, 1C and 15, embodiments of single cell workstations 10, 10' and 10" for processing a tire-wheel assembly, TW (as seen in, e.g., FIG. 15), are shown. The single cell workstations 10, 10', 10" each include a plurality of processing sub-stations 12-24, 12'-24', 12"-24". The "processing" conducted by each processing sub-station 12-24, 12'-24', 12"-24" may contribute to the act of "joining" or "mounting" a tire, T, to a wheel, W, for forming the tire-wheel assembly, TW. The act of "joining" or "mounting" may mean to physically couple, connect or marry the tire, T, and wheel, W, such that the wheel, W, may be referred to as a male portion that is inserted into the passage, $T_P$, of a tire, T, being a female portion.

The plurality of processing sub-stations 12-24, 12'-24', 12"-24" of the single-cell workstation 10, 10', 10" may include, for example: a wheel repository sub-station 12, 12', 12", a tire repository sub-station 14, 14', 14", a wheel lubricating sub-station 16a, 16a", a tire lubricating sub-station 16b', 16b", a mounting sub-station 18, 18', 18", an inflating sub-station 20, 20', 20", a seating sub-station 22, 22', 22" or the like. If desired, the single cell workstation 10, 10', 10" may include other sub-stations 24, 24', 24" for further processing the tire-wheel assembly, TW. The one or more further processing sub-stations 24, 24', 24" may include, for example, a balancing sub-station, a weight apply sub-station, a stemming sub-station, a match-marking sub-station or the like.

Figure 15:
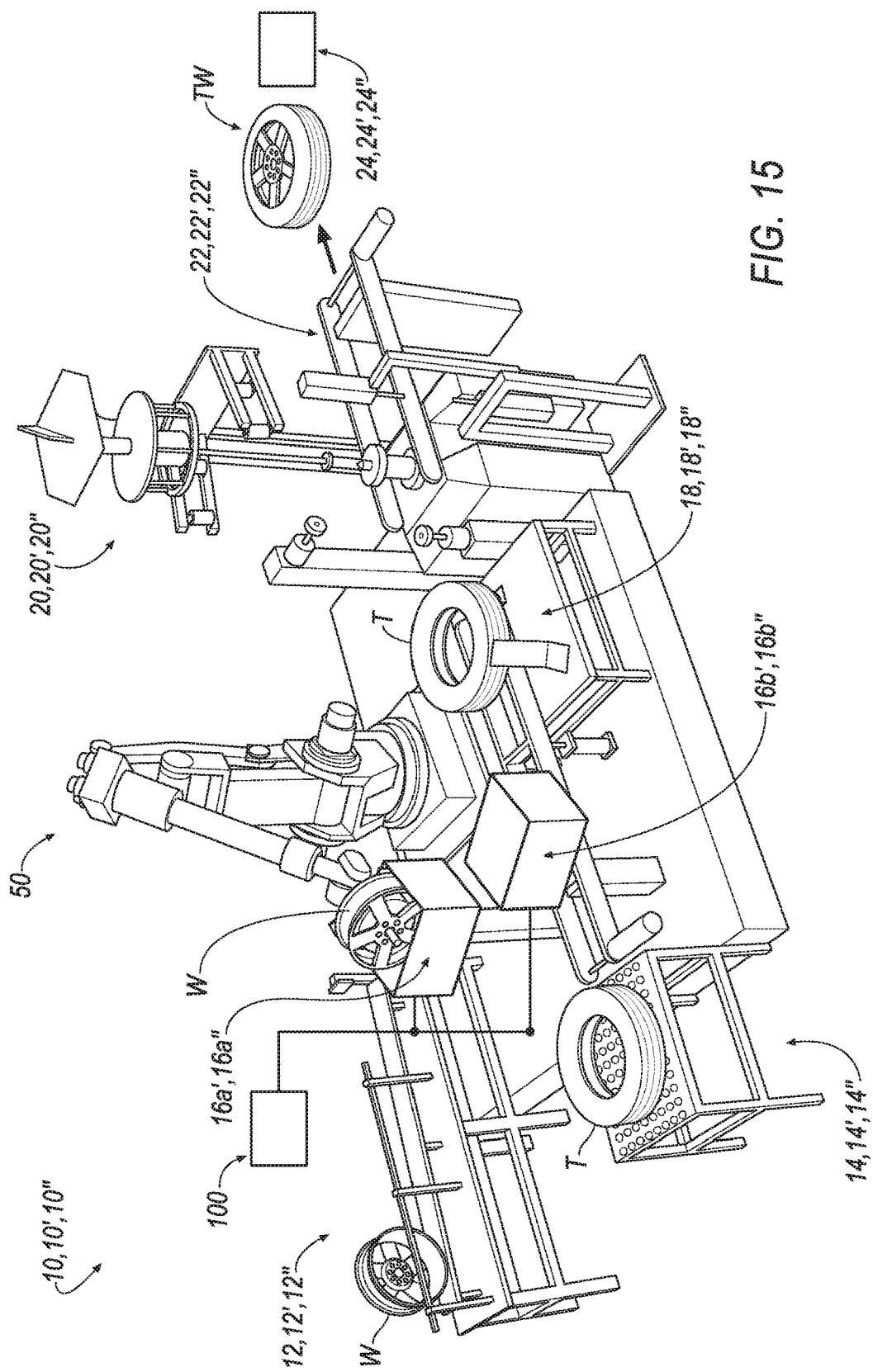
FIG. 15 illustrates a view of an apparatus for processing a tire-wheel assembly in accordance with an exemplary embodiment of the invention.

The term "single-cell" indicates that the sub-stations contribute to the production of a tire-wheel assembly, TW, without requiring a plurality of successive, discrete workstations that may otherwise be arranged in a conventional assembly line such that a partially-assembled tire-wheel assembly, TW, is "handed-off" along the assembly line (i.e., "handed-off" meaning that an assembly line requires a partially-assembled tire-wheel assembly, TW, to be retained by a first workstation of an assembly line, worked on, and released to a subsequent workstation in the assembly line for further processing). Rather, a single cell workstation provides one workstation having a plurality of sub-stations each performing a specific task in the process of assembling a tire-wheel assembly, TW. This assembling process takes place wherein the tire and/or wheel "handing-off" is either minimized or completely eliminated. As such, a single-cell workstation significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation is employed in the manufacture of tire-wheel assemblies, TW. Referring to FIG. 15, in an example, the minimization or elimination of "handing-off" the tire, T, and/or wheel, W, may result from the inclusion of a robotic arm 50 that may be located in a substantially central position relative to the plurality of sub-stations 12-24, 12'-24', 12"-24"; the robotic arm 50 may be directly or indirectly interfaced with one or both of the wheel, W, and the tire, T, during the process of assembling the tire-wheel assembly, TW.

One aspect of the invention is a lubrication conditioning system, which is shown generally at 100 in FIGS. 1A, 1B, 1C and 15. Any of the lubrication conditioning systems 100a, 100a', 100b, 100b', 100b", 100b''', 100b'''', 100b''''', 100b'''''', 100c, 100c', 100d, 100d', 100d'', 100d''', 100d'''', 100d''''', 100d'''''' shown and described at FIGS. 4A-9G may be arranged at the location of the lubrication conditioning system 100 of FIGS. 1A, 1B, 1C and 15 such that any of the lubrication conditioning systems 100a, 100a', 100b, 100b', 100b", 100b''', 100b'''', 100b''''', 100b'''''', 100c, 100c', 100d, 100d', 100d'', 100d''', 100d'''', 100d''''', 100d'''''' may be fluidly-connected to one or more of the wheel lubricating sub-station 16a, 16a" and a tire lubricating sub-station 16b', 16b" of the single cell workstations 10, 10', 10". Functionally, the lubrication conditioning system 100 permits an operator of the single cell workstation 10, 10', 10" to manually or automatically selectively adjust the temperature of a lubricant, L (see, e.g., FIGS. 2A-2B and 3A-3B), that is supplied to the wheel lubricating sub-station 16a, 16a" and/or the tire lubricating sub-station 16b', 16b".

Figure 2A:
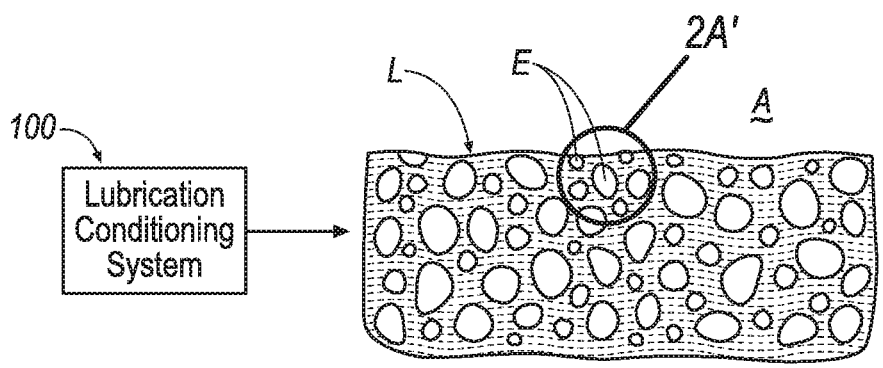
FIG. 2A is a view of a lubrication conditioning system and a lubricant arranged in a first state of matter.
Figure 2B:
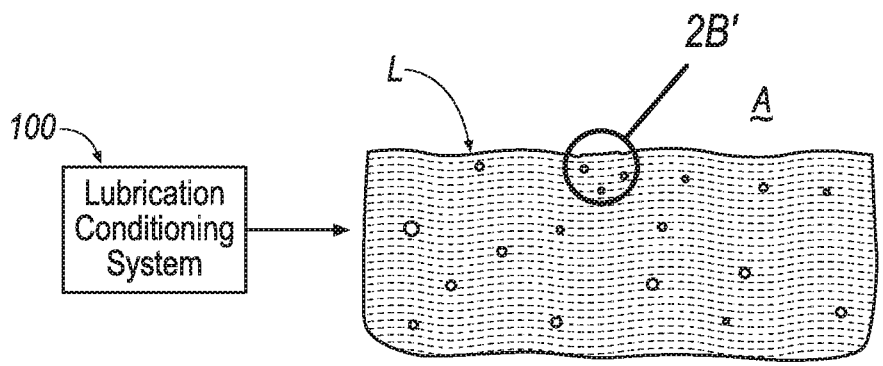
FIG. 2B is a view of the lubrication conditioning system and the lubricant of FIG. 2A arranged in a second state of matter that is different from the first state of matter after actuating the lubrication conditioning system.
Figure 2A:
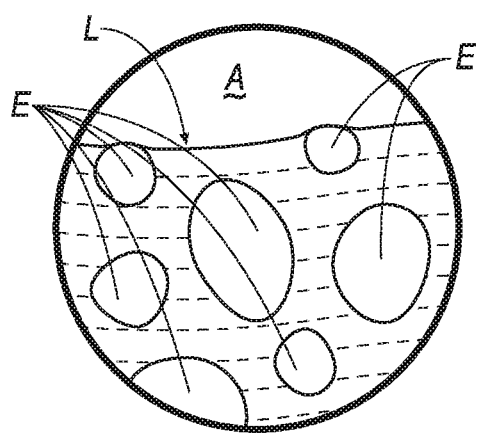
Figure 2B:
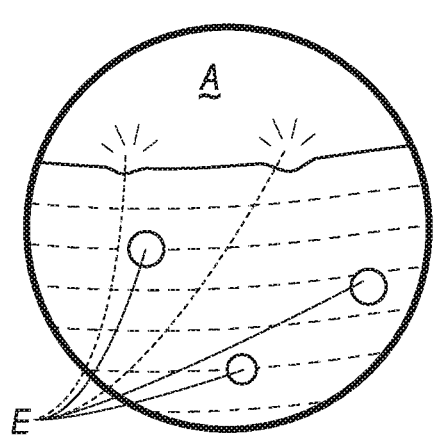

Selective adjustment of the temperature of the lubricant, L, realizes several benefits for the purpose of joining the tire, T, to the wheel, W, as performed by the single cell workstation 10, 10', 10". Referring to FIGS. 2A-2B, in a first example, selective adjustment of the temperature of the lubricant, L, by the lubrication conditioning system 100 permits a change of viscosity of the lubricant, L, from a higher viscosity (see, e.g., FIGS. 2A, 2A') to a lower viscosity (see, e.g., FIGS. 2B, 2B'). Accordingly, if a lubricant, L, having a high viscosity (as seen in, e.g., FIGS. 2A, 2A') at a first temperature (e.g., "room temperature"/"ambient temperature") is selected for use in the operation of the single cell workstation 10, 10', 10", a change of (e.g., an increase of) the temperature of the lubricant, L, to a second temperature (e.g., a temperature that is greater than "room temperature"/"ambient temperature") may reduce the viscosity (as seen in, e.g., FIGS. 2B, 2B') of the lubricant, L, and, as a result, the change of the temperature of the lubricant, L, from the first temperature to the second temperature may permit, for example, air bubble entrapments, E (see, e.g., FIGS. 2A', 2B'), within the lubricant, L, to more easily escape the lubricant, L, to atmosphere, A (as seen in FIG. 2B'), prior to the lubricant, L, being applied to one or more of the tire, T, and the wheel, W, at one or more of the wheel lubricating sub-station 16a, 16a", a tire lubricating sub-station 16b', 16b". Therefore, by decreasing the viscosity of the lubricant, L, for the purpose of reducing the number/amount of air bubble entrapments, E, within the lubricant, L, improvements in the seating of the beads $T_{BU}$, $T_{BL}$, of the tire, T, directly adjacent the bead seats $W_{SU}$, $W_{SL}$ of the wheel, W, may be realized due to the lack of air bubble entrapments, E, otherwise being interveningly-arranged between the beads $T_{BU}$, $T_{BL}$, of the tire, T, and the bead seats $W_{SU}$, $W_{SL}$ of the wheel, W, after the tire, T, is joined to the wheel, W (i.e., if air bubble entrapments, E, were to be interveningly-arranged between the beads $T_{BU}$, $T_{BL}$, of the tire, T, and the bead seat $W_{SU}$, $W_{SL}$ of the wheel, W, the beads $T_{BU}$, $T_{BL}$, of the tire, T, may be inhibited from being seated directly adjacent the bead seats $W_{SU}$, $W_{SL}$ of the wheel, W, which may impair the joining of the tire, T, to the wheel, W, for forming the tire-wheel assembly, TW).

Figure 3A:
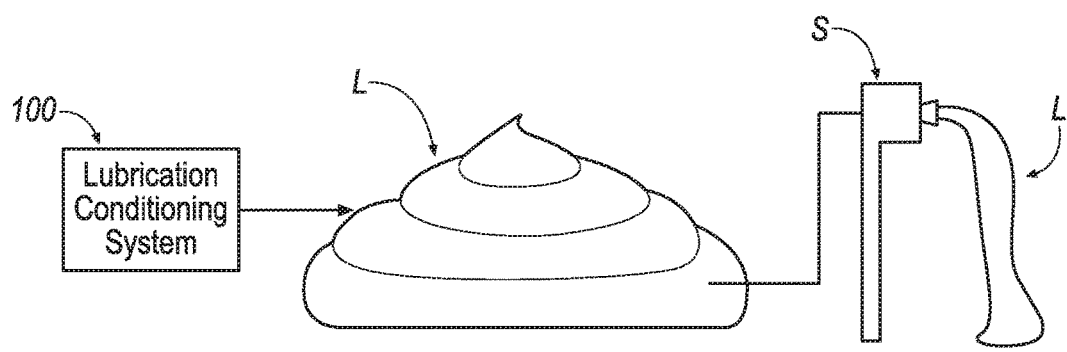
FIG. 3A is a view of a lubrication conditioning system and a lubricant arranged in a first state of matter.
Figure 3B:
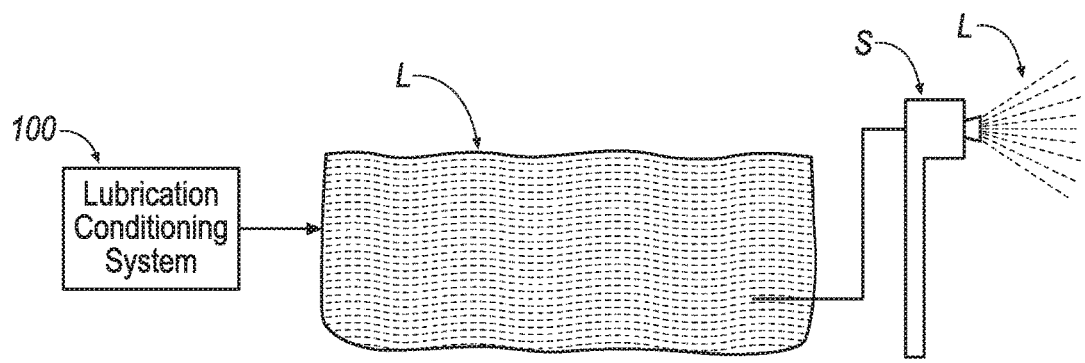
FIG. 3B is a view of the lubrication conditioning system and the lubricant of FIG. 3A arranged in a second state of matter that is different from the first state of matter after actuating the lubrication conditioning system.

Referring to FIGS. 3A-3B, in another example, selective adjustment of the temperature of the lubricant, L, by the lubrication conditioning system 100 may permit a phase transition of the lubricant, L (e.g., a change from a substantially semi-solid lubricant, L, state of matter to a substantially liquid lubricant, L, state of matter). In an example, as seen in FIG. 3A, if the lubricant, L, is in a substantially semi-solid (e.g., "paste") state of matter at a first temperature (e.g., "room temperature"/"ambient temperature") that may not be suitable for a particular depositing (e.g., "spraying") application upon one or more of the tire, T, and the wheel, W, at one or more of the wheel lubricating sub-station 16a, 16a", a tire lubricating sub-station 16b', 16b", a selective change of (e.g., an increase of) the temperature of the substantially semi-solid (e.g., "paste") state of the lubricant, L, by the lubrication conditioning system 100 from the first temperature (e.g., "room temperature"/"ambient temperature") to a second temperature (e.g., a temperature that is greater than "room temperature"/"ambient temperature") may permit the substantially semi-solid (e.g., "paste") state of the lubricant, L, to change from a substantially semi-solid state (as seen in, e.g., FIG. 3A) to a substantially liquid state (as seen in, e.g., FIG. 3B) that is more suitable for being ejected from an applicator, S (e.g., a spray nozzle), of a particular depositing (e.g., "spraying") application upon one or more of the tire, T, and the wheel, W, at one or more of the wheel lubricating sub-station 16a, 16a", a tire lubricating sub-station 16b', 16b". Therefore, by permitting a phase transition of the lubricant, L, to occur, one or more of the wheel lubricating sub-station 16a, 16a" and the tire lubricating sub-station 16b', 16b" that is tooled for spraying lubricant, L, from a spray nozzle, S, may not be limited to a particular (e.g., liquid state of matter) lubricant, L, that is arranged in at a first temperature (e.g., "room temperature"/"ambient temperature")); accordingly, by permitting a phase transition of the lubricant, L, to occur as a result of inclusion of the lubrication condition system 100, lubricants, L, having, for example, a non-liquid state of matter (such as, e.g., a semi-solid paste lubricant) at the first temperature (e.g., "room temperature"/"ambient temperature") may be utilized by one or more of the wheel lubricating sub-station 16a, 16a" and the tire lubricating sub-station 16b', 16b" that is tooled for spraying lubricant, L.

Although two benefits realized by the inclusion of the lubrication conditioning system 100 are described above, the lubrication conditioning system 100 may also provide other benefits not described in this disclosure. Further, although the two benefits are described separately above, both of the benefits may be concurrently realized (i.e., if a selected lubricant, L, is in a semi-solid paste form, the selective change of (e.g., an increase of) the temperature of the semi-solid paste-form lubricant, L, may permit the above-described phase transition to occur while also changing the viscosity, which may thereby also permit air bubble entrapments, E, within the paste-form lubricant, L, to more easily escape to atmosphere, A. Yet even further, it will be appreciated that the lubrication conditioning system 100 permits many types of lubricants, L, to be utilized by one or more of the wheel lubricating sub-station 16a, 16a", a tire lubricating sub-station 16b', 16b"; for example, lubricants, L, utilized by one or more of the wheel lubricating sub-station 16a, 16a" and the tire lubricating sub-station 16b', 16b" may include, but is not limited to: substantially semi-solid paste lubricants, substantially semi-solid petroleum-based lubricants, substantially liquid water-soap lubricants, or the like.

As seen in FIGS. 4A-4B, 5A-5G, 8A-8B and 9A-9G, embodiments of lubrication conditioning systems 100a-100a', 100b-100b'''', 100c-100c' and 100d-100d'''' are described. The lubrication conditioning systems 100a-100a' and 100c-100c' of FIGS. 4A-4B and 8A-8B function by directly increasing the temperature of the lubricant, L; the lubrication conditioning systems 100b-100b'''' and 100d-100d'''' of FIGS. 5A-5G and 9A-9G function as heat exchangers by indirectly increasing the temperature of the lubricant, L. In some instances, the lubrication conditioning systems 100a-100d'''' raise the temperature of the lubricant, L, between about 130° F. to 145° F. Any of the lubrication conditioning systems 100a-100a', 100b-100b'''', 100c-100c' and 100d-100d'''' seen in FIGS. 4A-4B, 5A-5G, 8A-8B and 9A-9G may be interchangeably-arranged at the location of the lubrication conditioning system 100 described at FIGS. 1A, 1B, 1C and 15 to thereby be fluidly-connected to one or more of the wheel lubricating sub-station 16a, 16a" and the tire lubricating sub-station 16b', 16b" for the purpose of depositing lubricant, L, upon one or more of at least the beads $T_{BU}$, $T_{BL}$, of the tire, T, and the bead seats $W_{SU}$, $W_{SL}$ of the wheel, W.

Figure 4A:
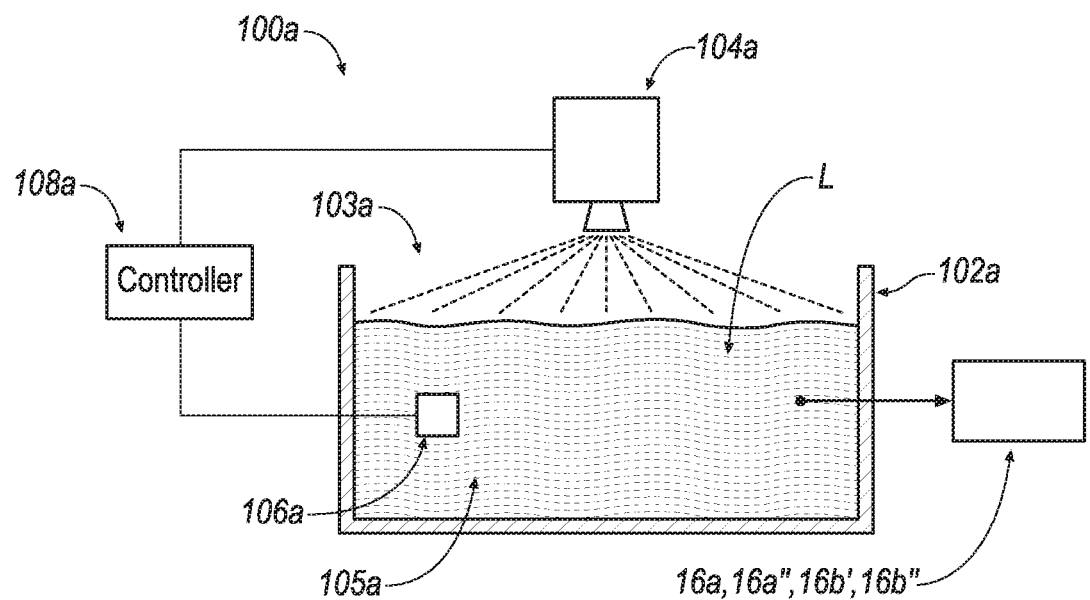
FIG. 4A is a view of a lubrication temperature control system for directly heating a lubricant contained by a lubricant reservoir in accordance with an exemplary embodiment of the invention.

Referring to FIG. 4A, a lubrication conditioning system 100a is shown according to an embodiment of the invention. As described above, the lubrication conditioning system 100a directly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100a includes a lubricant reservoir 102a, a lubricant temperature modifier 104a, a lubricant temperature sensor 106a and a controller 108a. The lubricant reservoir 102a contains the lubricant, L. The lubricant temperature modifier 104a is arranged relative to (e.g., over) an opening 103a formed by the lubricant reservoir 102a in order to permit the lubricant temperature modifier 104a to directly communicate with the lubricant, L. The lubricant temperature sensor 106a may be arranged within a cavity 105a formed by the lubricant reservoir 102a and submerged within the lubricant, L, for detecting a temperature of the lubricant, L. The controller 108a may be communicatively coupled to the lubricant temperature modifier 104a and the lubricant temperature sensor 106a for receiving temperature readings from the lubricant temperature sensor 106a in order to de/actuate the lubricant temperature modifier 104a for the purpose of maintaining, increasing or decreasing the temperature of the lubricant, L.

In an implementation, the lubricant temperature modifier 104a may be a light source that emits light defined by a wavelength. The light source 104a may be any desirable light source, such as, for example, an incandescent light source, an infrared light source, a laser light source, or the like. The light emitted from the light source 104a passes through the opening 103a formed by the lubricant reservoir 102a in order to permit the light from the light source 104a to directly impacts upon/enters the lubricant, L; once the light impacts/enters the lubricant, L, the light may directly heat the lubricant, L, thereby raising the temperature of the lubrication from a first temperature (e.g., "room temperature"/"ambient temperature") to a second temperature (e.g., a temperature that is greater than "room temperature"/"ambient temperature").

In an example, the controller 108a may include a manually-operated on/off switch to permit manual on/off switching of the light source 104a. The controller 108a may also include a display that displays the temperature of the lubricant, L, that is determined by the lubricant temperature sensor 106a; the temperature of the lubricant, L, may be communicated in the form of a signal that is sent from the from the lubricant temperature sensor 106a to the controller 108a. Accordingly, if an operator of the of lubrication conditioning systems 100a is aware of the type of lubricant, L, arranged within the lubricant reservoir 102a, and, if the operator of the lubrication conditioning system 100a is aware of a desired second temperature (e.g., a temperature that is greater than "room temperature"/"ambient temperature") that the lubricant, L, should be arranged at, the operator may de/actuate the on/off switch provided by the controller 108a in order to manually maintain control over the temperature of the lubricant, L.

In another example, the controller 108a may include logic that permits automatic control over the lubrication conditioning system 100a. In an example, a processor provided by the controller 108a may be programmed with a desired second temperature (e.g., a temperature that is greater than "room temperature"/"ambient temperature") of the lubricant, L. After actuating the lubrication conditioning system 100a, the temperature of the lubricant, L, may be communicated in the form of a signal that is sent from the from the lubricant temperature sensor 106a to the controller 108a. Accordingly, the controller 108a may maintain the light source 104a in an 'on state' until the temperature of the lubricant, L, has been increased to the second temperature; upon reaching the lubricant, L, reaching the second temperature, the controller 108a may automatically switch the light source 104a to an 'off state.'

Further, in an embodiment, automatic control over the lubrication conditioning system 100a may be executed by providing the controller 108a with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108a may be provided with a user interface that permits an operator to inform the controller 108a which type of lubricant, L, is deposited into the lubricant reservoir 102a. Once the operator informs the controller 108a which type of lubricant, L, is deposited into the lubricant reservoir 102a, the controller 108a will refer to the data lookup table and automatically select the desired second temperature (e.g., a temperature that is greater than "room temperature"/"ambient temperature") associated with the lubricant, L, that was entered/selected by the operator at the user interface of the controller 108a. Accordingly, upon the operator actuating the lubrication conditioning system, the light source 104a will remain in the 'on state' until the temperature of the lubricant, L, has been adjusted to the temperature associated with the lubricant, L, in the data lookup table.

Figure 4B:
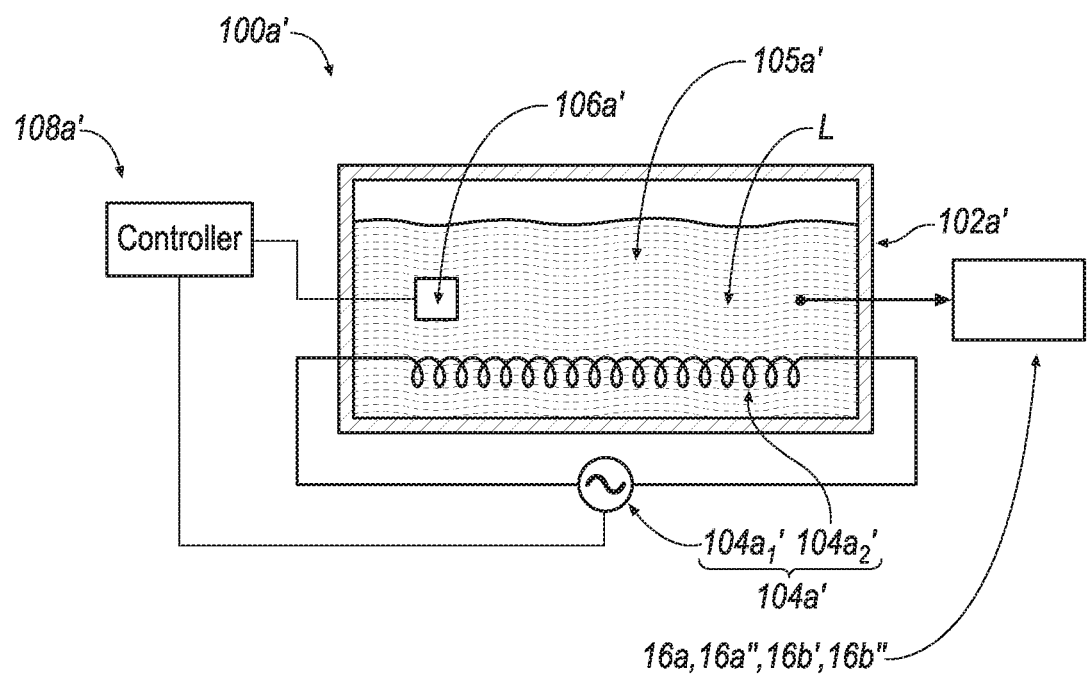
FIG. 4B is a view of a lubrication temperature control system for directly heating a lubricant contained by a lubricant reservoir in accordance with an exemplary embodiment of the invention.

Referring to FIG. 4B, a lubrication conditioning system 100a' is shown according to an embodiment of the invention. As described above, the lubrication conditioning system 100a' directly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100a' includes a lubricant reservoir 102a', a lubricant temperature modifier 104a', a lubricant temperature sensor 106a' and a controller 108a'. The lubricant reservoir 102a' contains the lubricant, L. At least a portion (see, e.g., $104a_2$') of the lubricant temperature modifier 104a' is arranged within a cavity 105a' formed by the lubricant reservoir 102a' and submerged within the lubricant, L, in order to permit the lubricant temperature modifier 104a' to directly communicate with the lubricant, L. The lubricant temperature sensor 106a' may be arranged within the cavity 105a' formed by the lubricant reservoir 102a' and submerged within the lubricant, L, for detecting a temperature of the lubricant, L. The controller 108a' may be communicatively coupled to the lubricant temperature modifier 104a' and the lubricant temperature sensor 106a' for receiving temperature readings from the lubricant temperature sensor 106a' in order to de/actuate the lubricant temperature modifier 104a' for the purpose of maintaining, increasing or decreasing the temperature of the lubricant, L.

In an implementation, the lubricant temperature modifier 104a' may include an electrical source (e.g., a current source) $104a_1$' connected to a heating coil $104a_2$'. In an example, the controller 108a' may include a manually-operated on/off switch to permit manual on/off switching of the electrical source $104a_1$' connected to the heating coil $104a_2$'. The controller 108a' may also include a display that displays the temperature of the lubricant, L; the temperature of the lubricant, L, may be communicated in the form of a signal that is sent from the from the lubricant temperature sensor 106a' to the controller 108a'. Accordingly, if an operator of the of lubrication conditioning systems 100a' is aware of the type of lubricant, L, arranged within the lubricant reservoir 102a', and, if the operator of the lubrication conditioning system 100a' is aware of a desired second temperature (e.g., a temperature that is greater than "room temperature"/"ambient temperature") that the lubricant, L, should be arranged at, the operator may de/actuate the on/off switch provided by the controller 108a' in order to manually maintain control over the temperature of the lubricant, L. Once the electrical source $104a_1$' is actuated, the electrical source $104a_1$' may cause the heating coil $104a_2$' to be heated; because the lubricant, L, is in direct contact with the heating coil $104a_2$', the heating coil $104a_2$' may directly heat the lubricant, L, thereby raising the temperature of the lubrication from a first temperature (e.g., "room temperature"/"ambient temperature") to a second temperature (e.g., a temperature that is greater than "room temperature"/"ambient temperature").

In another example, the controller 108a' may include logic that permits automatic control over the lubrication conditioning system 100a'. In an example, a processor provided by the controller 108a' may be programmed with a desired second temperature (e.g., a temperature that is greater than "room temperature"/"ambient temperature") of the lubricant, L. After actuating the lubrication conditioning system 100a', the temperature of the lubricant, L, may be communicated in the form of a signal that is sent from the from the lubricant temperature sensor 106a' to the controller 108a'. Accordingly, the controller 108a' may maintain the electrical source $104a_1$' connected to the heating coil $104a_2$' in an 'on state' until the temperature of the lubricant, L, has been increased to the second temperature; upon reaching the lubricant, L, reaching the second temperature, the controller 108a' may automatically switch the electrical source $104a_1$' connected to the heating coil $104a_2$' to an 'off state.'

Further, in an embodiment, automatic control over the lubrication conditioning system 100a' may be executed by providing the controller 108a' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108a' may be provided with a user interface that permits an operator to inform the controller 108a' which type of lubricant, L, is deposited into the lubricant reservoir 102a'. Once the operator informs the controller 108a' which type of lubricant, L, is deposited into the lubricant reservoir 102a', the controller 108a' will refer to the data lookup table and automatically select the desired second temperature (e.g., a temperature that is greater than "room temperature"/ "ambient temperature") associated with the lubricant, L, that was entered/selected by the operator at the user interface of the controller 108a'. Accordingly, upon the operator actuating the lubrication conditioning system, the electrical source 104a$_1$' connected to the heating coil 104a$_2$' will remain in the 'on state' until the temperature of the lubricant, L, has been adjusted to the temperature associated with the lubricant, L, in the data lookup table.

Figure 5A:
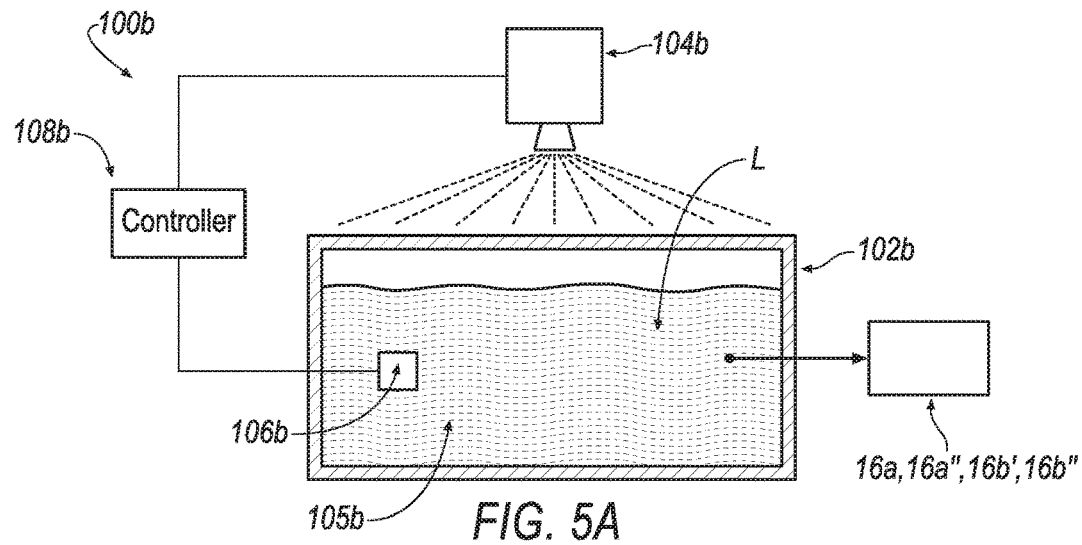
FIG. 5A is a view of a lubrication temperature control system for indirectly heating a lubricant contained by a lubricant reservoir in accordance with an exemplary embodiment of the invention.

Referring to FIG. 5A, a lubrication conditioning system 100b is shown according to an embodiment of the invention. As described above, the lubrication conditioning system 100b indirectly changes (e.g., increases) the temperature of the lubricant, L, from a first temperature (e.g., "room temperature"/"ambient temperature") to a second temperature (e.g., a temperature that is greater than "room temperature"/ "ambient temperature").

In an example, the lubrication conditioning system 100b includes a lubricant reservoir 102b, a lubricant temperature modifier 104b, a lubricant temperature sensor 106b and a controller 108b. The lubricant reservoir 102b contains the lubricant, L. The lubricant temperature modifier 104b is arranged relative to (e.g., over) the lubricant reservoir 102b in order to permit the lubricant temperature modifier 104b to indirectly communicate with the lubricant, L, that is contained by the lubricant reservoir, L. The lubricant temperature sensor 106b may be arranged within a cavity 105b formed by the lubricant reservoir 102b and submerged within the lubricant, L, for detecting a temperature of the lubricant, L. The controller 108b may be communicatively coupled to the lubricant temperature modifier 104b and the lubricant temperature sensor 106b for receiving temperature readings from the lubricant temperature sensor 106b in order to de/actuate the lubricant temperature modifier 104b for the purpose of maintaining, increasing or decreasing the temperature of the lubricant, L.

In an implementation, the lubricant temperature modifier 104b may be a light source that emits light defined by a wavelength. The light source 104b may be any desirable light source, such as, for example, an incandescent light source, an infrared light source, a laser light source, or the like. Unlike the embodiment described above at FIG. 4A, the light emitted from the light source 104b does not pass through an opening (see, e.g., opening 103a of FIG. 4A) formed by the lubricant reservoir 102b, but, rather, the light impacts upon the material defining the lubricant reservoir 102b itself thereby raising the temperature of the lubricant reservoir 102b. Because the lubricant, L, is contained by and in contact with the lubricant reservoir 102b, the light emitted by the light source 104b that heats the material defining the lubricant reservoir 102b may thereby indirectly heat the lubricant, L, contained by and in contact with the lubricant reservoir 102b such that the temperature of the lubricant, L, is raised from a first temperature (e.g., "room temperature"/ "ambient temperature") to a second temperature (e.g., a temperature that is greater than "room temperature"/"ambient temperature").

In an example, the controller 108b may include a manually-operated on/off switch to permit manual on/off switching of the light source 104b. The controller 108b may also include a display that displays the temperature of the lubricant, L; the temperature of the lubricant, L, may be communicated in the form of a signal that is sent from the from the lubricant temperature sensor 106b to the controller 108b. Accordingly, if an operator of the of lubrication conditioning systems 100b is aware of the type of lubricant, L, arranged within the lubricant reservoir 102b, and, if the operator of the lubrication conditioning system 100b is aware of a desired second temperature (e.g., a temperature that is greater than "room temperature"/"ambient temperature") that the lubricant, L, should be arranged at, the operator may de/actuate the on/off switch provided by the controller 108b in order to manually maintain control over the temperature of the lubricant, L.

In another example, the controller 108b may include logic that permits automatic control over the lubrication conditioning system 100b. In an example, a processor provided by the controller 108b may be programmed with a desired second temperature (e.g., a temperature that is greater than "room temperature"/"ambient temperature") of the lubricant, L. After actuating the lubrication conditioning system 100b, the temperature of the lubricant, L, may be communicated in the form of a signal that is sent from the from the lubricant temperature sensor 106b to the controller 108b. Accordingly, the controller 108b may maintain the light source 104b in an 'on state' until the temperature of the lubricant, L, has been increased to the second temperature; upon reaching the lubricant, L, reaching the second temperature, the controller 108b may automatically switch the light source 104b to an 'off state.'

Further, in an embodiment, automatic control over the lubrication conditioning system 100b may be executed by providing the controller 108b with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108b may be provided with a user interface that permits an operator to inform the controller 108b which type of lubricant, L, is deposited into the lubricant reservoir 102b. Once the operator informs the controller 108b which type of lubricant, L, is deposited into the lubricant reservoir 102b, the controller 108b will refer to the data lookup table and automatically select the desired second temperature (e.g., a temperature that is greater than "room temperature"/ "ambient temperature") associated with the lubricant, L, that was entered/selected by the operator at the user interface of the controller 108b. Accordingly, upon the operator actuating the lubrication conditioning system, the light source 104b will remain in the 'on state' until the temperature of the lubricant, L, has been adjusted to the temperature associated with the lubricant, L, in the data lookup table.

Figure 5B:
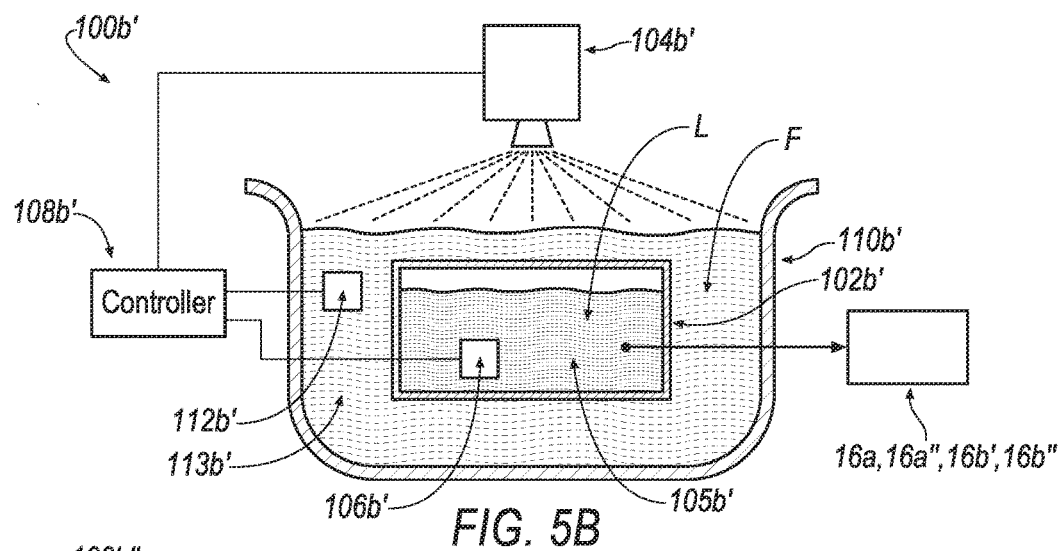
FIG. 5B is a view of a lubrication temperature control system for indirectly heating a lubricant contained by a lubricant reservoir in accordance with an exemplary embodiment of the invention.

Referring to FIG. 5B, a lubrication conditioning system 100b' is shown according to an embodiment of the invention. As described above, the lubrication conditioning system 100b' indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100b' includes a lubricant reservoir 102b', a lubricant temperature modifier 104b', a lubricant temperature sensor 106b', a controller 108b', a fluid container 110b' and a fluid temperature sensor 112b'. The lubricant reservoir 102b' contains the lubricant, L. The lubricant temperature modifier 104b' is arranged relative to (e.g., over) the lubricant reservoir 102b' and the fluid container 110b' in order to permit the lubricant temperature modifier 104b' to indirectly communicate with the lubricant, L, that is contained by the lubricant reservoir, L; indirect communication of the lubricant temperature modifier 104b' with the lubricant, L, is achieved by submerging the lubricant reservoir 102b' within a fluid, F, that is contained by the fluid container 110b'.

The lubricant temperature sensor 106b' may be arranged within a cavity 105b' formed by the lubricant reservoir 102b' and submerged within the lubricant, L, for detecting a temperature of the lubricant, L. The fluid temperature sensor 112b' may be arranged within a cavity 113b' formed by the fluid container 110b' and submerged within the fluid, F, for detecting a temperature of the fluid, F. The controller 108b' may be communicatively coupled to the lubricant temperature modifier 104b', the lubricant temperature sensor 106b' and the fluid temperature sensor 112b' for receiving temperature readings from one or more of the lubricant temperature sensor 106b' and the fluid temperature sensor 112b' in order to de/actuate the lubricant temperature modifier 104b' for the purpose of maintaining, increasing or decreasing the temperature of the lubricant, L.

In an implementation, the lubricant temperature modifier 104b' may be a light source that emits light defined by a wavelength. The light source 104b' may be any desirable light source, such as, for example, an incandescent light source, an infrared light source, a laser light source, or the like. Unlike the embodiment described above at FIG. 4A, the light emitted from the light source 104b' does not pass through an opening (see, e.g., opening 103a of FIG. 4A) formed by the lubricant reservoir 102b', but, rather, the light impacts upon/enters the fluid, F, arranged within the fluid container 110b' thereby raising the temperature of the fluid, F, that surrounds the lubricant reservoir 102b'. Because the lubricant, L, is contained by and in direct contact with an interior surface of lubricant reservoir 102b', and, because an exterior surface of the lubricant reservoir 102b' is in direct contact with the fluid, F, the light emitted by the light source 104b' that heats the fluid, F, may thereby indirectly heat the lubricant, L, contained by and in contact with the lubricant reservoir 102b' such that the temperature of the lubricant, L, is raised from a first temperature (e.g., "room temperature"/"ambient temperature") to a second temperature (e.g., a temperature that is greater than "room temperature"/"ambient temperature").

In an example, the controller 108b' may include a manually-operated on/off switch to permit manual on/off switching of the light source 104b'. The controller 108b' may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor 106b' and the fluid temperature sensor 112b' to the controller 108b'. Accordingly, if an operator of the of lubrication conditioning systems 100b' is aware of the type of lubricant, L, arranged within the lubricant reservoir 102b', and, if the operator of the lubrication conditioning system 100b' is aware of a desired second temperature (e.g., a temperature that is greater than "room temperature"/"ambient temperature") that the lubricant, L, should be arranged at, the operator may de/actuate the on/off switch provided by the controller 108b' in order to manually maintain control over the temperature of the lubricant, L.

In another example, the controller 108b' may include logic that permits automatic control over the lubrication conditioning system 100b'. In an example, a processor provided by the controller 108b' may be programmed with a desired second temperature (e.g., a temperature that is greater than "room temperature"/"ambient temperature") of the lubricant, L. After actuating the lubrication conditioning system 100b', the temperature of the lubricant, L, may be communicated in the form of a signal that is sent from one or more of the lubricant temperature sensor 106b' and the fluid temperature sensor 112b' to the controller 108b'. Accordingly, the controller 108b' may maintain the light source 104b' in an 'on state' until the temperature of the lubricant, L, has been increased to the second temperature; upon reaching the lubricant, L, reaching the second temperature, the controller 108b' may automatically switch the light source 104b' to an 'off state.'

Further, in an embodiment, automatic control over the lubrication conditioning system 100b' may be executed by providing the controller 108b' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108b' may be provided with a user interface that permits an operator to inform the controller 108b' which type of lubricant, L, is deposited into the lubricant reservoir 102b'. Once the operator informs the controller 108b' which type of lubricant, L, is deposited into the lubricant reservoir 102b', the controller 108b' will refer to the data lookup table and automatically select the desired second temperature (e.g., a temperature that is greater than "room temperature"/"ambient temperature") associated with the lubricant, L, that was entered/selected by the operator at the user interface of the controller 108b'. Accordingly, upon the operator actuating the lubrication conditioning system, the light source 104b' will remain in the 'on state' until the temperature of the lubricant, L, has been adjusted to the temperature associated with the lubricant, L, in the data lookup table.

Figure 5C:
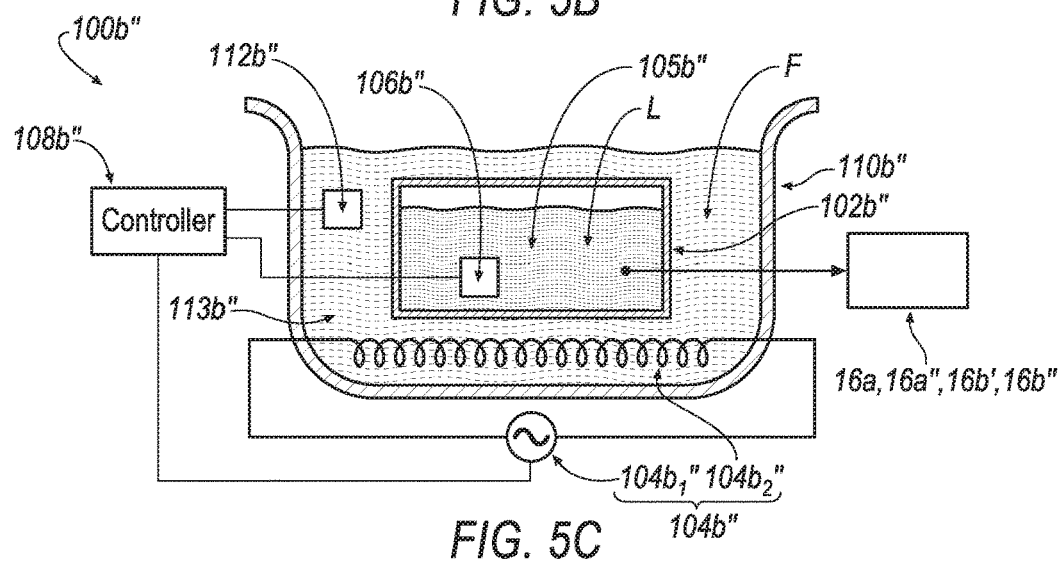
FIG. 5C is a view of a lubrication temperature control system for indirectly heating a lubricant contained by a lubricant reservoir in accordance with an exemplary embodiment of the invention.

Referring to FIG. 5C, a lubrication conditioning system 100b" is shown according to an embodiment of the invention. As described above, the lubrication conditioning system 100b" indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100b" includes a lubricant reservoir 102b", a lubricant temperature modifier 104b", a lubricant temperature sensor 106b", a controller 108b", a fluid container 110b" and a fluid temperature sensor 112b". The lubricant reservoir 102b" contains the lubricant, L. At least a portion (see, e.g., $104b_2$") of the lubricant temperature modifier 104b' is arranged within a cavity 113b" formed by the fluid container 110b" and submerged within a fluid, F, contained by the fluid container 110b" in order to permit the lubricant temperature modifier $104b''$ to indirectly communicate with the lubricant, L; indirect communication of the lubricant temperature modifier $104b''$ with the lubricant, L, is achieved by submerging the lubricant reservoir $102b''$ containing the lubricant, L, within the fluid, F, that is contained within the cavity $113b''$ of the fluid container $110b''$.

The lubricant temperature sensor $106b''$ may be arranged within a cavity $105b''$ formed by the lubricant reservoir $102b''$ and submerged within the lubricant, L, for detecting a temperature of the lubricant, L. The fluid temperature sensor $112b''$ may be arranged within the cavity $113b''$ formed by the fluid container $110b''$ and submerged within the fluid, F, for detecting a temperature of the fluid, F.

The controller $108b''$ may be communicatively coupled to the lubricant temperature modifier $104b''$, the lubricant temperature sensor $106b''$ and the fluid temperature sensor $112b''$ for receiving temperature readings from one or more of the lubricant temperature sensor $106b''$ and the fluid temperature sensor $112b''$ in order to de/actuate the lubricant temperature modifier $104b''$ for the purpose of maintaining, increasing or decreasing the temperature of the lubricant, L.

In an implementation, the lubricant temperature modifier $104b''$ may include an electrical source (e.g., a current source) $104b_1''$ connected to a heating coil $104b_2''$. In an example, the controller $108b''$ may include a manually-operated on/off switch to permit manual on/off switching of the electrical source $104b_1''$ connected to the heating coil $104b_2''$. The controller $108b''$ may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor $106b''$ and the fluid temperature sensor $112b''$ to the controller $108b''$. Accordingly, if an operator of the of lubrication conditioning systems $100b''$ is aware of the type of lubricant, L, arranged within the lubricant reservoir $102b''$, and, if the operator of the lubrication conditioning system $100b''$ is aware of a desired second temperature (e.g., a temperature that is greater than "room temperature"/"ambient temperature") that the lubricant, L, should be arranged at, the operator may de/actuate the on/off switch provided by the controller $108b''$ in order to manually maintain control over the temperature of the lubricant, L. Once the electrical source $104b_1''$ is actuated, the electrical source $104b_1''$ may cause the heating coil $104b_2''$ to be heated; because the fluid, F, is in direct contact with the heating coil $104b_2''$, the heating coil $104b_2''$ may directly heat the fluid, F. Because the lubricant reservoir $102b''$ is in direct contact with the fluid, F, the lubricant, L, contained within lubricant reservoir $102b''$ is also heated, thereby raising the temperature of the lubricant, L, from a first temperature (e.g., "room temperature"/"ambient temperature") to a second temperature (e.g., a temperature that is greater than "room temperature"/"ambient temperature").

In another example, the controller $108b''$ may include logic that permits automatic control over the lubrication conditioning system $100b''$. In an example, a processor provided by the controller $108b''$ may be programmed with a desired second temperature (e.g., a temperature that is greater than "room temperature"/"ambient temperature") of the lubricant, L. After actuating the lubrication conditioning system $100b''$, the temperature of the lubricant, L, may be communicated in the form of a signal that is sent from one or more of the lubricant temperature sensor $106b''$ and the fluid temperature sensor $112b''$ to the controller $108b''$. Accordingly, the controller $108b''$ may maintain the electrical source $104b_1''$ connected to the heating coil $104b_2''$ in an 'on state' until the temperature of the lubricant, L, has been increased to the second temperature; upon reaching the lubricant, L, reaching the second temperature, the controller $108b''$ may automatically switch the electrical source $104b_1''$ connected to the heating coil $104b_2''$ to an 'off state.'

Further, in an embodiment, automatic control over the lubrication conditioning system $100b''$ may be executed by providing the controller $108b''$ with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller $108b''$ may be provided with a user interface that permits an operator to inform the controller $108b''$ which type of lubricant, L, is deposited into the lubricant reservoir $102b''$. Once the operator informs the controller $108b''$ which type of lubricant, L, is deposited into the lubricant reservoir $102b''$, the controller $108b''$ will refer to the data lookup table and automatically select the desired second temperature (e.g., a temperature that is greater than "room temperature"/"ambient temperature") associated with the lubricant, L, that was entered/selected by the operator at the user interface of the controller $108b''$. Accordingly, upon the operator actuating the lubrication conditioning system, the electrical source $104b_1''$ connected to the heating coil $104b_2''$ will remain in the 'on state' until the temperature of the lubricant, L, has been adjusted to the temperature associated with the lubricant, L, in the data lookup table.

Figure 5D:
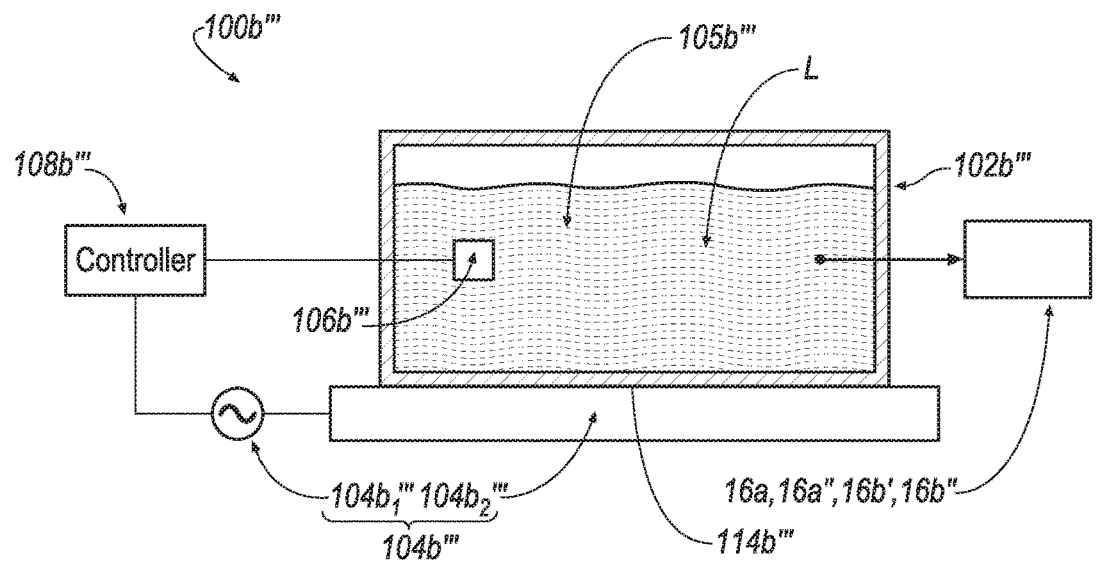
FIG. 5D is a view of a lubrication temperature control system for indirectly heating a lubricant contained by a lubricant reservoir in accordance with an exemplary embodiment of the invention.

Referring to FIG. 5D, a lubrication conditioning system $100b'''$ is shown according to an embodiment of the invention. As described above, the lubrication conditioning system $100b'''$ indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system $100b'''$ includes a lubricant reservoir $102b'''$, a lubricant temperature modifier $104b'''$, a lubricant temperature sensor $106b'''$ and a controller $108b'''$. The lubricant reservoir $102b'''$ contains the lubricant, L. Unlike the lubrication conditioning systems $100a$, $100a'$, $100b$, $100b'$, $100b''$ described above, the lubricant temperature modifier $104b'''$ is not submerged within the lubricant, L, or the fluid, F, nor is the lubricant temperature modifier $104b'''$ arranged in a spaced apart relationship with respect to, lubricant reservoir $102a$, $102a'$, $102b$, $102b'$, $102b''$ and/or fluid container $102b'$, $102b''$; rather, a portion (see, e.g., $104b_2'''$) of the lubricant temperature modifier $104b'''$ is disposed directly adjacent an exterior surface $114b'''$ of the lubricant reservoir $102b'''$. Accordingly, as a result of the lubricant temperature modifier $104b'''$ being arranged directly adjacent the exterior surface $114b'''$ of the lubricant reservoir $102b'''$, the portion $104b_2'''$ of the lubricant temperature modifier $104b'''$ permits the lubricant temperature modifier $104b'''$ to indirectly communicate with the lubricant, L, by way of the material defined by lubricant reservoir $102b'''$.

The lubricant temperature sensor $106b'''$ may be arranged within a cavity $105b'''$ formed by the lubricant reservoir $102b'''$ and submerged within the lubricant, L, for detecting a temperature of the lubricant, L. The controller $108b'''$ may be communicatively coupled to the lubricant temperature modifier $104b'''$ and the lubricant temperature sensor $106b'''$ for receiving temperature readings from the lubricant temperature sensor $106b'''$ in order to de/actuate the lubricant temperature modifier $104b'''$ for the purpose of maintaining, increasing or decreasing the temperature of the lubricant, L.

In an implementation, the lubricant temperature modifier $104b'''$ may include an electrical source (e.g., a current source) $104b_1'''$ connected to a hot plate $104b_2'''$. In an example, the controller $108b'''$ may include a manually-operated on/off switch to permit manual on/off switching of the electrical source $104b_1'''$ connected to the hot plate $104b_2'''$. The controller $108b'''$ may also include a display that displays the temperature of the lubricant, L; the temperature of the lubricant, L, may be communicated in the form of a signal that is sent from the from the lubricant temperature sensor $106b'''$ to the controller $108b'''$. Accordingly, if an operator of the of lubrication conditioning systems $100b'''$ is aware of the type of lubricant, L, arranged within the lubricant reservoir $102b'''$, and, if the operator of the lubrication conditioning system $100b'''$ is aware of a desired second temperature (e.g., a temperature that is greater than "room temperature"/"ambient temperature") that the lubricant, L, should be arranged at, the operator may de/actuate the on/off switch provided by the controller $108b'''$ in order to manually maintain control over the temperature of the lubricant, L. Once the electrical source $104b_1'''$ is actuated, the electrical source $104b_1'''$ may cause the hot plate $104b_2'''$ to be heated; because the exterior surface $114b'''$ of the lubricant reservoir $102b'''$ is in direct contact with the hot plate $104b_2'''$, the hot plate $104b_2'''$ may directly heat the material defining the lubricant reservoir $102b'''$; because the lubricant reservoir $102b'''$ is in direct contact with the lubricant, L, the lubricant, L, is also heated, thereby raising the temperature of the lubricant, L, from a first temperature (e.g., "room temperature"/"ambient temperature") to a second temperature (e.g., a temperature that is greater than "room temperature"/"ambient temperature").

In another example, the controller $108b'''$ may include logic that permits automatic control over the lubrication conditioning system $100b'''$. In an example, a processor provided by the controller $108b'''$ may be programmed with a desired second temperature (e.g., a temperature that is greater than "room temperature"/"ambient temperature") of the lubricant, L. After actuating the lubrication conditioning system $100b'''$, the temperature of the lubricant, L, may be communicated in the form of a signal that is sent from the lubricant temperature sensor $106b'''$ to the controller $108b'''$. Accordingly, the controller $108b'''$ may maintain the electrical source $104b_1'''$ connected to the hot plate $104b_2'''$ in an 'on state' until the temperature of the lubricant, L, has been increased to the second temperature; upon reaching the lubricant, L, reaching the second temperature, the controller $108b'''$ may automatically switch the hot plate $104b'''$ to an 'off state.'

Further, in an embodiment, automatic control over the lubrication conditioning system $100b'''$ may be executed by providing the controller $108b'''$ with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller $108b'''$ may be provided with a user interface that permits an operator to inform the controller $108b'''$ which type of lubricant, L, is deposited into the lubricant reservoir $102b'''$. Once the operator informs the controller $108b'''$ which type of lubricant, L, is deposited into the lubricant reservoir $102b'''$, the controller $108b'''$ will refer to the data lookup table and automatically select the desired second temperature (e.g., a temperature that is greater than "room temperature"/"ambient temperature") associated with the lubricant, L, that was entered/selected by the operator at the user interface of the controller $108b'''$. Accordingly, upon the operator actuating the lubrication conditioning system, the electrical source $104b_1'''$ connected to the hot plate $104b_2'''$ will remain in the 'on state' until the temperature of the lubricant, L, has been adjusted to the temperature associated with the lubricant, L, in the data lookup table.

Figure 5E:
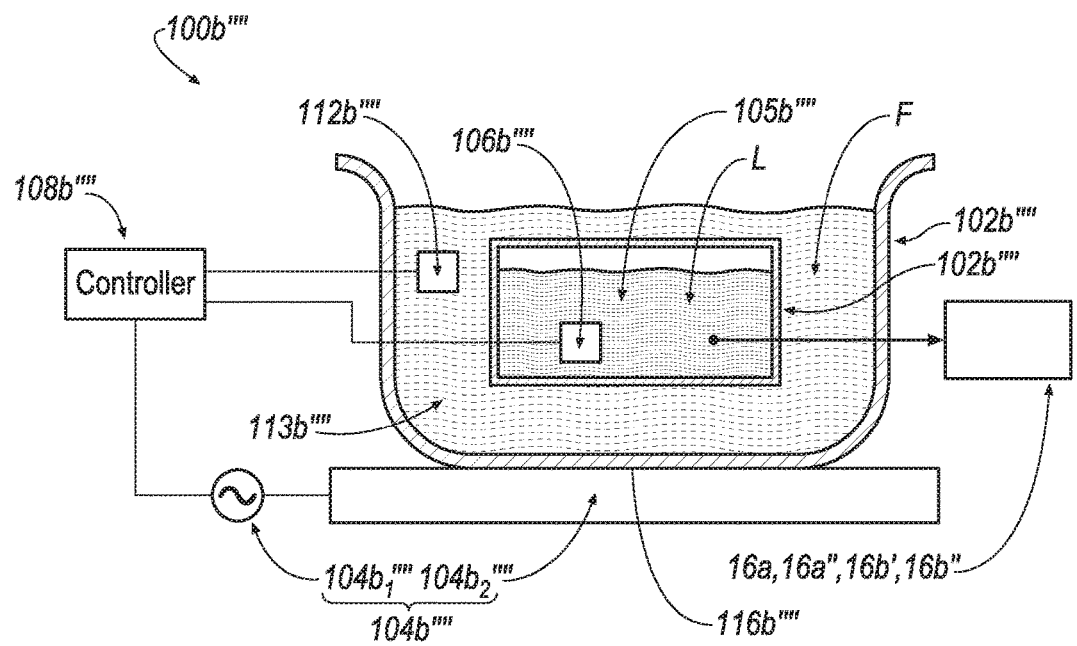
FIG. 5E is a view of a lubrication temperature control system for indirectly heating a lubricant contained by a lubricant reservoir in accordance with an exemplary embodiment of the invention.

Referring to FIG. 5E, a lubrication conditioning system $100b''''$ is shown according to an embodiment of the invention. As described above, the lubrication conditioning system $100b''''$ indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system $100b''''$ includes a lubricant reservoir $102b''''$, a lubricant temperature modifier $104b''''$, a lubricant temperature sensor $106b''''$, a controller $108b''''$, a fluid container $110b''''$ and a fluid temperature sensor $112b''''$. The lubricant reservoir $102b''''$ contains the lubricant, L, and the fluid container $110b''''$ contains a fluid, F. Unlike the lubrication conditioning systems $100a$, $100a'$, $100b$, $100b'$, $100b''$ described above, the lubricant temperature modifier $104b''''$ is not submerged within the lubricant, L, or the fluid, F, nor is the lubricant temperature modifier $104b''''$ arranged in a spaced apart relationship with respect to, lubricant reservoir $102a$, $102a'$, $102b$, $102b'$, $102b''$ and/or fluid container $102b'$, $102b''$; rather, a portion (see, e.g., $104b_2''''$) of the lubricant temperature modifier $104b''''$ is disposed directly adjacent an exterior surface $116b''''$ of the fluid container $110b''''$. Accordingly, as a result of the portion $104b_2''''$ of the temperature modifier $104b''''$ being arranged directly adjacent the exterior surface $116b''''$ of the fluid container $110b''''$, the portion $104b_2''''$ of the lubricant temperature modifier $104b''''$ permits the lubricant temperature modifier $104b''''$ to indirectly communicate with the lubricant, L, by way of: the material defining the lubricant reservoir $102b''''$, the material defining the fluid container $110b''''$ and the fluid, F, that is contained by the fluid container $110b''''$ that surrounds the lubricant reservoir $102b''''$.

The lubricant temperature sensor $106b''''$ may be arranged within a cavity $105b''''$ formed by the lubricant reservoir $102b''''$ and submerged within the lubricant, L, for detecting a temperature of the lubricant, L. The fluid temperature sensor $112b''''$ may be arranged within the cavity $113b''''$ formed by the fluid container $110b''''$ and submerged within the fluid, F, for detecting a temperature of the fluid, F.

The controller $108b''''$ may be communicatively coupled to the lubricant temperature modifier $104b''''$, the lubricant temperature sensor $106b''''$ and the fluid temperature sensor $112b''''$ for receiving temperature readings from one or more of the lubricant temperature sensor $106b''''$ and the fluid temperature sensor $112b''''$ in order to de/actuate the lubricant temperature modifier $104b''''$ for the purpose of maintaining, increasing or decreasing the temperature of the lubricant, L.

In an implementation, the lubricant temperature modifier $104b''''$ may include an electrical source (e.g., a current source) $104b_1''''$ connected to a hot plate $104b_2''''$. In an example, the controller $108b''''$ may include a manually-operated on/off switch to permit manual on/off switching of the electrical source $104b_1''''$ connected to the hot plate $104b_2''''$. The controller $108b''''$ may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor 106b'''' and the fluid temperature sensor 112b'''' to the controller 108b''''. Accordingly, if an operator of the of lubrication conditioning systems 100b'''' is aware of the type of lubricant, L, arranged within the lubricant reservoir 102b'''', and, if the operator of the lubrication conditioning system 100b'''' is aware of a desired second temperature (e.g., a temperature that is greater than "room temperature"/"ambient temperature") that the lubricant, L, should be arranged at, the operator may de/actuate the on/off switch provided by the controller 108b'''' in order to manually maintain control over the temperature of the lubricant, L. Once the electrical source $104b_1''''$ is actuated, the electrical source $104b_1''''$ may cause the hot plate $104b_2''''$ to be heated; because the exterior surface 116b'''' of the fluid container 110b'''' is in direct contact with the hot plate $104b_2''''$, the hot plate $104b_2''''$ may directly heat the fluid, F. Because the lubricant reservoir 102b'''' is in direct contact with the exterior surface 116b'''' of the fluid container 110b'''', which contains the fluid, F, the lubricant, L, contained within lubricant reservoir 102b'''' and submerged within the fluid, F, is also heated, thereby raising the temperature of the lubricant, L, from a first temperature (e.g., "room temperature"/"ambient temperature") to a second temperature (e.g., a temperature that is greater than "room temperature"/"ambient temperature").

In another example, the controller 108b'''' may include logic that permits automatic control over the lubrication conditioning system 100b''''. In an example, a processor provided by the controller 108b'''' may be programmed with a desired second temperature (e.g., a temperature that is greater than "room temperature"/"ambient temperature") of the lubricant, L. After actuating the lubrication conditioning system 100b'''', the temperature of the lubricant, L, may be communicated in the form of a signal that is sent from one or more of the lubricant temperature sensor 106b'''' and the fluid temperature sensor 112b'''' to the controller 108b''''. Accordingly, the controller 108b'''' may maintain the electrical source $104b_1''''$ connected to the hot plate $104b_2''''$ in an 'on state' until the temperature of the lubricant, L, has been increased to the second temperature; upon reaching the lubricant, L, reaching the second temperature, the controller 108b'''' may automatically switch the hot plate 104b'''' to an 'off state.'

Further, in an embodiment, automatic control over the lubrication conditioning system 100b'''' may be executed by providing the controller 108b'''' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108b'''' may be provided with a user interface that permits an operator to inform the controller 108b'''' which type of lubricant, L, is deposited into the lubricant reservoir 102b''''. Once the operator informs the controller 108b'''' which type of lubricant, L, is deposited into the lubricant reservoir 102b'''', the controller 108b'''' will refer to the data lookup table and automatically select the desired second temperature (e.g., a temperature that is greater than "room temperature"/"ambient temperature") associated with the lubricant, L, that was entered/selected by the operator at the user interface of the controller 108b''''. Accordingly, upon the operator actuating the lubrication conditioning system, the electrical source $104b_1''''$ connected to the hot plate $104b_2''''$ will remain in the 'on state' until the temperature of the lubricant, L, has been adjusted to the temperature associated with the lubricant, L, in the data lookup table.

Figure 5F:
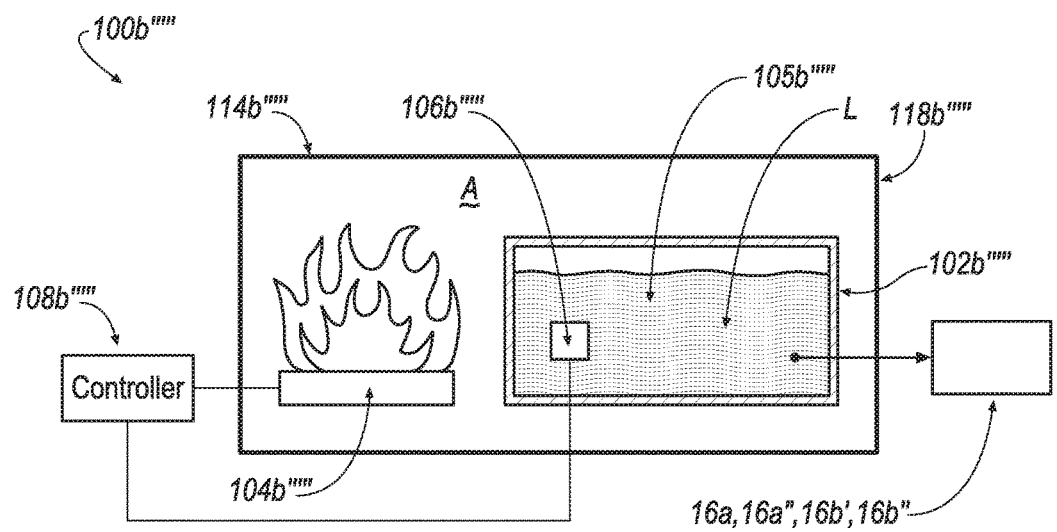
FIG. 5F is a view of a lubrication temperature control system for indirectly heating a lubricant contained by a lubricant reservoir in accordance with an exemplary embodiment of the invention.

Referring to FIG. 5F, a lubrication conditioning system 100b'''' is shown according to an embodiment of the invention. As described above, the lubrication conditioning system 100b'''' indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100b'''' includes a lubricant reservoir 102b'''', a lubricant temperature modifier 104b'''', a lubricant temperature sensor 106b'''', a controller 108b'''' and an enclosed housing 118b''''. The lubricant reservoir 102b'''' contains the lubricant, L. The lubricant temperature modifier 104b'''' is arranged relative to (e.g., next to or proximate) the lubricant reservoir 102b'''' and within the enclosed housing 118b'''' along with the lubricant reservoir 102b'''' in order to permit the lubricant temperature modifier 104b'''' to indirectly communicate with the lubricant, L, that is contained by the lubricant reservoir, L. The lubricant temperature sensor 106b'''' may be arranged within a cavity 105b'''' formed by the lubricant reservoir 102b'''' and submerged within the lubricant, L, for detecting a temperature of the lubricant, L. The controller 108b'''' may be communicatively coupled to the lubricant temperature modifier 104b'''' and the lubricant temperature sensor 106b'''' for receiving temperature readings from the lubricant temperature sensor 106b'''' in order to de/actuate the lubricant temperature modifier 104b'''' for the purpose of maintaining, increasing or decreasing the temperature of the lubricant, L.

In an implementation, the lubricant temperature modifier 104b'''' may be a burner that burns a fuel (e.g., gas) in order to produce a flame. The flame heats the ambient air within the enclosed housing 118b'''' thereby raising the temperature of one or more of the lubricant reservoir 102b'''' and lubricant, L, that are arranged within the enclosed housing 118b''''. Because the lubricant, L, is arranged within the enclosed housing 118b'''', the fluid (i.e., the ambient air, A) within the enclosed housing 118b'''' may indirectly heat one or more of the lubricant reservoir 102b'''' and the lubricant, L, contained by and in contact with the lubricant reservoir 102b'''' such that the temperature of the lubricant, L, is raised from a first temperature (e.g., "room temperature"/"ambient temperature") to a second temperature (e.g., a temperature that is greater than "room temperature"/"ambient temperature").

In an example, the controller 108b'''' may include a manually-operated on/off switch to permit manual on/off switching of the burner 104b''''. The controller 108b'''' may also include a display that displays the temperature of the lubricant, L; the temperature of the lubricant, L, may be communicated in the form of a signal that is sent from the from the lubricant temperature sensor 106b'''' to the controller 108b''''. Accordingly, if an operator of the of lubrication conditioning systems 100b'''' is aware of the type of lubricant, L, arranged within the lubricant reservoir 102b'''', and, if the operator of the lubrication conditioning system 100b'''' is aware of a desired second temperature (e.g., a temperature that is greater than "room temperature"/"ambient temperature") that the lubricant, L, should be arranged at, the operator may de/actuate the on/off switch provided by the controller 108b'''' in order to manually maintain control over the temperature of the lubricant, L.

In another example, the controller 108b'''' may include logic that permits automatic control over the lubrication conditioning system 100b''''. In an example, a processor provided by the controller 108b'''' may be programmed with a desired second temperature (e.g., a temperature that is greater than "room temperature"/"ambient temperature") of the lubricant, L. After actuating the lubrication conditioning system 100b'''', the temperature of the lubricant, L, may be communicated in the form of a signal that is sent from the from the lubricant temperature sensor 106b'''' to the controller 108b''''. Accordingly, the controller 108b'''' may maintain the burner 104b'''' in an 'on state' until the temperature of the lubricant, L, has been increased to the second temperature; upon reaching the lubricant, L, reaching the second temperature, the controller 108b'''' may automatically switch the burner 104b'''' to an 'off state.'

Further, in an embodiment, automatic control over the lubrication conditioning system 100b'''' may be executed by providing the controller 108b'''' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108b'''' may be provided with a user interface that permits an operator to inform the controller 108b'''' which type of lubricant, L, is deposited into the lubricant reservoir 102b''''. Once the operator informs the controller 108b'''' which type of lubricant, L, is deposited into the lubricant reservoir 102b'''', the controller 108b'''' will refer to the data lookup table and automatically select the desired second temperature (e.g., a temperature that is greater than "room temperature"/"ambient temperature") associated with the lubricant, L, that was entered/selected by the operator at the user interface of the controller 108b''''. Accordingly, upon the operator actuating the lubrication conditioning system, the burner 100'''' will remain in the 'on state' until the temperature of the lubricant, L, has been adjusted to the temperature associated with the lubricant, L, in the data lookup table.

Figure 5G:
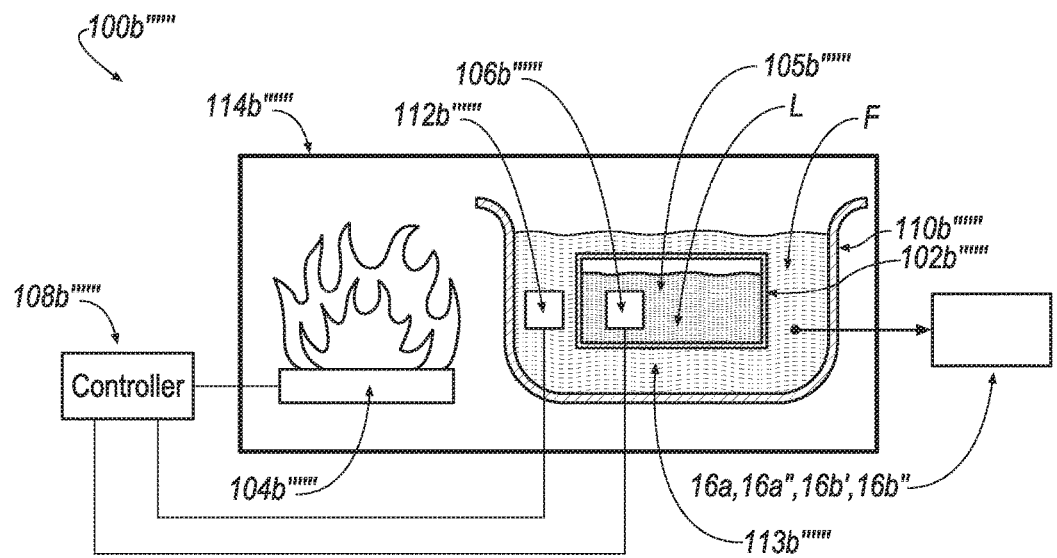
FIG. 5G is a view of a lubrication temperature control system for indirectly heating a lubricant contained by a lubricant reservoir in accordance with an exemplary embodiment of the invention.

Referring to FIG. 5G, a lubrication conditioning system 100b''''' is shown according to an embodiment of the invention. As described above, the lubrication conditioning system 100b''''' indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100b''''' includes a lubricant reservoir 102b''''', a lubricant temperature modifier 104b''''', a lubricant temperature sensor 106b''''', a controller 108b''''', a fluid container 110b''''', a fluid temperature sensor 112b''''' and an enclosed housing 118b'''''. The lubricant reservoir 102b''''' contains the lubricant, L. The lubricant temperature modifier 104b''''' is arranged relative to (e.g., next to or proximate) the lubricant reservoir 102b''''' and the fluid container 110b''''' within the enclosed housing 118b''''' in order to permit the lubricant temperature modifier 104b''''' to indirectly communicate with the lubricant, L, that is contained by the lubricant reservoir, L; indirect communication of the lubricant temperature modifier 104b''''' with the lubricant, L, is achieved by submerging the lubricant reservoir 102b''''' with a fluid, F, that is contained by the fluid container 110b'''''.

The lubricant temperature sensor 106b''''' may be arranged within a cavity 105b''''' formed by the lubricant reservoir 102b''''' and submerged within the lubricant, L, for detecting a temperature of the lubricant, L. The fluid temperature sensor 112b''''' may be arranged within a cavity 113b''''' formed by the fluid container 110b''''' and submerged within the fluid, F, for detecting a temperature of the fluid, F.

The controller 108b''''' may be communicatively coupled to the lubricant temperature modifier 104b''''', the lubricant temperature sensor 106b''''' and the fluid temperature sensor 112b''''' for receiving temperature readings from one or more of the lubricant temperature sensor 106b''''' and the fluid temperature sensor 112b''''' in order to de/actuate the lubricant temperature modifier 104b''''' for the purpose of maintaining, increasing or decreasing the temperature of the lubricant, L.

In an implementation, the lubricant temperature modifier 104b''''' may be a burner that burns a fuel (e.g., gas) in order to produce a flame. The flame heats the ambient air, A, within the enclosed housing 118b''''' thereby raising the temperature of one or more of the lubricant reservoir 102b''''', the lubricant, L, the fluid container 110b''''' and the fluid, F, that are also arranged within the enclosed housing 118b'''''. Because the lubricant, L, is arranged within the enclosed housing 118b''''', the fluid (i.e., the ambient air, A) within the enclosed housing 118b''''' may indirectly heat one or more of the fluid container 110b''''', the fluid, F, contained by the fluid container 110b''''', and the lubrication reservoir 102b''''' and the lubricant, L, that is contained by and in contact with the lubricant reservoir 102b''''' such that the temperature of the lubricant, L, is raised from a first temperature (e.g., "room temperature"/"ambient temperature") to a second temperature (e.g., a temperature that is greater than "room temperature"/"ambient temperature").

In an example, the controller 108b''''' may include a manually-operated on/off switch to permit manual on/off switching of the burner 104b'''''. The controller 108b''''' may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor 106b''''' and the fluid temperature sensor 112b''''' to the controller 108b'''''. Accordingly, if an operator of the of lubrication conditioning systems 100b''''' is aware of the type of lubricant, L, arranged within the lubricant reservoir 102b''''', and, if the operator of the lubrication conditioning system 100b''''' is aware of a desired second temperature (e.g., a temperature that is greater than "room temperature"/"ambient temperature") that the lubricant, L, should be arranged at, the operator may de/actuate the on/off switch provided by the controller 108b''''' in order to manually maintain control over the temperature of the lubricant, L.

In another example, the controller 108b''''' may include logic that permits automatic control over the lubrication conditioning system 100b'''''. In an example, a processor provided by the controller 108b''''' may be programmed with a desired second temperature (e.g., a temperature that is greater than "room temperature"/"ambient temperature") of the lubricant, L. After actuating the lubrication conditioning system 100b''''', the temperature of the lubricant, L, may be communicated in the form of a signal that is sent from one or more of the lubricant temperature sensor 106b''''' and the fluid temperature sensor 112b''''' to the controller 108b'''''. Accordingly, the controller 108b''''' may maintain the burner 104b''''' in an 'on state' until the temperature of the lubricant, L, has been increased to the second temperature; upon reaching the lubricant, L, reaching the second temperature, the controller 108b''''' may automatically switch the burner 104b''''' to an 'off state.'

Further, in an embodiment, automatic control over the lubrication conditioning system 100b''''' may be executed by providing the controller 108b''''' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108b''''' may be provided with a user interface that permits an operator to inform the controller 108b''''' which type of lubricant, L, is deposited into the lubricant reservoir 102b'''''. Once the operator informs the controller 108b''''' which type of lubricant, L, is deposited into the lubricant reservoir 102b''''', the controller 108b''''' will refer to the data lookup table and automatically select the desired second temperature (e.g., a temperature that is greater than "room temperature"/"ambient temperature") associated with the lubricant, L, that was entered/selected by the operator at the user interface of the controller 108b'''''. Accordingly, upon the operator actuating the lubrication conditioning system, the burner 104b''''' will remain in the 'on state' until the temperature of the lubricant, L, has been adjusted to the temperature associated with the lubricant, L, in the data lookup table.

Figure 6A:
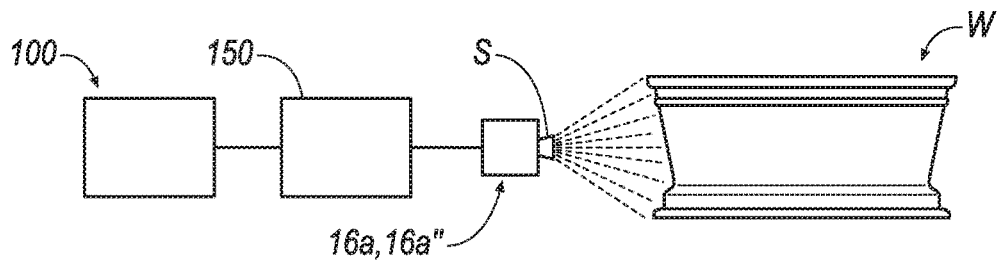
FIG. 6A is a view of any of the lubrication temperature control systems of FIGS. 4A-5G fluidly connected to a wheel lubricating sub-station for lubricating an upper beat seat and a lower beat seat of a wheel in accordance with an exemplary embodiment of the invention.

Referring to FIG. 6A, a lubrication conditioning system 100 connected to the wheel lubricating sub-station 16a, 16a" is shown according to an embodiment. Any of the lubrication conditioning systems 100a, 100a', 100b, 100b', 100b", 100b''', 100b'''', 100b''''', 100b'''''' shown and described at FIGS. 4A-5G may be arranged at the location of the lubrication conditioning system 100 of FIG. 6A such that any of the lubrication conditioning systems 100a, 100a', 100b, 100b', 100b", 100b''', 100b'''', 100b''''', 100b'''''' may be fluidly-coupled to the wheel lubricating sub-station 16a, 16a".

In some implementations, a fluid-moving device (e.g., a pump) 150 may be arranged between the lubrication conditioning system 100 and the wheel lubricating sub-station 16a, 16a" for drawing fluid from the lubrication conditioning system 100 to the wheel lubricating sub-station 16a, 16a". The fluid-moving device 150 may be a component of either of the lubrication conditioning system 100 and the wheel lubricating sub-station 16a, 16a".

In some implementations, the fluid-moving device 150 may also dispense the lubricant, L, from an applicator, S, of the wheel lubricating sub-station 16a, 16a". In an embodiment, the applicator, S, may be a spray nozzle for spraying/misting the lubricant, L, upon the wheel, W. Upon being dispensed from the applicator, S, the lubricant, L, may be deposited upon at least one or more of the upper and lower the bead seats $W_{SU}$, $W_{SL}$ of the wheel, W.

Figure 6B:
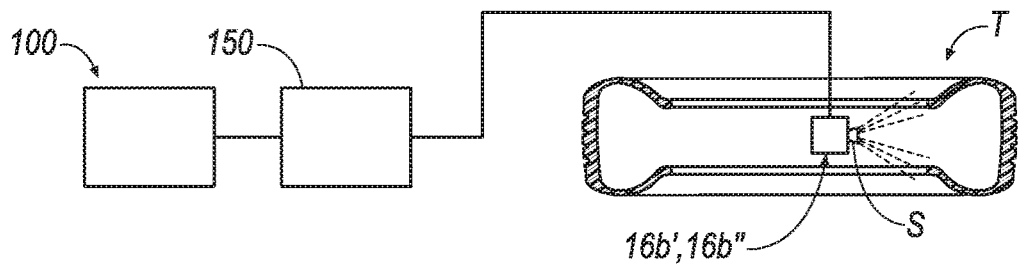
FIG. 6B is a view of any of the lubrication temperature control systems of FIGS. 4A-5G fluidly connected to a tire lubricating sub-station for lubricating an upper beat and a lower beat of a tire in accordance with an exemplary embodiment of the invention.

Referring to FIG. 6B, a lubrication conditioning system 100 connected to the tire lubricating sub-station 16b', 16b" is shown according to an embodiment. Any of the lubrication conditioning systems 100a, 100a', 100b, 100b', 100b", 100b''', 100b'''', 100b''''', 100b'''''' shown and described at FIGS. 4A-5G may be arranged at the location of the lubrication conditioning system 100 of FIG. 6B such that any of the lubrication conditioning systems 100a, 100a', 100b, 100b', 100b", 100b''', 100b'''', 100b''''', 100b'''''' may be fluidly-coupled to the tire lubricating sub-station 16b', 16b".

In some implementations, a fluid-moving device (e.g., a pump) 150 may be arranged between the lubrication conditioning system 100 and the tire lubricating sub-station 16b', 16b" for drawing fluid from the lubrication conditioning system 100 to the tire lubricating sub-station 16b', 16b". The fluid-moving device 150 may be a component of either of the lubrication conditioning system 100 and the tire lubricating sub-station 16b', 16b".

In some implementations, the fluid-moving device 150 may also dispense the lubricant, L, from an applicator, S, of the tire lubricating sub-station 16b', 16b". In an embodiment, the applicator, S, may be a spray nozzle for spraying/misting the lubricant, L, upon the tire, T. Upon being dispensed from the applicator, S, the lubricant, L, may be deposited upon at least one or more of the upper and lower the beads $T_{BU}$, $T_{BL}$ of the tire, T.

Figure 7A:
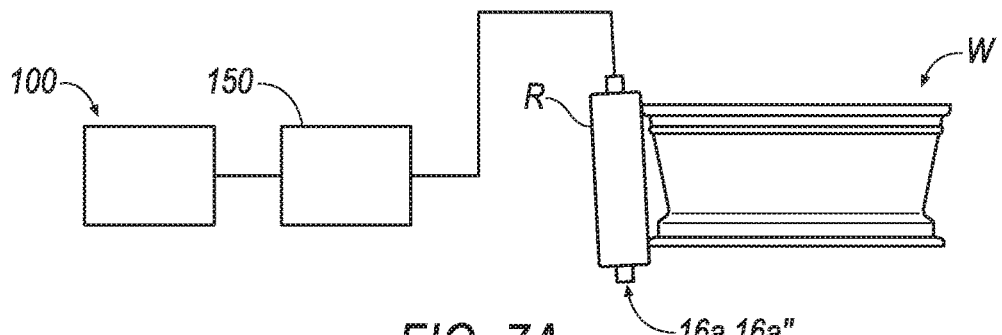
FIG. 7A is a view of any of the lubrication temperature control systems of FIGS. 4A-5G fluidly connected to a wheel lubricating sub-station for lubricating an upper beat seat and a lower beat seat of a wheel in accordance with an exemplary embodiment of the invention.

Referring to FIG. 7A, a lubrication conditioning system 100 connected to the wheel lubricating sub-station 16a, 16a" is shown according to an embodiment. Any of the lubrication conditioning systems 100a, 100a', 100b, 100b', 100b", 100b''', 100b'''', 100b''''', 100b'''''' shown and described at FIGS. 4A-5G may be arranged at the location of the lubrication conditioning system 100 of FIG. 7A such that any of the lubrication conditioning systems 100a, 100a', 100b, 100b', 100b", 100b''', 100b'''', 100b''''', 100b'''''' may be fluidly-coupled to the wheel lubricating sub-station 16a, 16a".

In some implementations, a fluid-moving device (e.g., a pump) 150 may be arranged between the lubrication conditioning system 100 and the wheel lubricating sub-station 16a, 16a" for drawing fluid from the lubrication conditioning system 100 to the wheel lubricating sub-station 16a, 16a". The fluid-moving device 150 may be a component of either of the lubrication conditioning system 100 and the wheel lubricating sub-station 16a, 16a".

In some implementations, the fluid-moving device 150 may also dispense the lubricant, L, from an applicator, R, of the wheel lubricating sub-station 16a, 16a". In an embodiment, the applicator, R, may be a roller for wiping the lubricant, L, upon the wheel, W. Upon being dispensed from the applicator, R, the lubricant, L, may be deposited upon at least one or more of the upper and lower the bead seats $W_{SU}$, $W_{SL}$ of the wheel, W.

Figure 7B:
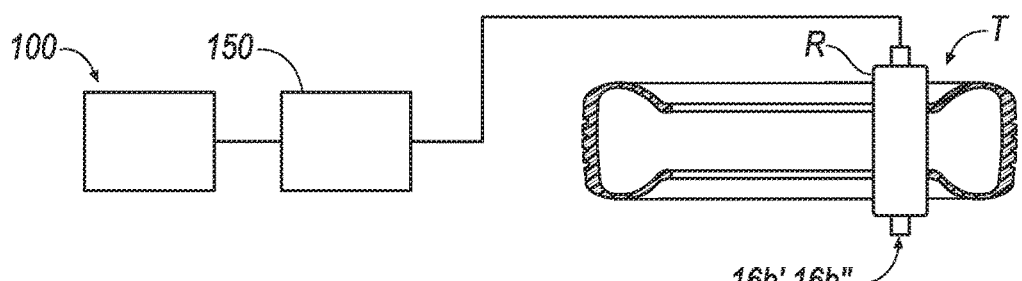
FIG. 7B is a view of any of the lubrication temperature control systems of FIGS. 4A-5G fluidly connected to a tire lubricating sub-station for lubricating an upper beat and a lower beat of a tire in accordance with an exemplary embodiment of the invention.
Figure 6A:
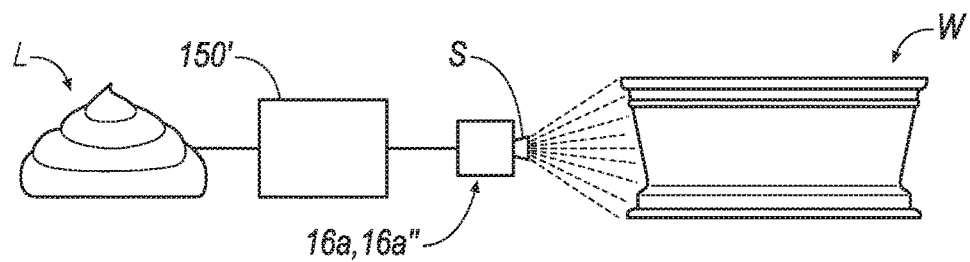
Figure 6B:
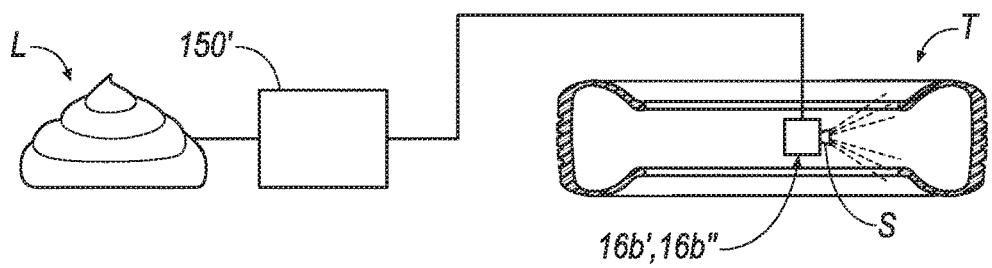
Figure 7A:
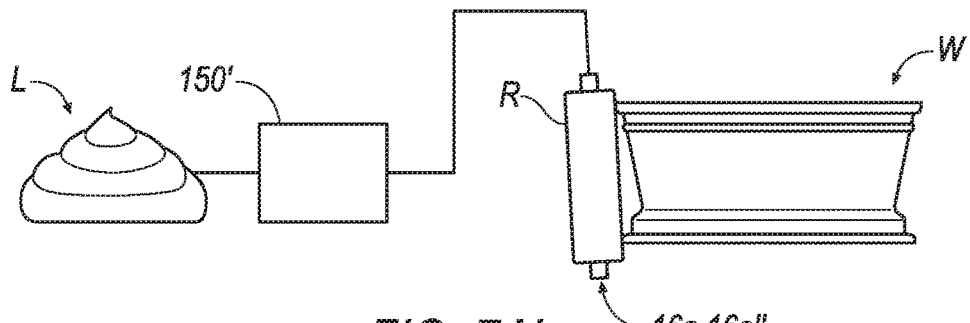
Figure 7B:
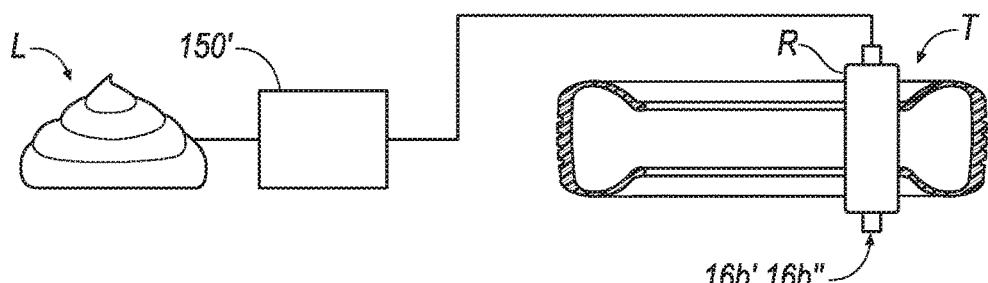

Referring to FIG. 7B, a lubrication conditioning system 100 connected to the tire lubricating sub-station 16b', 16b" is shown according to an embodiment. Any of the lubrication conditioning systems 100a, 100a', 100b, 100b', 100b", 100b''', 100b'''', 100b''''', 100b'''''' shown and described at FIGS. 4A-5G may be arranged at the location of the lubrication conditioning system 100 of FIG. 7B such that any of the lubrication conditioning systems 100a, 100a', 100b, 100b', 100b", 100b''', 100b'''', 100b''''', 100b'''''' may be fluidly-coupled to the tire lubricating sub-station 16b', 16b".

In some implementations, a fluid-moving device (e.g., a pump) 150 may be arranged between the lubrication conditioning system 100 and the tire lubricating sub-station 16b', 16b" for drawing fluid from the lubrication conditioning system 100 to the tire lubricating sub-station 16b', 16b". The fluid-moving device 150 may be a component of either of the lubrication conditioning system 100 and the tire lubricating sub-station 16b', 16b".

In some implementations, the fluid-moving device 150 may also dispense the lubricant, L, from an applicator, R, of the tire lubricating sub-station 16b', 16b". In an embodiment, the applicator, R, may be a roller for wiping the lubricant, L, upon the tire, T. Upon being dispensed from the applicator, R, the lubricant, L, may be deposited upon at least one or more of the upper and lower the beads $T_{BU}$, $T_{BL}$ of the tire, T.

Referring to FIGS. 6A', 6B', 7A' and 7B', exemplary alternative systems for lubricating a wheel, W (see, e.g., FIGS. 6A', 7A'), and a tire, T (see, e.g., FIGS. 6B', 7B'), are shown. Unlike the systems shown and described above at FIGS. 6A, 6B, 7A and 7B, the systems shown and described at FIGS. 6A', 6B', 7A' and 7B' do not include a dedicated lubrication conditioning system 100 that increases the temperature of the lubricant, L; rather, the systems shown and described at FIGS. 6A', 6B', 7A' and 7B' include a high pressure pump 150' that inherently increases the temperature of the lubricant, L, by virtue of pressurizing the lubricant during the process of ejecting the lubricant upon the tire, T, and/or wheel, W, at the lubricating sub-station 16a, 16a", 16b', 16b" as the lubricant, L, is drawn through the high pressure pump 150'. As described above, when the temperature of the lubricant, L, is raised, the lubricant, L, undergoes a viscosity transition (e.g., a change from a substantially paste lubricant, L, to a substantially liquid lubricant, L) in order to arrange the lubricant, L, in a more suitable state for being ejected from an applicator, S (e.g., a spray nozzle), of a particular depositing (e.g., "spraying") application upon one or more of the tire, T, and the wheel, W, at one or more of the wheel lubricating sub-station 16a, 16a", a tire lubricating sub-station 16b', 16b". Therefore, by inducing a viscosity transition of the lubricant, L, to occur, one or more of the wheel lubricating sub-station 16a, 16a" and the tire lubricating sub-station 16b', 16b" that is tooled for spraying lubricant, L, from a spray nozzle, S, may not be limited to a particular (e.g., viscosity) lubricant, L, that is arranged in at a first temperature (e.g., "room temperature"/"ambient temperature")); accordingly, by permitting a viscosity transition of the lubricant, L, to occur as a result of inclusion of the high pressure pump 150', lubricants, L, having, for example, a non-liquid state of matter (such as, e.g., a semi-solid paste lubricant) at the first temperature (e.g., "room temperature"/"ambient temperature") may be utilized by one or more of the wheel lubricating sub-station 16a, 16a" and the tire lubricating sub-station 16b', 16b" that is tooled for spraying lubricant, L.

Figure 8A:
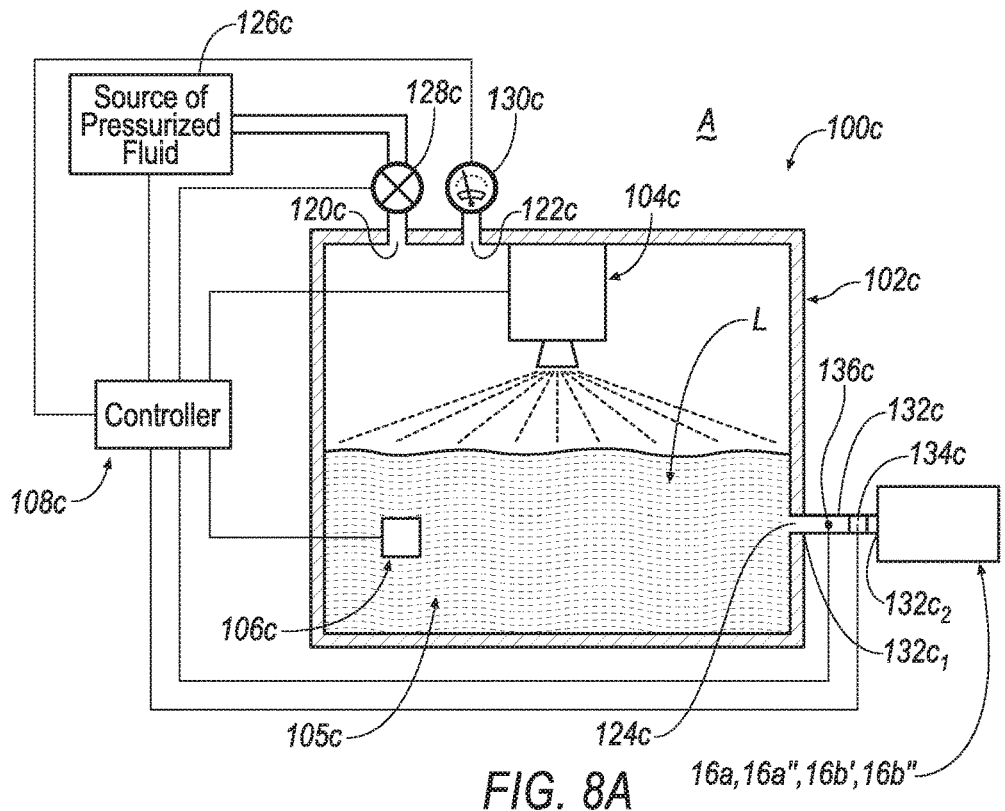
FIG. 8A is a view of a lubrication temperature control system for directly heating a lubricant contained by a lubricant reservoir in accordance with an exemplary embodiment of the invention.

Referring to FIG. 8A, a lubrication conditioning system 100c is shown according to an embodiment of the invention. As described above, the lubrication conditioning system 100c directly changes (e.g., increases) the temperature of the lubricant, L, from a first temperature (e.g., "room temperature"/"ambient temperature") to a second temperature (e.g., a temperature that is greater than "room temperature"/ "ambient temperature").

In an example, the lubrication conditioning system 100c includes a lubricant reservoir 102c, a lubricant temperature modifier 104c, a lubricant temperature sensor 106c and a controller 108c. The lubricant reservoir 102c contains the lubricant, L. The lubricant temperature modifier 104c is arranged relative to (e.g., over) an opening 103c formed by the lubricant reservoir 102c in order to permit the lubricant temperature modifier 104c to directly communicate with the lubricant, L. The lubricant temperature sensor 106c may be arranged within a cavity 105c formed by the lubricant reservoir 102c and submerged within the lubricant, L, for detecting a temperature of the lubricant, L. The controller 108c may be communicatively coupled to the lubricant temperature modifier 104c and the lubricant temperature sensor 106c for receiving temperature readings from the lubricant temperature sensor 106c in order to de/actuate the lubricant temperature modifier 104c for the purpose of maintaining, increasing or decreasing the temperature of the lubricant, L.

In an implementation, the lubricant temperature modifier 104c may be a light source that emits light defined by a wavelength. The light source 104c may be any desirable light source, such as, for example, an incandescent light source, an infrared light source, a laser light source, or the like. The light emitted from the light source 104c passes through the opening 103c formed by the lubricant reservoir 102c in order to permit the light from the light source 104c to directly impacts upon/enters the lubricant, L; once the light impacts/enters the lubricant, L, the light may directly heat the lubricant, L, thereby raising the temperature of the lubrication from a first temperature (e.g., "room temperature"/"ambient temperature") to a second temperature (e.g., a temperature that is greater than "room temperature"/ "ambient temperature").

In an example, the controller 108c may include a manually-operated on/off switch to permit manual on/off switching of the light source 104c. The controller 108c may also include a display that displays the temperature of the lubricant, L, that is determined by the lubricant temperature sensor 106c; the temperature of the lubricant, L, may be communicated in the form of a signal that is sent from the from the lubricant temperature sensor 106c to the controller 108c. Accordingly, if an operator of the of lubrication conditioning systems 100c is aware of the type of lubricant, L, arranged within the lubricant reservoir 102c, and, if the operator of the lubrication conditioning system 100c is aware of a desired second temperature (e.g., a temperature that is greater than "room temperature"/"ambient temperature") that the lubricant, L, should be arranged at, the operator may de/actuate the on/off switch provided by the controller 108c in order to manually maintain control over the temperature of the lubricant, L.

In another example, the controller 108c may include logic that permits automatic control over the lubrication conditioning system 100c. In an example, a processor provided by the controller 108c may be programmed with a desired second temperature (e.g., a temperature that is greater than "room temperature"/"ambient temperature") of the lubricant, L. After actuating the lubrication conditioning system 100c, the temperature of the lubricant, L, may be communicated in the form of a signal that is sent from the from the lubricant temperature sensor 106c to the controller 108c. Accordingly, the controller 108c may maintain the light source 104c in an 'on state' until the temperature of the lubricant, L, has been increased to the second temperature; upon reaching the lubricant, L, reaching the second temperature, the controller 108c may automatically switch the light source 104c to an 'off state.'

Further, in an embodiment, automatic control over the lubrication conditioning system 100c may be executed by providing the controller 108c with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108c may be provided with a user interface that permits an operator to inform the controller 108c which type of lubricant, L, is deposited into the lubricant reservoir 102c. Once the operator informs the controller 108c which type of lubricant, L, is deposited into the lubricant reservoir 102c, the controller 108c will refer to the data lookup table and automatically select the desired second temperature (e.g., a temperature that is greater than "room temperature"/ "ambient temperature") associated with the lubricant, L, that was entered/selected by the operator at the user interface of the controller 108c. Accordingly, upon the operator actuating the lubrication conditioning system, the light source 104c will remain in the 'on state' until the temperature of the lubricant, L, has been adjusted to the temperature associated with the lubricant, L, in the data lookup table.

Unlike the exemplary embodiment described above at FIG. 4A, the lubricant reservoir 102c of the exemplary embodiment described above at FIG. 8A does not include an opening (see, e.g., 103a in FIG. 4A) such as a vent to atmosphere that permits the lubricant, L, to be in direct communication with surrounding atmosphere, A; rather, the lubricant reservoir 102c is defined by an enclosure that does not permit the lubricant, L, to be in direct communication with surrounding atmosphere, A.

Although the lubricant reservoir 102c may be defined by an enclosure that does not permit the lubricant, L, to be in direct communication with surrounding atmosphere, A, the lubricant reservoir 102c may include several ports 120c, 122c and 124c, which may be referred to as one or more fluid communication ports. In some instances, the fluid communication port 120c may permit a source of pressurized fluid 126c to pressurize the cavity 105c formed by the lubricant reservoir 102c; movement of the pressurized fluid from the source of pressurized fluid 126c to the cavity 105c is permitted when a flow control valve 128c is arranged in an open orientation. In other instances, the fluid communication port 122c may permit a pressure sensor 130c to detect a pressurization level of the cavity 105c formed by the lubricant reservoir 102c.

In other examples, the fluid communication port 124c may permit the lubricant, L, contained in the cavity 105c to be evacuated from the lubricant reservoir 102c. A proximal end $132c_1$ of a conduit member 132c may be fluidly-connected to the fluid communication port 124c, and, a distal end $132c_2$ of the conduit member 132c may be connected to one or more of the wheel lubricating sub-station 16a, 16a" and the tire lubricating sub-station 16b', 16b". In some instances, one or more heating elements 134c may be connected to the conduit member 132c for selectively adjusting the temperature of the conduit member 132c. In other examples, a temperature sensor 136c may be disposed upon the conduit member 132c for determining the temperature of the conduit member 132c.

As seen in FIG. 8A, the controller 108c may also be communicatively-coupled to one or more of the source of pressurized fluid 126c, the flow control valve 128c, the pressure sensor 130c, the one or more heating elements 134c and the temperature sensor 136c. In an example, the controller 108c may send and/or receive signals to one or more of the source of pressurized fluid 126c, the flow control valve 128c, the pressure sensor 130c, the one or more heating elements 134c and the temperature sensor 136c as follows.

The controller 108c may send a signal to the flow control valve 128c for arranging the flow control valve 128c in a closed orientation, thereby denying the pressurized fluid contained by the source of pressurized fluid 126c to be in communication with the cavity 105c by way of the fluid communication port 124c. Upon the controller 108c sending a signal to the flow control valve 128c for arranging the flow control valve 128c in the open orientation, the pressurized fluid contained by the source of pressurized fluid 126c may be directed into the cavity 105c and thereby registering an amount of pressure within the cavity 105c that is detected by the pressure sensor 130c; the pressure sensor 130c may communicate a signal to the controller 108c indicating the amount of pressure within the cavity 105c.

After pressurizing the cavity 105c with the pressurized fluid contained by the source of pressurized fluid 126c, and, upon actuation of the applicator, S (e.g., a spray nozzle), of the wheel lubricating sub-station 16a, 16a" and/or tire lubricating sub-station 16b', 16b", the lubricant, L, may be expelled from the cavity 105c by way of the pressurized fluid pushing the lubricant, L, out of the fluid communication port 124c and through the conduit member 132c. In some instances, if the controller 108c learns (e.g., from the signal sent from the pressure sensor 130c) that the cavity 105c is insufficiently pressurized, which may impair a desired amount of expelled fluid from the applicator, S, the controller 108c causes the source of pressurized fluid 126c to increase the amount or flow rate of pressurized fluid provided to the cavity 105c by way of the fluid communication port 120c. In other examples, if the conduit member 132c is not sufficiently heated (which is determined by the controller 108c by way of a temperature signal sent from the temperature sensor 136c to the controller 108c), and, thereby cools the lubricant, L, flowing there-through, the controller 108c may actuate one or more heating elements 134c for raising the temperature of the conduit member 132c; upon increasing the temperature of the conduit member 132c, the temperature of the lubricant, L, may be maintained as the lubricant, L, is expelled from the cavity 105c and into the conduit member 132c prior to exiting the applicator, S.

Figure 8B:
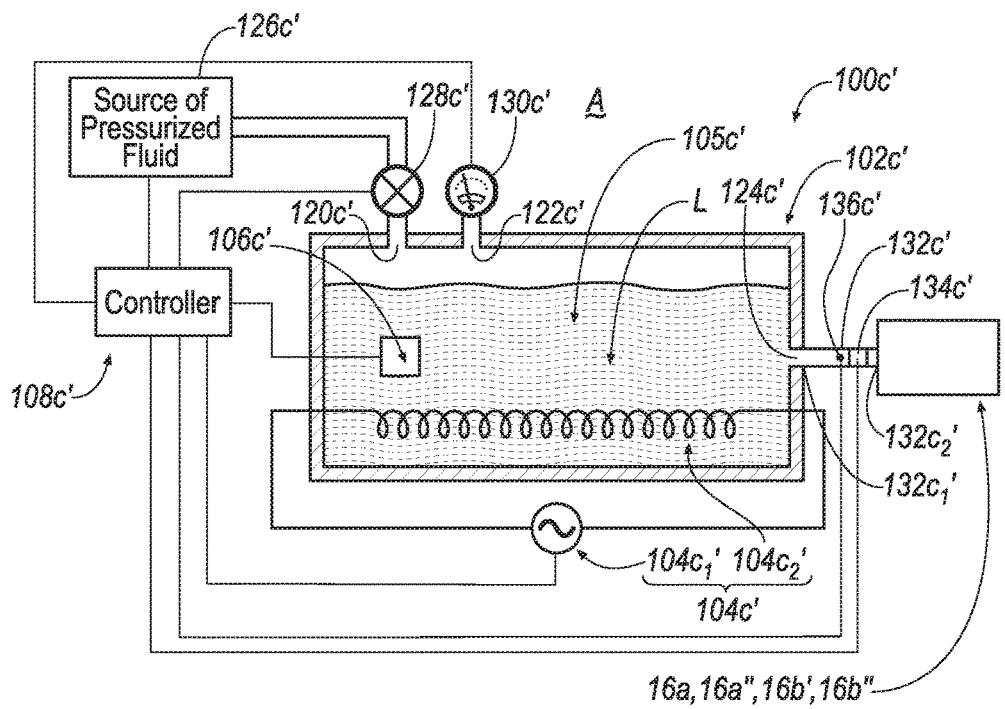
FIG. 8B is a view of a lubrication temperature control system for directly heating a lubricant contained by a lubricant reservoir in accordance with an exemplary embodiment of the invention.

Referring to FIG. 8B, a lubrication conditioning system 100c' is shown according to an embodiment of the invention. As described above, the lubrication conditioning system 100c' directly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100c' includes a lubricant reservoir 102c', a lubricant temperature modifier 104c', a lubricant temperature sensor 106c' and a controller 108c'. The lubricant reservoir 102c' contains the lubricant, L. At least a portion (see, e.g., $104c_2'$) of the lubricant temperature modifier 104c' is arranged within a cavity 105c' formed by the lubricant reservoir 102c' and submerged within the lubricant, L, in order to permit the lubricant temperature modifier 104c' to directly communicate with the lubricant, L. The lubricant temperature sensor 106c' may be arranged within the cavity 105c' formed by the lubricant reservoir 102c' and submerged within the lubricant, L, for detecting a temperature of the lubricant, L. The controller 108c' may be communicatively coupled to the lubricant temperature modifier 104c' and the lubricant temperature sensor 106c' for receiving temperature readings from the lubricant temperature sensor 106c' in order to de/actuate the lubricant temperature modifier 104c' for the purpose of maintaining, increasing or decreasing the temperature of the lubricant, L.

In an implementation, the lubricant temperature modifier 104c' may include an electrical source (e.g., a current source) $104c_1'$ connected to a heating coil $104c_2'$. In an example, the controller 108c' may include a manually-operated on/off switch to permit manual on/off switching of the electrical source $104c_1'$ connected to the heating coil $104c_2'$. The controller 108c' may also include a display that displays the temperature of the lubricant, L; the temperature of the lubricant, L, may be communicated in the form of a signal that is sent from the from the lubricant temperature sensor 106c' to the controller 108c'. Accordingly, if an operator of the of lubrication conditioning systems $100c'$ is aware of the type of lubricant, L, arranged within the lubricant reservoir $102c'$, and, if the operator of the lubrication conditioning system $100c'$ is aware of a desired second temperature (e.g., a temperature that is greater than "room temperature"/"ambient temperature") that the lubricant, L, should be arranged at, the operator may de/actuate the on/off switch provided by the controller $108c'$ in order to manually maintain control over the temperature of the lubricant, L. Once the electrical source $104c_1'$ is actuated, the electrical source $104c_1'$ may cause the heating coil $104c_2'$ to be heated; because the lubricant, L, is in direct contact with the heating coil $104c_2'$, the heating coil $104c_2'$ may directly heat the lubricant, L, thereby raising the temperature of the lubrication from a first temperature (e.g., "room temperature"/"ambient temperature") to a second temperature (e.g., a temperature that is greater than "room temperature"/"ambient temperature").

In another example, the controller $108c'$ may include logic that permits automatic control over the lubrication conditioning system $100c'$. In an example, a processor provided by the controller $108c'$ may be programmed with a desired second temperature (e.g., a temperature that is greater than "room temperature"/"ambient temperature") of the lubricant, L. After actuating the lubrication conditioning system $100c'$, the temperature of the lubricant, L, may be communicated in the form of a signal that is sent from the from the lubricant temperature sensor $106c'$ to the controller $108c'$. Accordingly, the controller $108c'$ may maintain the electrical source $104c_1'$ connected to the heating coil $104c_2'$ in an 'on state' until the temperature of the lubricant, L, has been increased to the second temperature; upon reaching the lubricant, L, reaching the second temperature, the controller $108c'$ may automatically switch the electrical source $104c_1'$ connected to the heating coil $104c_2'$ to an 'off state.'

Further, in an embodiment, automatic control over the lubrication conditioning system $100c'$ may be executed by providing the controller $108c'$ with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller $108c'$ may be provided with a user interface that permits an operator to inform the controller $108c'$ which type of lubricant, L, is deposited into the lubricant reservoir $102c'$. Once the operator informs the controller $108c'$ which type of lubricant, L, is deposited into the lubricant reservoir $102c'$, the controller $108c'$ will refer to the data lookup table and automatically select the desired second temperature (e.g., a temperature that is greater than "room temperature"/"ambient temperature") associated with the lubricant, L, that was entered/selected by the operator at the user interface of the controller $108c'$. Accordingly, upon the operator actuating the lubrication conditioning system, the electrical source $104c_1'$ connected to the heating coil $104c_2'$ will remain in the 'on state' until the temperature of the lubricant, L, has been adjusted to the temperature associated with the lubricant, L, in the data lookup table.

In a somewhat similar fashion to the exemplary embodiment described above at FIG. 4B, the lubricant reservoir $102c'$ of the exemplary embodiment described above at FIG. 8B does not include an opening (such as a vent to atmosphere) that permits the lubricant, L, to be in direct communication with surrounding atmosphere, A. As such, the lubricant reservoir $102c'$ is defined by an enclosure that does not permit the lubricant, L, to be in direct communication with surrounding atmosphere, A.

Although the lubricant reservoir $102c'$ may be defined by an enclosure that does not permit the lubricant, L, to be in direct communication with surrounding atmosphere, A, the lubricant reservoir $102c'$ may include several ports $120c'$, $122c'$ and $124c'$, which may be referred to as one or more fluid communication ports. In some instances, the fluid communication port $120c'$ may permit a source of pressurized fluid $126c'$ to pressurize the cavity $105c'$ formed by the lubricant reservoir $102c'$; movement of the pressurized fluid from the source of pressurized fluid $126c'$ to the cavity $105c'$ is permitted when a flow control valve $128c'$ is arranged in an open orientation. In other instances, the fluid communication port $122c'$ may permit a pressure sensor $130c'$ to detect a pressurization level of the cavity $105c'$ formed by the lubricant reservoir $102c'$.

In other examples, the fluid communication port $124c'$ may permit the lubricant, L, contained in the cavity $105c'$ to be evacuated from the lubricant reservoir $102c'$. A proximal end $132c_1'$ of a conduit member $132c'$ may be fluidly-connected to the fluid communication port $124c'$, and, a distal end $132c_2'$ of the conduit member $132c'$ may be connected to one or more of the wheel lubricating sub-station $16a$, $16a''$ and the tire lubricating sub-station $16b'$, $16b''$. In some instances, one or more heating elements $134c'$ may be connected to the conduit member $132c'$ for selectively adjusting the temperature of the conduit member $132c'$. In other examples, a temperature sensor $136c'$ may be disposed upon the conduit member $132c'$ for determining the temperature of the conduit member $132c'$.

As seen in FIG. 8B, the controller $108c'$ may also be communicatively-coupled to one or more of the source of pressurized fluid $126c'$, the flow control valve $128c'$, the pressure sensor $130c'$, the one or more heating elements $134c'$ and the temperature sensor $136c'$. In an example, the controller $108c'$ may send and/or receive signals to one or more of the source of pressurized fluid $126c'$, the flow control valve $128c'$, the pressure sensor $130c'$, the one or more heating elements $134c'$ and the temperature sensor $136c'$ as follows.

The controller $108c'$ may send a signal to the flow control valve $128c'$ for arranging the flow control valve $128c'$ in a closed orientation, thereby denying the pressurized fluid contained by the source of pressurized fluid $126c'$ to be in communication with the cavity $105c'$ by way of the fluid communication port $124c'$. Upon the controller $108c'$ sending a signal to the flow control valve $128c'$ for arranging the flow control valve $128c'$ in the open orientation, the pressurized fluid contained by the source of pressurized fluid $126c'$ may be directed into the cavity $105c'$ and thereby registering an amount of pressure within the cavity $105c'$ that is detected by the pressure sensor $130c'$; the pressure sensor $130c'$ may communicate a signal to the controller $108c'$ indicating the amount of pressure within the cavity $105c'$.

After pressurizing the cavity $105c'$ with the pressurized fluid contained by the source of pressurized fluid $126c'$, and, upon actuation of the applicator, S (e.g., a spray nozzle), of the wheel lubricating sub-station $16a$, $16a''$ and/or tire lubricating sub-station $16b'$, $16b''$, the lubricant, L, may be expelled from the cavity $105c'$ by way of the pressurized fluid pushing the lubricant, L, out of the fluid communication port $124c'$ and through the conduit member $132c'$. In some instances, if the controller $108c'$ learns (e.g., from the signal sent from the pressure sensor $130c'$) that the cavity $105c'$ is insufficiently pressurized, which may impair a desired amount of expelled fluid from the applicator, S, the controller 108c' causes the source of pressurized fluid 126c' to increase the amount or flow rate of pressurized fluid provided to the cavity 105c' by way of the fluid communication port 120c'. In other examples, if the conduit member 132c' is not sufficiently heated (which is determined by the controller 108c' by way of a temperature signal sent from the temperature sensor 136c' to the controller 108c'), and, thereby cools the lubricant, L, flowing there-through, the controller 108c' may actuate one or more heating elements 134c' for raising the temperature of the conduit member 132c'; upon increasing the temperature of the conduit member 132c', the temperature of the lubricant, L, may be maintained as the lubricant, L, is expelled from the cavity 105c' and into the conduit member 132c' prior to exiting the applicator, S.

Figure 9A:
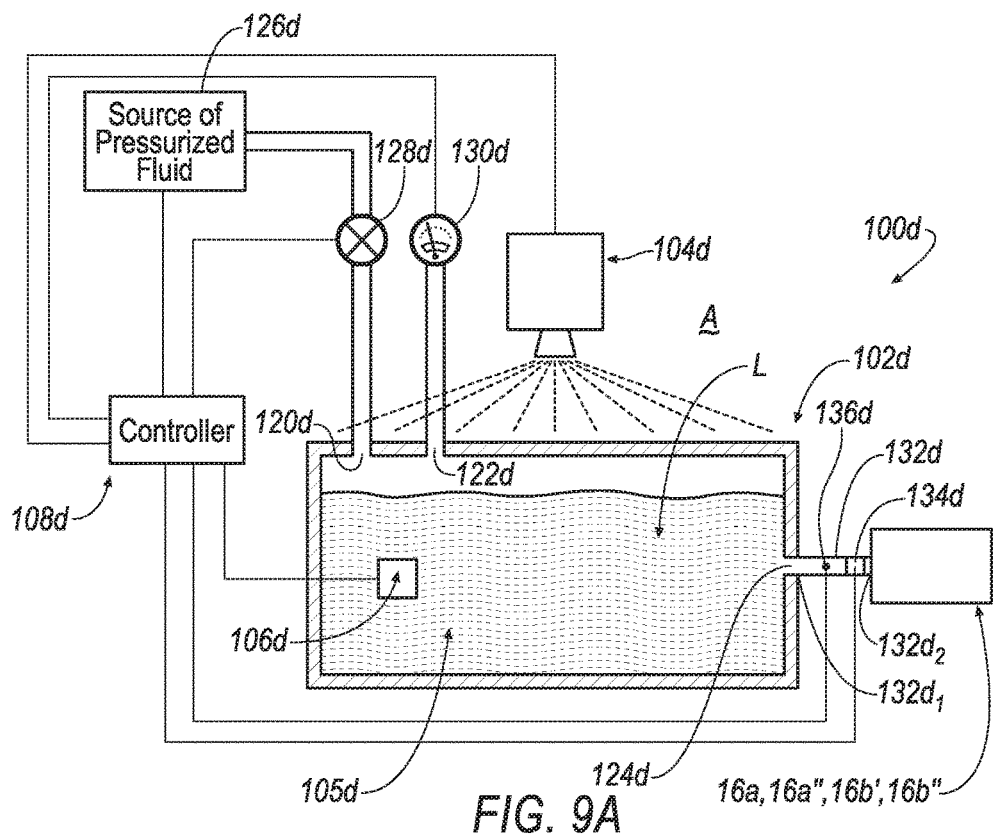
FIG. 9A is a view of a lubrication temperature control system for indirectly heating a lubricant contained by a lubricant reservoir in accordance with an exemplary embodiment of the invention.

Referring to FIG. 9A, a lubrication conditioning system 100d is shown according to an embodiment of the invention. As described above, the lubrication conditioning system 100d indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100d includes a lubricant reservoir 102d, a lubricant temperature modifier 104d, a lubricant temperature sensor 106d and a controller 108d. The lubricant reservoir 102d contains the lubricant, L. The lubricant temperature modifier 104d is arranged relative to (e.g., over) the lubricant reservoir 102d in order to permit the lubricant temperature modifier 104d to indirectly communicate with the lubricant, L, that is contained by the lubricant reservoir, L. The lubricant temperature sensor 106d may be arranged within a cavity 105d formed by the lubricant reservoir 102d and submerged within the lubricant, L, for detecting a temperature of the lubricant, L. The controller 108d may be communicatively coupled to the lubricant temperature modifier 104d and the lubricant temperature sensor 106d for receiving temperature readings from the lubricant temperature sensor 106d in order to de/actuate the lubricant temperature modifier 104d for the purpose of maintaining, increasing or decreasing the temperature of the lubricant, L.

In an implementation, the lubricant temperature modifier 104d may be a light source that emits light defined by a wavelength. The light source 104d may be any desirable light source, such as, for example, an incandescent light source, an infrared light source, a laser light source, or the like. Unlike the embodiment described above at FIG. 8A, the light emitted from the light source 104d does not pass through an opening (see, e.g., opening 103c of FIG. 8A) formed by the lubricant reservoir 102d, but, rather, the light impacts upon the material defining the lubricant reservoir 102d itself thereby raising the temperature of the lubricant reservoir 102d. Because the lubricant, L, is contained by and in contact with the lubricant reservoir 102d, the light emitted by the light source 104d that heats the material defining the lubricant reservoir 102d may thereby indirectly heat the lubricant, L, contained by and in contact with the lubricant reservoir 102d such that the temperature of the lubricant, L, is raised from a first temperature (e.g., "room temperature"/"ambient temperature") to a second temperature (e.g., a temperature that is greater than "room temperature"/"ambient temperature").

In an example, the controller 108d may include a manually-operated on/off switch to permit manual on/off switching of the light source 104d. The controller 108d may also include a display that displays the temperature of the lubricant, L; the temperature of the lubricant, L, may be communicated in the form of a signal that is sent from the from the lubricant temperature sensor 106d to the controller 108d. Accordingly, if an operator of the of lubrication conditioning systems 100d is aware of the type of lubricant, L, arranged within the lubricant reservoir 102d, and, if the operator of the lubrication conditioning system 100d is aware of a desired second temperature (e.g., a temperature that is greater than "room temperature"/"ambient temperature") that the lubricant, L, should be arranged at, the operator may de/actuate the on/off switch provided by the controller 108d in order to manually maintain control over the temperature of the lubricant, L.

In another example, the controller 108d may include logic that permits automatic control over the lubrication conditioning system 100d. In an example, a processor provided by the controller 108d may be programmed with a desired second temperature (e.g., a temperature that is greater than "room temperature"/"ambient temperature") of the lubricant, L. After actuating the lubrication conditioning system 100d, the temperature of the lubricant, L, may be communicated in the form of a signal that is sent from the from the lubricant temperature sensor 106d to the controller 108d. Accordingly, the controller 108d may maintain the light source 104d in an 'on state' until the temperature of the lubricant, L, has been increased to the second temperature; upon reaching the lubricant, L, reaching the second temperature, the controller 108d may automatically switch the light source 104d to an 'off state.'

Further, in an embodiment, automatic control over the lubrication conditioning system 100d may be executed by providing the controller 108d with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108d may be provided with a user interface that permits an operator to inform the controller 108d which type of lubricant, L, is deposited into the lubricant reservoir 102d. Once the operator informs the controller 108d which type of lubricant, L, is deposited into the lubricant reservoir 102d, the controller 108d will refer to the data lookup table and automatically select the desired second temperature (e.g., a temperature that is greater than "room temperature"/"ambient temperature") associated with the lubricant, L, that was entered/selected by the operator at the user interface of the controller 108d. Accordingly, upon the operator actuating the lubrication conditioning system, the light source 104d will remain in the 'on state' until the temperature of the lubricant, L, has been adjusted to the temperature associated with the lubricant, L, in the data lookup table.

In a somewhat similar fashion to the exemplary embodiment described above at FIG. 5A, the lubricant reservoir 102d of the exemplary embodiment described above at FIG. 9A does not include an opening (such as a vent to atmosphere) that permits the lubricant, L, to be in direct communication with surrounding atmosphere, A. As such, the lubricant reservoir 102d is defined by an enclosure that does not permit the lubricant, L, to be in direct communication with surrounding atmosphere, A.

Although the lubricant reservoir 102d may be defined by an enclosure that does not permit the lubricant, L, to be in direct communication with surrounding atmosphere, A, the lubricant reservoir 102d may include several ports 120d, 122*d* and 124*d*, which may be referred to as one or more fluid communication ports. In some instances, the fluid communication port 120*d* may permit a source of pressurized fluid 126*d* to pressurize the cavity 105*d* formed by the lubricant reservoir 102*d*; movement of the pressurized fluid from the source of pressurized fluid 126*d* to the cavity 105*d* is permitted when a flow control valve 128*d* is arranged in an open orientation. In other instances, the fluid communication port 122*d* may permit a pressure sensor 130*d* to detect a pressurization level of the cavity 105*d* formed by the lubricant reservoir 102*d*.

In other examples, the fluid communication port 124*d* may permit the lubricant, L, contained in the cavity 105*d* to be evacuated from the lubricant reservoir 102*d*. A proximal end $132d_1$ of a conduit member 132*d* may be fluidly-connected to the fluid communication port 124*d*, and, a distal end $132d_2$ of the conduit member 132*d* may be connected to one or more of the wheel lubricating sub-station 16*a*, 16*a*" and the tire lubricating sub-station 16*b*', 16*b*". In some instances, one or more heating elements 134*d* may be connected to the conduit member 132*d* for selectively adjusting the temperature of the conduit member 132*d*. In other examples, a temperature sensor 136*d* may be disposed upon the conduit member 132*d* for determining the temperature of the conduit member 132*d*.

As seen in FIG. 9A, the controller 108*d* may also be communicatively-coupled to one or more of the source of pressurized fluid 126*d*, the flow control valve 128*d*, the pressure sensor 130*d*, the one or more heating elements 134*d* and the temperature sensor 136*d*. In an example, the controller 108*d* may send and/or receive signals to one or more of the source of pressurized fluid 126*d*, the flow control valve 128*d*, the pressure sensor 130*d*, the one or more heating elements 134*d* and the temperature sensor 136*d* as follows.

The controller 108*d* may send a signal to the flow control valve 128*d* for arranging the flow control valve 128*d* in a closed orientation, thereby denying the pressurized fluid contained by the source of pressurized fluid 126*d* to be in communication with the cavity 105*d* by way of the fluid communication port 124*d*. Upon the controller 108*d* sending a signal to the flow control valve 128*d* for arranging the flow control valve 128*d* in the open orientation, the pressurized fluid contained by the source of pressurized fluid 126*d* may be directed into the cavity 105*d* and thereby registering an amount of pressure within the cavity 105*d* that is detected by the pressure sensor 130*d*; the pressure sensor 130*d* may communicate a signal to the controller 108*d* indicating the amount of pressure within the cavity 105*d*.

After pressurizing the cavity 105*d* with the pressurized fluid contained by the source of pressurized fluid 126*d*, and, upon actuation of the applicator, S (e.g., a spray nozzle), of the wheel lubricating sub-station 16*a*, 16*a*" and/or tire lubricating sub-station 16*b*', 16*b*", the lubricant, L, may be expelled from the cavity 105*d* by way of the pressurized fluid pushing the lubricant, L, out of the fluid communication port 124*d* and through the conduit member 132*d*. In some instances, if the controller 108*d* learns (e.g., from the signal sent from the pressure sensor 130*d*) that the cavity 105*d* is insufficiently pressurized, which may impair a desired amount of expelled fluid from the applicator, S, the controller 108*d* causes the source of pressurized fluid 126*d* to increase the amount or flow rate of pressurized fluid provided to the cavity 105*d* by way of the fluid communication port 120*d*. In other examples, if the conduit member 132*d* is not sufficiently heated (which is determined by the controller 108*d* by way of a temperature signal sent from the temperature sensor 136*d* to the controller 108*d*), and, thereby cools the lubricant, L, flowing there-through, the controller 108*d* may actuate one or more heating elements 134*d* for raising the temperature of the conduit member 132*d*; upon increasing the temperature of the conduit member 132*d*, the temperature of the lubricant, L, may be maintained as the lubricant, L, is expelled from the cavity 105*d* and into the conduit member 132*d* prior to exiting the applicator, S.

Figure 9B:
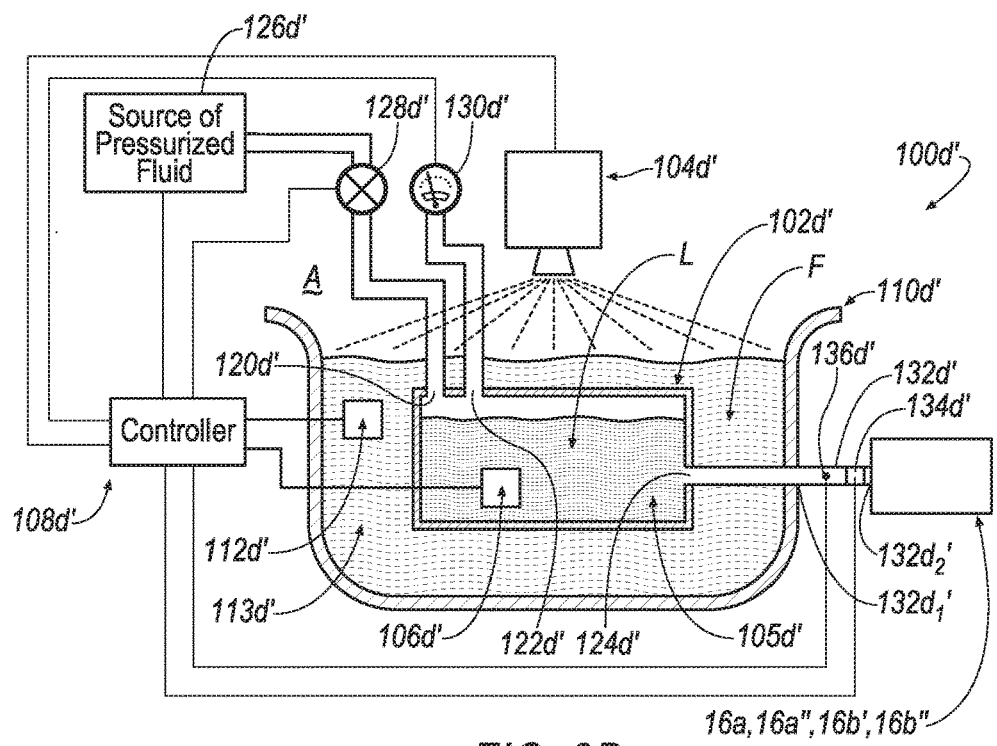
FIG. 9B is a view of a lubrication temperature control system for indirectly heating a lubricant contained by a lubricant reservoir in accordance with an exemplary embodiment of the invention.

Referring to FIG. 9B, a lubrication conditioning system 100*d'* is shown according to an embodiment of the invention. As described above, the lubrication conditioning system 100*d'* indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100*d'* includes a lubricant reservoir 102*d'*, a lubricant temperature modifier 104*d'*, a lubricant temperature sensor 106*d'*, a controller 108*d'*, a fluid container 110*d'* and a fluid temperature sensor 112*d'*. The lubricant reservoir 102*d'* contains the lubricant, L. The lubricant temperature modifier 104*d'* is arranged relative to (e.g., over) the lubricant reservoir 102*d'* and the fluid container 110*d'* in order to permit the lubricant temperature modifier 104*d'* to indirectly communicate with the lubricant, L, that is contained by the lubricant reservoir, L; indirect communication of the lubricant temperature modifier 104*d'* with the lubricant, L, is achieved by sub-merging the lubricant reservoir 102*d'* within a fluid, F, that is contained by the fluid container 110*d'*.

The lubricant temperature sensor 106*d'* may be arranged within a cavity 105*d'* formed by the lubricant reservoir 102*d'* and submerged within the lubricant, L, for detecting a temperature of the lubricant, L. The fluid temperature sensor 112*d'* may be arranged within a cavity 113*d'* formed by the fluid container 110*d'* and submerged within the fluid, F, for detecting a temperature of the fluid, F. The controller 108*d* may be communicatively coupled to the lubricant temperature modifier 104*d'*, the lubricant temperature sensor 106*d'* and the fluid temperature sensor 112*d'* for receiving temperature readings from one or more of the lubricant temperature sensor 106*d'* and the fluid temperature sensor 112*d'* in order to de/actuate the lubricant temperature modifier 104*d'* for the purpose of maintaining, increasing or decreasing the temperature of the lubricant, L.

In an implementation, the lubricant temperature modifier 104*d'* may be a light source that emits light defined by a wavelength. The light source 104*d'* may be any desirable light source, such as, for example, an incandescent light source, an infrared light source, a laser light source, or the like. Unlike the embodiment described above at FIG. 8A, the light emitted from the light source 104*d'* does not pass through an opening (see, e.g., opening 103*c* of FIG. 8A) formed by the lubricant reservoir 102*d'*, but, rather, the light impacts upon/enters the fluid, F, arranged within the fluid container 110*d'* thereby raising the temperature of the fluid, F, that surrounds the lubricant reservoir 102*d'*. Because the lubricant, L, is contained by and in direct contact with an interior surface of lubricant reservoir 102*d'*, and, because an exterior surface of the lubricant reservoir 102*d'* is in direct contact with the fluid, F, the light emitted by the light source 104*d'* that heats the fluid, F, may thereby indirectly heat the lubricant, L, contained by and in contact with the lubricant reservoir 102*d'* such that the temperature of the lubricant, L, is raised from a first temperature (e.g., "room temperature"/

"ambient temperature") to a second temperature (e.g., a temperature that is greater than "room temperature"/"ambient temperature").

In an example, the controller 108d' may include a manually-operated on/off switch to permit manual on/off switching of the light source 104d'. The controller 108d' may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor 106d' and the fluid temperature sensor 112d' to the controller 108d'. Accordingly, if an operator of the of lubrication conditioning systems 100d' is aware of the type of lubricant, L, arranged within the lubricant reservoir 102d', and, if the operator of the lubrication conditioning system 100d' is aware of a desired second temperature (e.g., a temperature that is greater than "room temperature"/"ambient temperature") that the lubricant, L, should be arranged at, the operator may de/actuate the on/off switch provided by the controller 108d' in order to manually maintain control over the temperature of the lubricant, L.

In another example, the controller 108d' may include logic that permits automatic control over the lubrication conditioning system 100d'. In an example, a processor provided by the controller 108d' may be programmed with a desired second temperature (e.g., a temperature that is greater than "room temperature"/"ambient temperature") of the lubricant, L. After actuating the lubrication conditioning system 100d', the temperature of the lubricant, L, may be communicated in the form of a signal that is sent from one or more of the lubricant temperature sensor 106d' and the fluid temperature sensor 112d' to the controller 108d'. Accordingly, the controller 108d' may maintain the light source 104d' in an 'on state' until the temperature of the lubricant, L, has been increased to the second temperature; upon reaching the lubricant, L, reaching the second temperature, the controller 108d' may automatically switch the light source 104d' to an 'off state.'

Further, in an embodiment, automatic control over the lubrication conditioning system 100d' may be executed by providing the controller 108d' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108d' may be provided with a user interface that permits an operator to inform the controller 108d' which type of lubricant, L, is deposited into the lubricant reservoir 102d'. Once the operator informs the controller 108d' which type of lubricant, L, is deposited into the lubricant reservoir 102d', the controller 108d' will refer to the data lookup table and automatically select the desired second temperature (e.g., a temperature that is greater than "room temperature"/ "ambient temperature") associated with the lubricant, L, that was entered/selected by the operator at the user interface of the controller 108d'. Accordingly, upon the operator actuating the lubrication conditioning system, the light source 104d' will remain in the 'on state' until the temperature of the lubricant, L, has been adjusted to the temperature associated with the lubricant, L, in the data lookup table.

In a somewhat similar fashion to the exemplary embodiment described above at FIG. 5B, the lubricant reservoir 102d' of the exemplary embodiment described above at FIG. 9B does not include an opening (such as a vent to atmosphere) that permits the lubricant, L, to be in direct communication with surrounding atmosphere, A. As such, the lubricant reservoir 102d' is defined by an enclosure that does not permit the lubricant, L, to be in direct communication with surrounding atmosphere, A.

Although the lubricant reservoir 102d' may be defined by an enclosure that does not permit the lubricant, L, to be in direct communication with surrounding atmosphere, A, the lubricant reservoir 102d' may include several ports 120d', 122d' and 124d', which may be referred to as one or more fluid communication ports. In some instances, the fluid communication port 120d' may permit a source of pressurized fluid 126d' to pressurize the cavity 105d' formed by the lubricant reservoir 102d'; movement of the pressurized fluid from the source of pressurized fluid 126d' to the cavity 105d' is permitted when a flow control valve 128d' is arranged in an open orientation. In other instances, the fluid communication port 122d' may permit a pressure sensor 130d' to detect a pressurization level of the cavity 105d' formed by the lubricant reservoir 102d'.

In other examples, the fluid communication port 124d' may permit the lubricant, L, contained in the cavity 105d' to be evacuated from the lubricant reservoir 102d'. A proximal end 132d₁' of a conduit member 132d' may be fluidly-connected to the fluid communication port 124d', and, a distal end 132d₂' of the conduit member 132d' may be connected to one or more of the wheel lubricating sub-station 16a, 16a" and the tire lubricating sub-station 16b', 16b". In some instances, one or more heating elements 134d' may be connected to the conduit member 132d' for selectively adjusting the temperature of the conduit member 132d'. In other examples, a temperature sensor 136d' may be disposed upon the conduit member 132d' for determining the temperature of the conduit member 132d'.

As seen in FIG. 9B, the controller 108d' may also be communicatively-coupled to one or more of the source of pressurized fluid 126d', the flow control valve 128d', the pressure sensor 130d', the one or more heating elements 134d' and the temperature sensor 136d'. In an example, the controller 108d' may send and/or receive signals to one or more of the source of pressurized fluid 126d', the flow control valve 128d', the pressure sensor 130d', the one or more heating elements 134d' and the temperature sensor 136d' as follows.

The controller 108d' may send a signal to the flow control valve 128d' for arranging the flow control valve 128d' in a closed orientation, thereby denying the pressurized fluid contained by the source of pressurized fluid 126d' to be in communication with the cavity 105d' by way of the fluid communication port 124d'. Upon the controller 108d' sending a signal to the flow control valve 128d' for arranging the flow control valve 128d' in the open orientation, the pressurized fluid contained by the source of pressurized fluid 126d' may be directed into the cavity 105d' and thereby registering an amount of pressure within the cavity 105d' that is detected by the pressure sensor 130d'; the pressure sensor 130d' may communicate a signal to the controller 108d' indicating the amount of pressure within the cavity 105d'.

After pressurizing the cavity 105d' with the pressurized fluid contained by the source of pressurized fluid 126d', and, upon actuation of the applicator, S (e.g., a spray nozzle), of the wheel lubricating sub-station 16a, 16a" and/or tire lubricating sub-station 16b', 16b", the lubricant, L, may be expelled from the cavity 105d' by way of the pressurized fluid pushing the lubricant, L, out of the fluid communication port 124d' and through the conduit member 132d'. In some instances, if the controller $108d'$ learns (e.g., from the signal sent from the pressure sensor $130d'$) that the cavity $105d'$ is insufficiently pressurized, which may impair a desired amount of expelled fluid from the applicator, S, the controller $108d'$ causes the source of pressurized fluid $126d'$ to increase the amount or flow rate of pressurized fluid provided to the cavity $105d'$ by way of the fluid communication port $120d'$. In other examples, if the conduit member $132d'$ is not sufficiently heated (which is determined by the controller $108d'$ by way of a temperature signal sent from the temperature sensor $136d'$ to the controller $108d'$), and, thereby cools the lubricant, L, flowing there-through, the controller $108d'$ may actuate one or more heating elements $134d'$ for raising the temperature of the conduit member $132d'$; upon increasing the temperature of the conduit member $132d'$, the temperature of the lubricant, L, may be maintained as the lubricant, L, is expelled from the cavity $105d'$ and into the conduit member $132d'$ prior to exiting the applicator, S.

Figure 9C:
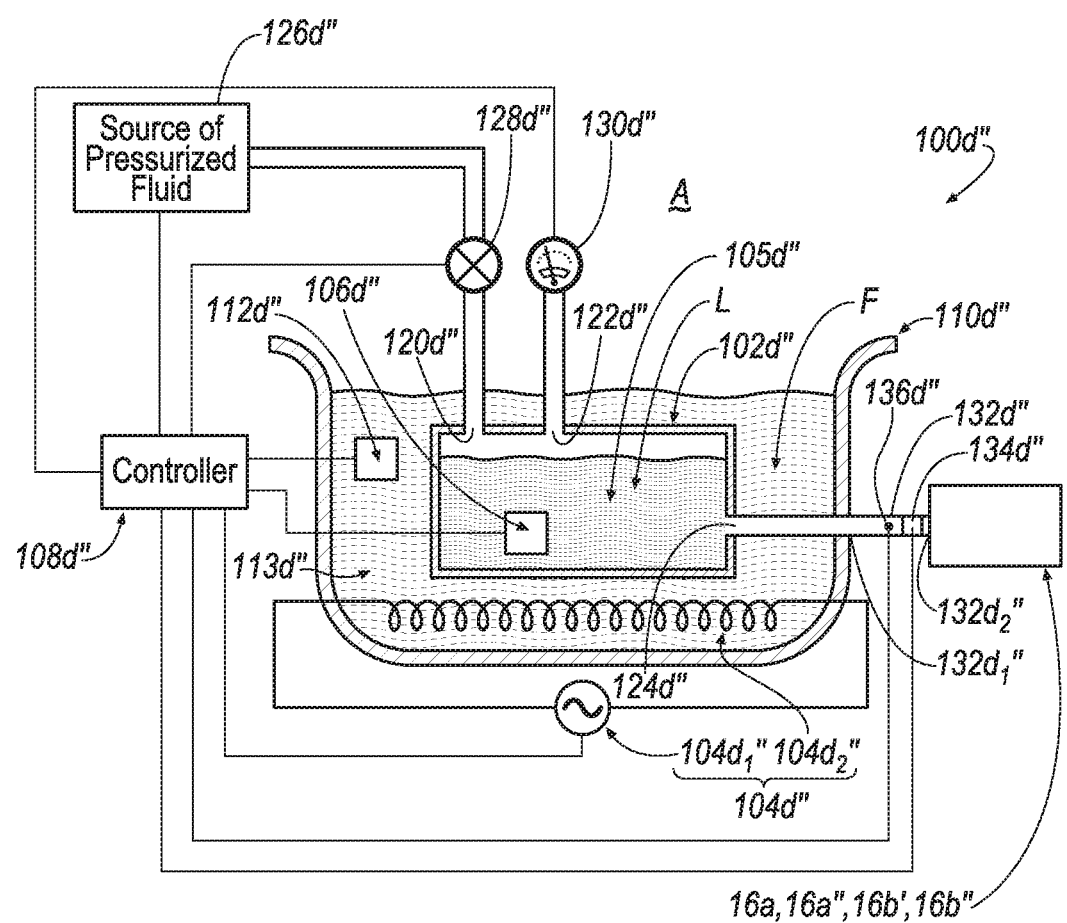
FIG. 9C is a view of a lubrication temperature control system for indirectly heating a lubricant contained by a lubricant reservoir in accordance with an exemplary embodiment of the invention.

Referring to FIG. 9C, a lubrication conditioning system $100d''$ is shown according to an embodiment of the invention. As described above, the lubrication conditioning system $100d''$ indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system $100d''$ includes a lubricant reservoir $102d''$, a lubricant temperature modifier $104d''$, a lubricant temperature sensor $106d''$, a controller $108d''$, a fluid container $110d''$ and a fluid temperature sensor $112d''$. The lubricant reservoir $102d''$ contains the lubricant, L. At least a portion (see, e.g., $104d_2''$) of the lubricant temperature modifier $104d''$ is arranged within a cavity $113d''$ formed by the fluid container $110d''$ and submerged within a fluid, F, contained by the fluid container $110d''$ in order to permit the lubricant temperature modifier $104d''$ to indirectly communicate with the lubricant, L; indirect communication of the lubricant temperature modifier $104d''$ with the lubricant, L, is achieved by submerging the lubricant reservoir $102d''$ containing the lubricant, L, within the fluid, F, that is contained within the cavity $113d''$ of the fluid container $110d''$.

The lubricant temperature sensor $106d''$ may be arranged within a cavity $105d''$ formed by the lubricant reservoir $102d''$ and submerged within the lubricant, L, for detecting a temperature of the lubricant, L. The fluid temperature sensor $112d''$ may be arranged within the cavity $113d''$ formed by the fluid container $110d''$ and submerged within the fluid, F, for detecting a temperature of the fluid, F.

The controller $108d''$ may be communicatively coupled to the lubricant temperature modifier $104d''$, the lubricant temperature sensor $106d''$ and the fluid temperature sensor $112d''$ for receiving temperature readings from one or more of the lubricant temperature sensor $106d''$ and the fluid temperature sensor $112d''$ in order to de/actuate the lubricant temperature modifier $104d''$ for the purpose of maintaining, increasing or decreasing the temperature of the lubricant, L.

In an implementation, the lubricant temperature modifier $104d''$ may include an electrical source (e.g., a current source) $104d_1''$ connected to a heating coil $104d_2''$. In an example, the controller $108d''$ may include a manually-operated on/off switch to permit manual on/off switching of the electrical source $104d_1''$ connected to the heating coil $104d_2''$. The controller $108d''$ may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor $106d''$ and the fluid temperature sensor $112d''$ to the controller $108d''$. Accordingly, if an operator of the of lubrication conditioning systems $100d''$ is aware of the type of lubricant, L, arranged within the lubricant reservoir $102d''$, and, if the operator of the lubrication conditioning system $100d''$ is aware of a desired second temperature (e.g., a temperature that is greater than "room temperature"/"ambient temperature") that the lubricant, L, should be arranged at, the operator may de/actuate the on/off switch provided by the controller $108d''$ in order to manually maintain control over the temperature of the lubricant, L. Once the electrical source $104d_1''$ is actuated, the electrical source $104d_1''$ may cause the heating coil $104d_2''$ to be heated; because the fluid, F, is in direct contact with the heating coil $104d_2''$, the heating coil $104d_2''$ may directly heat the fluid, F. Because the lubricant reservoir $102d''$ is in direct contact with the fluid, F, the lubricant, L, contained within lubricant reservoir $102d''$ is also heated, thereby raising the temperature of the lubricant, L, from a first temperature (e.g., "room temperature"/"ambient temperature") to a second temperature (e.g., a temperature that is greater than "room temperature"/"ambient temperature").

In another example, the controller $108d''$ may include logic that permits automatic control over the lubrication conditioning system $100d''$. In an example, a processor provided by the controller $108d''$ may be programmed with a desired second temperature (e.g., a temperature that is greater than "room temperature"/"ambient temperature") of the lubricant, L. After actuating the lubrication conditioning system $100d''$, the temperature of the lubricant, L, may be communicated in the form of a signal that is sent from one or more of the lubricant temperature sensor $106d''$ and the fluid temperature sensor $112d''$ to the controller $108d''$. Accordingly, the controller $108d''$ may maintain the electrical source $104d_1''$ connected to the heating coil $104d_2''$ in an 'on state' until the temperature of the lubricant, L, has been increased to the second temperature; upon reaching the lubricant, L, reaching the second temperature, the controller $108d''$ may automatically switch the electrical source $104d_1''$ connected to the heating coil $104d_2''$ to an 'off state.'

Further, in an embodiment, automatic control over the lubrication conditioning system $100d''$ may be executed by providing the controller $108d''$ with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller $108d''$ may be provided with a user interface that permits an operator to inform the controller $108d''$ which type of lubricant, L, is deposited into the lubricant reservoir $102d''$. Once the operator informs the controller $108d''$ which type of lubricant, L, is deposited into the lubricant reservoir $102d''$, the controller $108d''$ will refer to the data lookup table and automatically select the desired second temperature (e.g., a temperature that is greater than "room temperature"/"ambient temperature") associated with the lubricant, L, that was entered/selected by the operator at the user interface of the controller $108d''$. Accordingly, upon the operator actuating the lubrication conditioning system, the electrical source $104d_1''$ connected to the heating coil $104d_2''$ will remain in the 'on state' until the temperature of the lubricant, L, has been adjusted to the temperature associated with the lubricant, L, in the data lookup table.

In a somewhat similar fashion to the exemplary embodiment described above at FIG. 5C, the lubricant reservoir 102$d''$ of the exemplary embodiment described above at FIG. 9C does not include an opening (such as a vent to atmosphere) that permits the lubricant, L, to be in direct communication with surrounding atmosphere, A. As such, the lubricant reservoir 102$d''$ is defined by an enclosure that does not permit the lubricant, L, to be in direct communication with surrounding atmosphere, A.

Although the lubricant reservoir 102$d''$ may be defined by an enclosure that does not permit the lubricant, L, to be in direct communication with surrounding atmosphere, A, the lubricant reservoir 102$d''$ may include several ports 120$d''$, 122$d''$ and 124$d''$, which may be referred to as one or more fluid communication ports. In some instances, the fluid communication port 120$d''$ may permit a source of pressurized fluid 126$d''$ to pressurize the cavity 105$d''$ formed by the lubricant reservoir 102$d''$; movement of the pressurized fluid from the source of pressurized fluid 126$d''$ to the cavity 105$d''$ is permitted when a flow control valve 128$d''$ is arranged in an open orientation. In other instances, the fluid communication port 122$d''$ may permit a pressure sensor 130$d''$ to detect a pressurization level of the cavity 105$d''$ formed by the lubricant reservoir 102$d''$.

In other examples, the fluid communication port 124$d''$ may permit the lubricant, L, contained in the cavity 105$d''$ to be evacuated from the lubricant reservoir 102$d''$. A proximal end 132$d_1''$ of a conduit member 132$d''$ may be fluidly-connected to the fluid communication port 124$d''$, and, a distal end 132$d_2''$ of the conduit member 132$d''$ may be connected to one or more of the wheel lubricating sub-station 16$a$, 16$a''$ and the tire lubricating sub-station 16$b'$, 16$b''$. In some instances, one or more heating elements 134$d''$ may be connected to the conduit member 132$d''$ for selectively adjusting the temperature of the conduit member 132$d''$. In other examples, a temperature sensor 136$d''$ may be disposed upon the conduit member 132$d''$ for determining the temperature of the conduit member 132$d''$.

As seen in FIG. 9C, the controller 108$d''$ may also be communicatively-coupled to one or more of the source of pressurized fluid 126$d''$, the flow control valve 128$d''$, the pressure sensor 130$d''$, the one or more heating elements 134$d''$ and the temperature sensor 136$d''$. In an example, the controller 108$d''$ may send and/or receive signals to one or more of the source of pressurized fluid 126$d''$, the flow control valve 128$d''$, the pressure sensor 130$d''$, the one or more heating elements 134$d''$ and the temperature sensor 136$d''$ as follows.

The controller 108$d''$ may send a signal to the flow control valve 128$d''$ for arranging the flow control valve 128$d''$ in a closed orientation, thereby denying the pressurized fluid contained by the source of pressurized fluid 126$d''$ to be in communication with the cavity 105$d''$ by way of the fluid communication port 124$d''$. Upon the controller 108$d''$ sending a signal to the flow control valve 128$d''$ for arranging the flow control valve 128$d''$ in the open orientation, the pressurized fluid contained by the source of pressurized fluid 126$d''$ may be directed into the cavity 105$d''$ and thereby registering an amount of pressure within the cavity 105$d''$ that is detected by the pressure sensor 130$d''$; the pressure sensor 130$d''$ may communicate a signal to the controller 108$d''$ indicating the amount of pressure within the cavity 105$d''$.

After pressurizing the cavity 105$d''$ with the pressurized fluid contained by the source of pressurized fluid 126$d''$, and, upon actuation of the applicator, S (e.g., a spray nozzle), of the wheel lubricating sub-station 16$a$, 16$a''$ and/or tire lubricating sub-station 16$b'$, 16$b''$, the lubricant, L, may be expelled from the cavity 105$d''$ by way of the pressurized fluid pushing the lubricant, L, out of the fluid communication port 124$d''$ and through the conduit member 132$d''$. In some instances, if the controller 108$d''$ learns (e.g., from the signal sent from the pressure sensor 130$d''$) that the cavity 105$d''$ is insufficiently pressurized, which may impair a desired amount of expelled fluid from the applicator, S, the controller 108$d''$ causes the source of pressurized fluid 126$d''$ to increase the amount or flow rate of pressurized fluid provided to the cavity 105$d''$ by way of the fluid communication port 120$d''$. In other examples, if the conduit member 132$d''$ is not sufficiently heated (which is determined by the controller 108$d''$ by way of a temperature signal sent from the temperature sensor 136$d''$ to the controller 108$d''$), and, thereby cools the lubricant, L, flowing there-through, the controller 108$d''$ may actuate one or more heating elements 134$d''$ for raising the temperature of the conduit member 132$d''$; upon increasing the temperature of the conduit member 132$d''$, the temperature of the lubricant, L, may be maintained as the lubricant, L, is expelled from the cavity 105$d''$ and into the conduit member 132$d''$ prior to exiting the applicator, S.

Figure 9D:
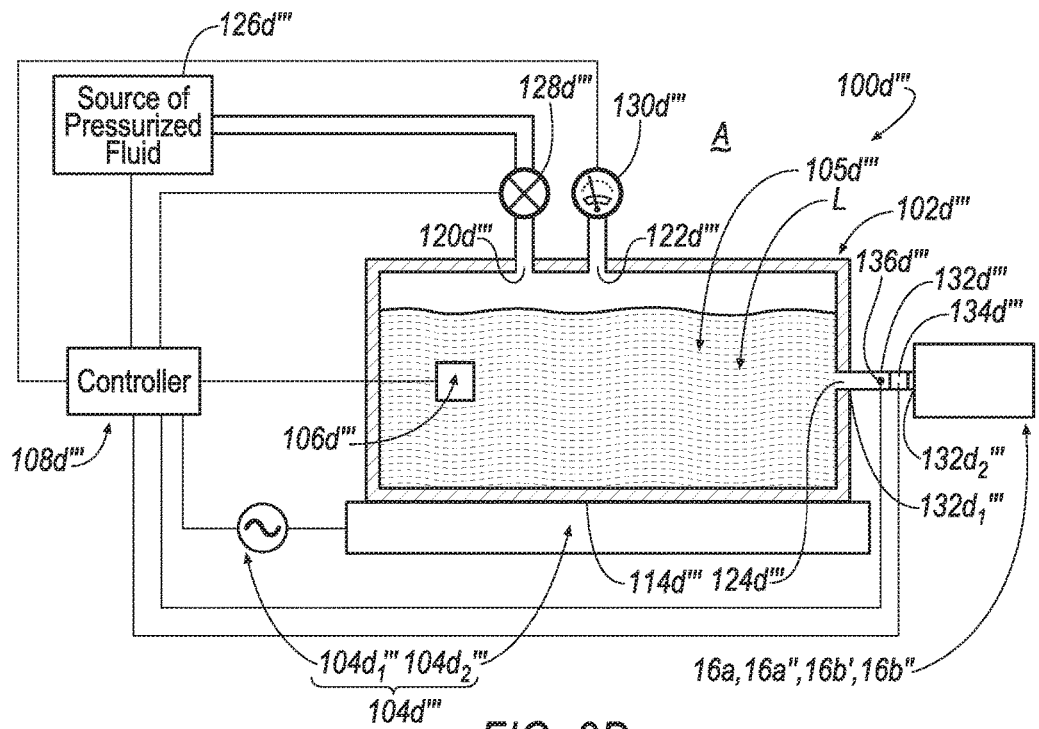
FIG. 9D is a view of a lubrication temperature control system for indirectly heating a lubricant contained by a lubricant reservoir in accordance with an exemplary embodiment of the invention.

Referring to FIG. 9D, a lubrication conditioning system 100$d'''$ is shown according to an embodiment of the invention. As described above, the lubrication conditioning system 100$d'''$ indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100$d'''$ includes a lubricant reservoir 102$d'''$, a lubricant temperature modifier 104$d'''$, a lubricant temperature sensor 106$d'''$ and a controller 108$d'''$. The lubricant reservoir 102$d'''$ contains the lubricant, L. Unlike the lubrication conditioning systems 100$c$, 100$c'$, 100$d$, 100$d'$, 100$d''$ described above, the lubricant temperature modifier 104$d'''$ is not submerged within the lubricant, L, or the fluid, F, nor is the lubricant temperature modifier 104$d'''$ arranged in a spaced apart relationship with respect to, lubricant reservoir 102$c$, 102$c'$, 102$d$, 102$d'$, 102$d''$ and/or fluid container 102$d'$, 102$d''$; rather, a portion (see, e.g., 104$d_2'$) of the lubricant temperature modifier 104$d'''$ is disposed directly adjacent an exterior surface 114$d'''$ of the lubricant reservoir 102$d'''$. Accordingly, as a result of the lubricant temperature modifier 104$d'''$ being arranged directly adjacent the exterior surface 114$d'''$ of the lubricant reservoir 102$d'''$, the portion 104$d_2'''$ of the lubricant temperature modifier 104$d'''$ permits the lubricant temperature modifier 104$d'''$ to indirectly communicate with the lubricant, L, by way of the material defined by lubricant reservoir 102$d'''$.

The lubricant temperature sensor 106$d'''$ may be arranged within a cavity 105$d'''$ formed by the lubricant reservoir 102$d'''$ and submerged within the lubricant, L, for detecting a temperature of the lubricant, L. The controller 108$d'''$ may be communicatively coupled to the lubricant temperature modifier 104$d'''$ and the lubricant temperature sensor 106$d'''$ for receiving temperature readings from the lubricant temperature sensor 106$d'''$ in order to de/actuate the lubricant temperature modifier 104$d'''$ for the purpose of maintaining, increasing or decreasing the temperature of the lubricant, L.

In an implementation, the lubricant temperature modifier 104$d'''$ may include an electrical source (e.g., a current source) 104$d_1'''$ connected to a hot plate 104$d_2'''$. In an example, the controller 108$d'''$ may include a manually-operated on/off switch to permit manual on/off switching of the electrical source $104d_1'''$ connected to the hot plate $104d_2'''$. The controller $108d'''$ may also include a display that displays the temperature of the lubricant, L; the temperature of the lubricant, L, may be communicated in the form of a signal that is sent from the from the lubricant temperature sensor $106d'''$ to the controller $108d'''$. Accordingly, if an operator of the of lubrication conditioning systems $100d'''$ is aware of the type of lubricant, L, arranged within the lubricant reservoir $102d'''$, and, if the operator of the lubrication conditioning system $100d'''$ is aware of a desired second temperature (e.g., a temperature that is greater than "room temperature"/"ambient temperature") that the lubricant, L, should be arranged at, the operator may de/actuate the on/off switch provided by the controller $108d'''$ in order to manually maintain control over the temperature of the lubricant, L. Once the electrical source $104d_1'''$ is actuated, the electrical source $104d_1'''$ may cause the hot plate $104d_2'''$ to be heated; because the exterior surface $114d'''$ of the lubricant reservoir $102d'''$ is in direct contact with the hot plate $104d_2'''$, the hot plate $104d_2'''$ may directly heat the material defining the lubricant reservoir $102d'''$; because the lubricant reservoir $102d'''$ is in direct contact with the lubricant, L, the lubricant, L, is also heated, thereby raising the temperature of the lubricant, L, from a first temperature (e.g., "room temperature"/"ambient temperature") to a second temperature (e.g., a temperature that is greater than "room temperature"/"ambient temperature").

In another example, the controller $108d'''$ may include logic that permits automatic control over the lubrication conditioning system $100d'''$. In an example, a processor provided by the controller $108d'''$ may be programmed with a desired second temperature (e.g., a temperature that is greater than "room temperature"/"ambient temperature") of the lubricant, L. After actuating the lubrication conditioning system $100d'''$, the temperature of the lubricant, L, may be communicated in the form of a signal that is sent from the lubricant temperature sensor $106d'''$ to the controller $108d'''$. Accordingly, the controller $108d'''$ may maintain the electrical source $104d_1'''$ connected to the hot plate $104d_2'''$ in an 'on state' until the temperature of the lubricant, L, has been increased to the second temperature; upon reaching the lubricant, L, reaching the second temperature, the controller $108d'''$ may automatically switch the hot plate $104d'''$ to an 'off state.'

Further, in an embodiment, automatic control over the lubrication conditioning system $100d'''$ may be executed by providing the controller $108d'''$ with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller $108d'''$ may be provided with a user interface that permits an operator to inform the controller $108d'''$ which type of lubricant, L, is deposited into the lubricant reservoir $102d'''$. Once the operator informs the controller $108d'''$ which type of lubricant, L, is deposited into the lubricant reservoir $102d'''$, the controller $108d'''$ will refer to the data lookup table and automatically select the desired second temperature (e.g., a temperature that is greater than "room temperature"/"ambient temperature") associated with the lubricant, L, that was entered/selected by the operator at the user interface of the controller $108d'''$. Accordingly, upon the operator actuating the lubrication conditioning system, the electrical source $104d_1'''$ connected to the hot plate $104d_2'''$ will remain in the 'on state' until the temperature of the lubricant, L, has been adjusted to the temperature associated with the lubricant, L, in the data lookup table.

In a somewhat similar fashion to the exemplary embodiment described above at FIG. 5D, the lubricant reservoir $102d'''$ of the exemplary embodiment described above at FIG. 9D does not include an opening (such as a vent to atmosphere) that permits the lubricant, L, to be in direct communication with surrounding atmosphere, A. As such, the lubricant reservoir $102d'''$ is defined by an enclosure that does not permit the lubricant, L, to be in direct communication with surrounding atmosphere, A.

Although the lubricant reservoir $102d'''$ may be defined by an enclosure that does not permit the lubricant, L, to be in direct communication with surrounding atmosphere, A, the lubricant reservoir $102d'''$ may include several ports $120d'''$, $122d'''$ and $124d'''$, which may be referred to as one or more fluid communication ports. In some instances, the fluid communication port $120d'''$ may permit a source of pressurized fluid $126d'''$ to pressurize the cavity $105d'''$ formed by the lubricant reservoir $102d'''$; movement of the pressurized fluid from the source of pressurized fluid $126d'''$ to the cavity $105d'''$ is permitted when a flow control valve $128d'''$ is arranged in an open orientation. In other instances, the fluid communication port $122d'''$ may permit a pressure sensor $130d'''$ to detect a pressurization level of the cavity $105d'''$ formed by the lubricant reservoir $102d'''$.

In other examples, the fluid communication port $124d'''$ may permit the lubricant, L, contained in the cavity $105d'''$ to be evacuated from the lubricant reservoir $102d'''$. A proximal end $132d_1'''$ of a conduit member $132d'''$ may be fluidly-connected to the fluid communication port $124d'''$, and, a distal end $132d_2'''$ of the conduit member $132d'''$ may be connected to one or more of the wheel lubricating sub-station $16a$, $16a''$ and the tire lubricating sub-station $16b'$, $16b''$. In some instances, one or more heating elements $134d'''$ may be connected to the conduit member $132d'''$ for selectively adjusting the temperature of the conduit member $132d'''$. In other examples, a temperature sensor $136d'''$ may be disposed upon the conduit member $132d'''$ for determining the temperature of the conduit member $132d'''$.

As seen in FIG. 9D, the controller $108d'''$ may also be communicatively-coupled to one or more of the source of pressurized fluid $126d'''$, the flow control valve $128d'''$, the pressure sensor $130d'''$, the one or more heating elements $134d'''$ and the temperature sensor $136d'''$. In an example, the controller $108d'''$ may send and/or receive signals to one or more of the source of pressurized fluid $126d'''$, the flow control valve $128d'''$, the pressure sensor $130d'''$, the one or more heating elements $134d'''$ and the temperature sensor $136d'''$ as follows.

The controller $108d'''$ may send a signal to the flow control valve $128d'''$ for arranging the flow control valve $128d'''$ in a closed orientation, thereby denying the pressurized fluid contained by the source of pressurized fluid $126d'''$ to be in communication with the cavity $105d'''$ by way of the fluid communication port $124d'''$. Upon the controller $108d'''$ sending a signal to the flow control valve $128d'''$ for arranging the flow control valve $128d'''$ in the open orientation, the pressurized fluid contained by the source of pressurized fluid $126d'''$ may be directed into the cavity $105d'''$ and thereby registering an amount of pressure within the cavity $105d'''$ that is detected by the pressure sensor $130d'''$; the pressure sensor $130d'''$ may communicate a signal to the controller $108d'''$ indicating the amount of pressure within the cavity $105d''''$.

After pressurizing the cavity $105d'''$ with the pressurized fluid contained by the source of pressurized fluid $126d'''$, and, upon actuation of the applicator, S (e.g., a spray nozzle), of the wheel lubricating sub-station 16a, 16a" and/or tire lubricating sub-station 16b', 16b", the lubricant, L, may be expelled from the cavity 105d'" by way of the pressurized fluid pushing the lubricant, L, out of the fluid communication port 124d'" and through the conduit member 132d'". In some instances, if the controller 108d'" learns (e.g., from the signal sent from the pressure sensor 130d'") that the cavity 105d'" is insufficiently pressurized, which may impair a desired amount of expelled fluid from the applicator, S, the controller 108d'" causes the source of pressurized fluid 126d'" to increase the amount or flow rate of pressurized fluid provided to the cavity 105d'" by way of the fluid communication port 120d'". In other examples, if the conduit member 132d'" is not sufficiently heated (which is determined by the controller 108d'" by way of a temperature signal sent from the temperature sensor 136d'" to the controller 108d'"), and, thereby cools the lubricant, L, flowing there-through, the controller 108d'" may actuate one or more heating elements 134d'" for raising the temperature of the conduit member 132d'"; upon increasing the temperature of the conduit member 132d'", the temperature of the lubricant, L, may be maintained as the lubricant, L, is expelled from the cavity 105d'" and into the conduit member 132d'" prior to exiting the applicator, S.

Figure 9E:
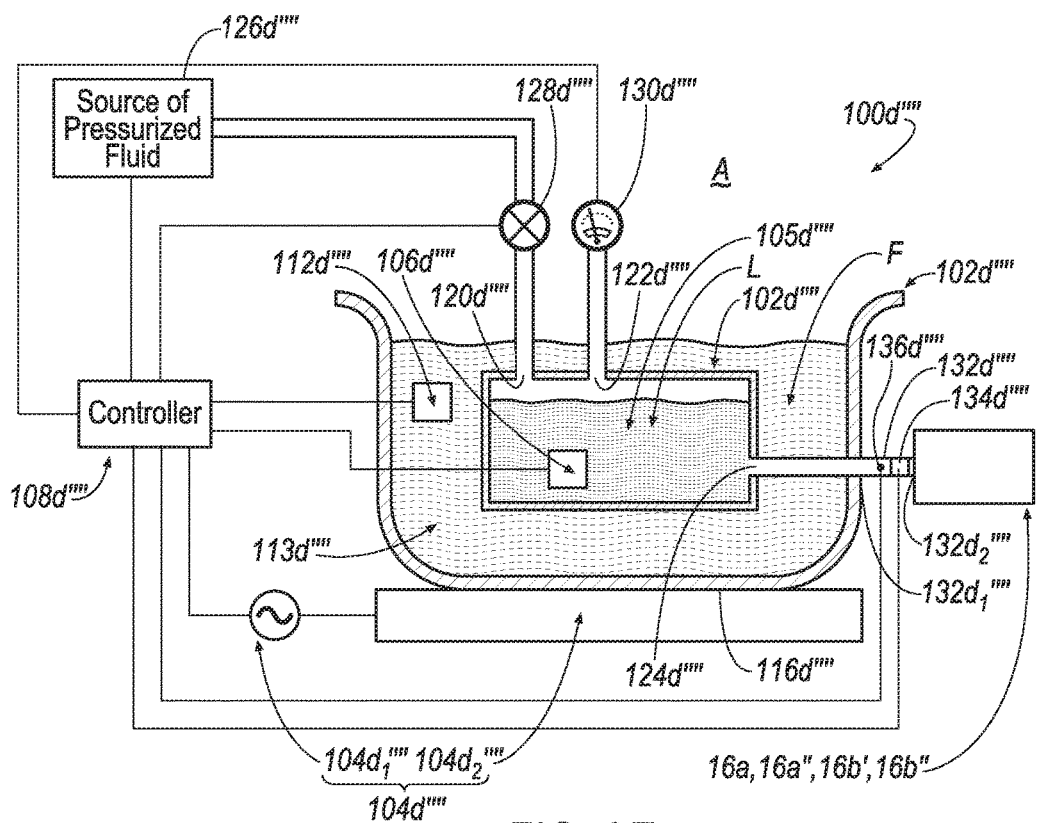
FIG. 9E is a view of a lubrication temperature control system for indirectly heating a lubricant contained by a lubricant reservoir in accordance with an exemplary embodiment of the invention.

Referring to FIG. 9E, a lubrication conditioning system 100d"" is shown according to an embodiment of the invention. As described above, the lubrication conditioning system 100d"" indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100d"" includes a lubricant reservoir 102d"", a lubricant temperature modifier 104d"", a lubricant temperature sensor 106d"", a controller 108d"", a fluid container 110d"" and a fluid temperature sensor 112d"". The lubricant reservoir 102d"" contains the lubricant, L, and the fluid container 110d"" contains a fluid, F. Unlike the lubrication conditioning systems 100c, 100c', 100d, 100d', 100d" described above, the lubricant temperature modifier 104d"" is not submerged within the lubricant, L, or the fluid, F, nor is the lubricant temperature modifier 104d"" arranged in a spaced apart relationship with respect to, lubricant reservoir 102c, 102c', 102d, 102d', 102d" and/or fluid container 102d', 102d"; rather, a portion (see, e.g., $104d_2$"") of the lubricant temperature modifier 104d"" is disposed directly adjacent an exterior surface 116d"" of the fluid container 110d"". Accordingly, as a result of the portion $104d_2$"" of the temperature modifier 104d"" being arranged directly adjacent the exterior surface 116d"" of the fluid container 110d"", the portion $104d_2$"" of the lubricant temperature modifier 104d"" permits the lubricant temperature modifier 104d"" to indirectly communicate with the lubricant, L, by way of: the material defining the lubricant reservoir 102d"", the material defining the fluid container 110d"" and the fluid, F, that is contained by the fluid container 110d"" that surrounds the lubricant reservoir 102d"".

The lubricant temperature sensor 106d"" may be arranged within a cavity 105d"" formed by the lubricant reservoir 102d"" and submerged within the lubricant, L, for detecting a temperature of the lubricant, L. The fluid temperature sensor 112d"" may be arranged within the cavity 113d"" formed by the fluid container 110d"" and submerged within the fluid, F, for detecting a temperature of the fluid, F.

The controller 108d"" may be communicatively coupled to the lubricant temperature modifier 104d"", the lubricant temperature sensor 106d"" and the fluid temperature sensor 112d"" for receiving temperature readings from one or more of the lubricant temperature sensor 106d"" and the fluid temperature sensor 112d"" in order to de/actuate the lubricant temperature modifier 104d"" for the purpose of maintaining, increasing or decreasing the temperature of the lubricant, L.

In an implementation, the lubricant temperature modifier 104d"" may include an electrical source (e.g., a current source) $104d_1$"" connected to a hot plate $104d_2$"". In an example, the controller 108d"" may include a manually-operated on/off switch to permit manual on/off switching of the electrical source $104d_1$"" connected to the hot plate $104d_2$"". The controller 108d"" may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor 106d"" and the fluid temperature sensor 112d"" to the controller 108d"". Accordingly, if an operator of the of lubrication conditioning systems 100d"" is aware of the type of lubricant, L, arranged within the lubricant reservoir 102d"", and, if the operator of the lubrication conditioning system 100d"" is aware of a desired second temperature (e.g., a temperature that is greater than "room temperature"/"ambient temperature") that the lubricant, L, should be arranged at, the operator may de/actuate the on/off switch provided by the controller 108d"" in order to manually maintain control over the temperature of the lubricant, L. Once the electrical source $104d_1$"" is actuated, the electrical source $104d_1$"" may cause the hot plate $104d_2$"" to be heated; because the exterior surface 116d"" of the fluid container 110d"" is in direct contact with the hot plate $104d_2$"", the hot plate $104d_2$"" may directly heat the fluid, F. Because the lubricant reservoir 102d"" is in direct contact with the exterior surface 116d"" of the fluid container 110d"", which contains the fluid, F, the lubricant, L, contained within lubricant reservoir 102d"" and submerged within the fluid, F, is also heated, thereby raising the temperature of the lubricant, L, from a first temperature (e.g., "room temperature"/"ambient temperature") to a second temperature (e.g., a temperature that is greater than "room temperature"/"ambient temperature").

In another example, the controller 108d"" may include logic that permits automatic control over the lubrication conditioning system 100d"". In an example, a processor provided by the controller 108d"" may be programmed with a desired second temperature (e.g., a temperature that is greater than "room temperature"/"ambient temperature") of the lubricant, L. After actuating the lubrication conditioning system 100d"", the temperature of the lubricant, L, may be communicated in the form of a signal that is sent from one or more of the lubricant temperature sensor 106d"" and the fluid temperature sensor 112d"" to the controller 108d"". Accordingly, the controller 108d"" may maintain the electrical source $104d_1$"" connected to the hot plate $104d_2$"" in an 'on state' until the temperature of the lubricant, L, has been increased to the second temperature; upon reaching the lubricant, L, reaching the second temperature, the controller 108d"" may automatically switch the hot plate 104d"" to an 'off state.'

Further, in an embodiment, automatic control over the lubrication conditioning system 100d"" may be executed by providing the controller 108d"" with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108d'''' may be provided with a user interface that permits an operator to inform the controller 108d'''' which type of lubricant, L, is deposited into the lubricant reservoir 102d''''. Once the operator informs the controller 108d'''' which type of lubricant, L, is deposited into the lubricant reservoir 102d'''', the controller 108d'''' will refer to the data lookup table and automatically select the desired second temperature (e.g., a temperature that is greater than "room temperature"/"ambient temperature") associated with the lubricant, L, that was entered/selected by the operator at the user interface of the controller 108d''''. Accordingly, upon the operator actuating the lubrication conditioning system, the electrical source $104d_1$'''' connected to the hot plate $104d_2$'''' will remain in the 'on state' until the temperature of the lubricant, L, has been adjusted to the temperature associated with the lubricant, L, in the data lookup table.

In a somewhat similar fashion to the exemplary embodiment described above at FIG. 5E, the lubricant reservoir 102d'''' of the exemplary embodiment described above at FIG. 9E does not include an opening (such as a vent to atmosphere) that permits the lubricant, L, to be in direct communication with surrounding atmosphere, A. As such, the lubricant reservoir 102d'''' is defined by an enclosure that does not permit the lubricant, L, to be in direct communication with surrounding atmosphere, A.

Although the lubricant reservoir 102d'''' may be defined by an enclosure that does not permit the lubricant, L, to be in direct communication with surrounding atmosphere, A, the lubricant reservoir 102d'''' may include several ports 120d'''', 122d'''' and 124d'''', which may be referred to as one or more fluid communication ports. In some instances, the fluid communication port 120d'''' may permit a source of pressurized fluid 126d'''' to pressurize the cavity 105d'''' formed by the lubricant reservoir 102d''''; movement of the pressurized fluid from the source of pressurized fluid 126d'''' to the cavity 105d'''' is permitted when a flow control valve 128d'''' is arranged in an open orientation. In other instances, the fluid communication port 122d'''' may permit a pressure sensor 130d'''' to detect a pressurization level of the cavity 105d'''' formed by the lubricant reservoir 102d''''.

In other examples, the fluid communication port 124d'''' may permit the lubricant, L, contained in the cavity 105d'''' to be evacuated from the lubricant reservoir 102d''''. A proximal end $132d_1$'''' of a conduit member 132d'''' may be fluidly-connected to the fluid communication port 124d''', and, a distal end $132d_2$'''' of the conduit member 132d'''' may be connected to one or more of the wheel lubricating sub-station 16a, 16a" and the tire lubricating sub-station 16b', 16b". In some instances, one or more heating elements 134d'''' may be connected to the conduit member 132d'''' for selectively adjusting the temperature of the conduit member 132d''''. In other examples, a temperature sensor 136d'''' may be disposed upon the conduit member 132d'''' for determining the temperature of the conduit member 132d''''.

As seen in FIG. 9E, the controller 108d'''' may also be communicatively-coupled to one or more of the source of pressurized fluid 126d'''', the flow control valve 128d'''', the pressure sensor 130d'''', the one or more heating elements 134d'''' and the temperature sensor 136d''''. In an example, the controller 108d''' may send and/or receive signals to one or more of the source of pressurized fluid 126d'''', the flow control valve 128d'''', the pressure sensor 130d'''', the one or more heating elements 134d'''' and the temperature sensor 136d'''' as follows.

The controller 108d'''' may send a signal to the flow control valve 128d'''' for arranging the flow control valve 128d'''' in a closed orientation, thereby denying the pressurized fluid contained by the source of pressurized fluid 126d'''' to be in communication with the cavity 105d'''' by way of the fluid communication port 124d''''. Upon the controller 108d'''' sending a signal to the flow control valve 128d'''' for arranging the flow control valve 128d'''' in the open orientation, the pressurized fluid contained by the source of pressurized fluid 126d'''' may be directed into the cavity 105d'''' and thereby registering an amount of pressure within the cavity 105d'''' that is detected by the pressure sensor 130d''''; the pressure sensor 130d'''' may communicate a signal to the controller 108d'''' indicating the amount of pressure within the cavity 105d''''.

After pressurizing the cavity 105d'''' with the pressurized fluid contained by the source of pressurized fluid 126d'''', and, upon actuation of the applicator, S (e.g., a spray nozzle), of the wheel lubricating sub-station 16a, 16a" and/or tire lubricating sub-station 16b', 16b", the lubricant, L, may be expelled from the cavity 105d'''' by way of the pressurized fluid pushing the lubricant, L, out of the fluid communication port 124d'''' and through the conduit member 132d''''. In some instances, if the controller 108d'''' learns (e.g., from the signal sent from the pressure sensor 130d'''') that the cavity 105d'''' is insufficiently pressurized, which may impair a desired amount of expelled fluid from the applicator, S, the controller 108d'''' causes the source of pressurized fluid 126d'''' to increase the amount or flow rate of pressurized fluid provided to the cavity 105d'''' by way of the fluid communication port 120d''''. In other examples, if the conduit member 132d'''' is not sufficiently heated (which is determined by the controller 108d'''' by way of a temperature signal sent from the temperature sensor 136d'''' to the controller 108d''''), and, thereby cools the lubricant, L, flowing there-through, the controller 108d'''' may actuate one or more heating elements 134d'''' for raising the temperature of the conduit member 132d''''; upon increasing the temperature of the conduit member 132d'''', the temperature of the lubricant, L, may be maintained as the lubricant, L, is expelled from the cavity 105d'''' and into the conduit member 132d'''' prior to exiting the applicator, S.

Figure 9F:
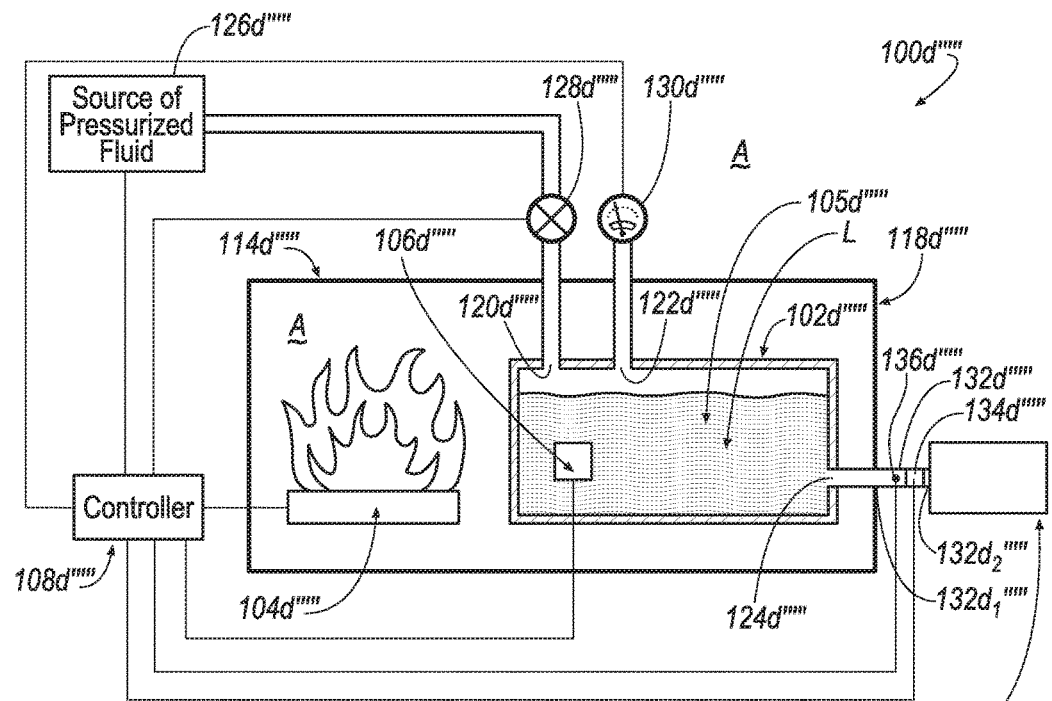
FIG. 9F is a view of a lubrication temperature control system for indirectly heating a lubricant contained by a lubricant reservoir in accordance with an exemplary embodiment of the invention.

Referring to FIG. 9F, a lubrication conditioning system 100d'''' is shown according to an embodiment of the invention. As described above, the lubrication conditioning system 100d'''' indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100d'''' includes a lubricant reservoir 102d'''', a lubricant temperature modifier 104d'''', a lubricant temperature sensor 106d'''', a controller 108d'''' and an enclosed housing 118d''''. The lubricant reservoir 102d'''' contains the lubricant, L. The lubricant temperature modifier 104d'''' is arranged relative to (e.g., next to or proximate) the lubricant reservoir 102d'''' and within the enclosed housing 118d'''' along with the lubricant reservoir 102d'''' in order to permit the lubricant temperature modifier 104d'''' to indirectly communicate with the lubricant, L, that is contained by the lubricant reservoir, L. The lubricant temperature sensor 106d'''' may be arranged within a cavity 105d'''' formed by the lubricant reservoir 102d'''' and submerged within the lubricant, L, for detecting a temperature of the lubricant, L. The controller 108d'''' may be communicatively coupled to the lubricant temperature modifier 104d'''' and the lubricant temperature sensor 106d'''' for receiving temperature readings from the lubricant temperature sensor 106d'''' in order to de/actuate the lubricant temperature modifier 104d'''' for the purpose of maintaining, increasing or decreasing the temperature of the lubricant, L.

In an implementation, the lubricant temperature modifier 104d'''' may be a burner that burns a fuel (e.g., gas) in order to produce a flame. The flame heats the ambient air within the enclosed housing 118d'''' thereby raising the temperature of one or more of the lubricant reservoir 102d'''' and lubricant, L, that are arranged within the enclosed housing 118d''''. Because the lubricant, L, is arranged within the enclosed housing 118d'''', the fluid (i.e., the ambient air, A) within the enclosed housing 118d'''' may indirectly heat one or more of the lubricant reservoir 102d'''' and the lubricant, L, contained by and in contact with the lubricant reservoir 102d'''' such that the temperature of the lubricant, L, is raised from a first temperature (e.g., "room temperature"/ "ambient temperature") to a second temperature (e.g., a temperature that is greater than "room temperature"/"ambient temperature").

In an example, the controller 108d'''' may include a manually-operated on/off switch to permit manual on/off switching of the burner 104d''''. The controller 108d'''' may also include a display that displays the temperature of the lubricant, L; the temperature of the lubricant, L, may be communicated in the form of a signal that is sent from the from the lubricant temperature sensor 106d'''' to the controller 108d''''. Accordingly, if an operator of the of lubrication conditioning systems 100d'''' is aware of the type of lubricant, L, arranged within the lubricant reservoir 102d'''', and, if the operator of the lubrication conditioning system 100d'''' is aware of a desired second temperature (e.g., a temperature that is greater than "room temperature"/"ambient temperature") that the lubricant, L, should be arranged at, the operator may de/actuate the on/off switch provided by the controller 108d'''' in order to manually maintain control over the temperature of the lubricant, L.

In another example, the controller 108d'''' may include logic that permits automatic control over the lubrication conditioning system 100d''''. In an example, a processor provided by the controller 108d'''' may be programmed with a desired second temperature (e.g., a temperature that is greater than "room temperature"/"ambient temperature") of the lubricant, L. After actuating the lubrication conditioning system 100d'''', the temperature of the lubricant, L, may be communicated in the form of a signal that is sent from the from the lubricant temperature sensor 106d'''' to the controller 108d''''. Accordingly, the controller 108d'''' may maintain the burner 104d'''' in an 'on state' until the temperature of the lubricant, L, has been increased to the second temperature; upon reaching the lubricant, L, reaching the second temperature, the controller 108d'''' may automatically switch the burner 104d'''' to an 'off state.'

Further, in an embodiment, automatic control over the lubrication conditioning system 100d'''' may be executed by providing the controller 108d'''' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108d'''' may be provided with a user interface that permits an operator to inform the controller 108d'''' which type of lubricant, L, is deposited into the lubricant reservoir 102d''''. Once the operator informs the controller 108d'''' which type of lubricant, L, is deposited into the lubricant reservoir 102d'''', the controller 108d'''' will refer to the data lookup table and automatically select the desired second temperature (e.g., a temperature that is greater than "room temperature"/"ambient temperature") associated with the lubricant, L, that was entered/selected by the operator at the user interface of the controller 108d''''. Accordingly, upon the operator actuating the lubrication conditioning system, the burner 104d'''' will remain in the 'on state' until the temperature of the lubricant, L, has been adjusted to the temperature associated with the lubricant, L, in the data lookup table.

In a somewhat similar fashion to the exemplary embodiment described above at FIG. 5F, the lubricant reservoir 102d'''' of the exemplary embodiment described above at FIG. 9F does not include an opening (such as a vent to atmosphere) that permits the lubricant, L, to be in direct communication with surrounding atmosphere, A. As such, the lubricant reservoir 102d'''' is defined by an enclosure that does not permit the lubricant, L, to be in direct communication with surrounding atmosphere, A.

Although the lubricant reservoir 102d'''' may be defined by an enclosure that does not permit the lubricant, L, to be in direct communication with surrounding atmosphere, A, the lubricant reservoir 102d'''' may include several ports 120d'''', 122d'''' and 124d'''', which may be referred to as one or more fluid communication ports. In some instances, the fluid communication port 120d'''' may permit a source of pressurized fluid 126d'''' to pressurize the cavity 105d'''' formed by the lubricant reservoir 102d''''; movement of the pressurized fluid from the source of pressurized fluid 126d'''' to the cavity 105d'''' is permitted when a flow control valve 128d'''' is arranged in an open orientation. In other instances, the fluid communication port 122d'''' may permit a pressure sensor 130d'''' to detect a pressurization level of the cavity 105d'''' formed by the lubricant reservoir 102d''''.

In other examples, the fluid communication port 124d'''' may permit the lubricant, L, contained in the cavity 105d'''' to be evacuated from the lubricant reservoir 102d''''. A proximal end 132d$_1$'''' of a conduit member 132d'''' may be fluidly-connected to the fluid communication port 124d'''', and, a distal end 132d$_2$'''' of the conduit member 132d'''' may be connected to one or more of the wheel lubricating sub-station 16a, 16a'' and the tire lubricating sub-station 16b', 16b''. In some instances, one or more heating elements 134d'''' may be connected to the conduit member 132d'''' for selectively adjusting the temperature of the conduit member 132d''''. In other examples, a temperature sensor 136d'''' may be disposed upon the conduit member 132d'''' for determining the temperature of the conduit member 132d''''.

As seen in FIG. 9F, the controller 108d'''' may also be communicatively-coupled to one or more of the source of pressurized fluid 126d'''', the flow control valve 128d'''', the pressure sensor 130d'''', the one or more heating elements 134d'''' and the temperature sensor 136d''''. In an example, the controller 108d'''' may send and/or receive signals to one or more of the source of pressurized fluid 126d'''', the flow control valve 128d'''', the pressure sensor 130d'''', the one or more heating elements 134d'''' and the temperature sensor 136d'''' as follows.

The controller 108d'''' may send a signal to the flow control valve 128d'''' for arranging the flow control valve 128d'''' in a closed orientation, thereby denying the pressurized fluid contained by the source of pressurized fluid 126*d*'''' to be in communication with the cavity 105*d*'''' by way of the fluid communication port 124*d*''''. Upon the controller 108*d*'''' sending a signal to the flow control valve 128*d*'''' for arranging the flow control valve 128*d*'''' in the open orientation, the pressurized fluid contained by the source of pressurized fluid 126*d*'''' may be directed into the cavity 105*d*'''' and thereby registering an amount of pressure within the cavity 105*d*'''' that is detected by the pressure sensor 130*d*''''; the pressure sensor 130*d*'''' may communicate a signal to the controller 108*d*'''' indicating the amount of pressure within the cavity 105*d*''''.

After pressurizing the cavity 105*d*'''' with the pressurized fluid contained by the source of pressurized fluid 126*d*'''', and, upon actuation of the applicator, S (e.g., a spray nozzle), of the wheel lubricating sub-station 16*a*, 16*a*'' and/or tire lubricating sub-station 16*b*', 16*b*'', the lubricant, L, may be expelled from the cavity 105*d*'''' by way of the pressurized fluid pushing the lubricant, L, out of the fluid communication port 124*d*'''' and through the conduit member 132*d*''''. In some instances, if the controller 108*d*'''' learns (e.g., from the signal sent from the pressure sensor 130*d*'''') that the cavity 105*d*'''' is insufficiently pressurized, which may impair a desired amount of expelled fluid from the applicator, S, the controller 108*d*'''' causes the source of pressurized fluid 126*d*'''' to increase the amount or flow rate of pressurized fluid provided to the cavity 105*d*'''' by way of the fluid communication port 120*d*''''. In other examples, if the conduit member 132*d*'''' is not sufficiently heated (which is determined by the controller 108*d*'''' by way of a temperature signal sent from the temperature sensor 136*d*'''' to the controller 108*d*''''), and, thereby cools the lubricant, L, flowing there-through, the controller 108*d*'''' may actuate one or more heating elements 134*d*'''' for raising the temperature of the conduit member 132*d*''''; upon increasing the temperature of the conduit member 132*d*'''', the temperature of the lubricant, L, may be maintained as the lubricant, L, is expelled from the cavity 105*d*'''' and into the conduit member 132*d*'''' prior to exiting the applicator, S.

Figure 9G:
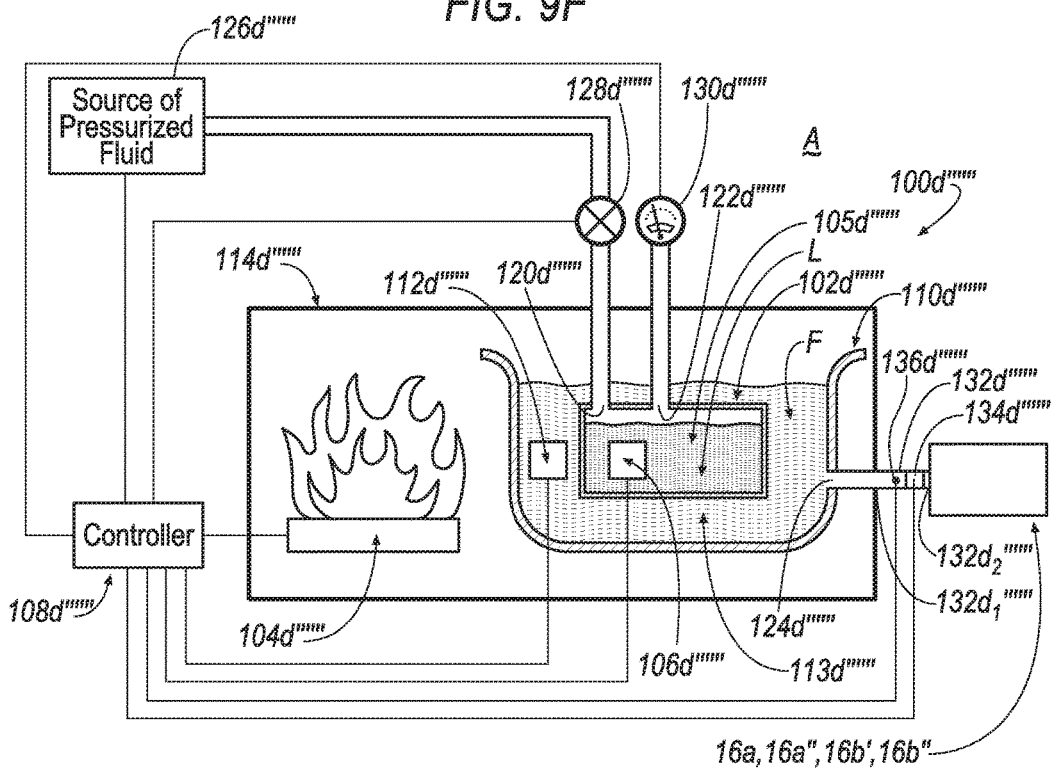
FIG. 9G is a view of a lubrication temperature control system for indirectly heating a lubricant contained by a lubricant reservoir in accordance with an exemplary embodiment of the invention.

Referring to FIG. 9G, a lubrication conditioning system 100*d*''''' is shown according to an embodiment of the invention. As described above, the lubrication conditioning system 100*d*''''' indirectly changes (e.g., increases) the temperature of the lubricant, L, from a first temperature (e.g., "room temperature"/"ambient temperature") to a second temperature (e.g., a temperature that is greater than "room temperature"/"ambient temperature").

In an example, the lubrication conditioning system 100*d*''''' includes a lubricant reservoir 102*d*''''', a lubricant temperature modifier 104*d*''''', a lubricant temperature sensor 106*d*''''', a controller 108*d*''''', a fluid container 110*d*''''', a fluid temperature sensor 112*d*''''' and an enclosed housing 118*d*'''''. The lubricant reservoir 102*d*''''' contains the lubricant, L. The lubricant temperature modifier 104*d*''''' is arranged relative to (e.g., next to or proximate) the lubricant reservoir 102*d*''''' and the fluid container 110*d*''''' within the enclosed housing 118*d*''''' in order to permit the lubricant temperature modifier 104*d*''''' to indirectly communicate with the lubricant, L, that is contained by the lubricant reservoir, L; indirect communication of the lubricant temperature modifier 104*d*''''' with the lubricant, L, is achieved by submerging the lubricant reservoir 102*d*''''' with a fluid, F, that is contained by the fluid container 110*d*'''''.

The lubricant temperature sensor 106*d*''''' may be arranged within a cavity 105*d*''''' formed by the lubricant reservoir 102*d*''''' and submerged within the lubricant, L, for detecting a temperature of the lubricant, L. The fluid temperature sensor 112*d*''''' may be arranged within a cavity 113*d*''''' formed by the fluid container 110*d*''''' and submerged within the fluid, F, for detecting a temperature of the fluid, F.

The controller 108*d*''''' may be communicatively coupled to the lubricant temperature modifier 104*d*''''', the lubricant temperature sensor 106*d*''''' and the fluid temperature sensor 112*d*''''' for receiving temperature readings from one or more of the lubricant temperature sensor 106*d*''''' and the fluid temperature sensor 112*d*''''' in order to de/actuate the lubricant temperature modifier 104*d*''''' for the purpose of maintaining, increasing or decreasing the temperature of the lubricant, L.

In an implementation, the lubricant temperature modifier 104*d*''''' may be a burner that burns a fuel (e.g., gas) in order to produce a flame. The flame heats the ambient air, A, within the enclosed housing 118*d*''''' thereby raising the temperature of one or more of the lubricant reservoir 102*d*''''', the lubricant, L, the fluid container 110*d*''''' and the fluid, F, that are also arranged within the enclosed housing 118*d*'''''. Because the lubricant, L, is arranged within the enclosed housing 118*d*''''', the fluid (i.e., the ambient air, A) within the enclosed housing 118*d*''''' may indirectly heat one or more of the fluid container 110*d*''''', the fluid, F, contained by the fluid container 110*d*''''', and the lubrication reservoir 102*d*''''' and the lubricant, L, that is contained by and in contact with the lubricant reservoir 102*d*''''' such that the temperature of the lubricant, L, is raised from a first temperature (e.g., "room temperature"/"ambient temperature") to a second temperature (e.g., a temperature that is greater than "room temperature"/"ambient temperature").

In an example, the controller 108*d*''''' may include a manually-operated on/off switch to permit manual on/off switching of the burner 104*d*'''''. The controller 108*d*''''' may also include a display that displays the temperature of one or more of the lubricant, L, and the fluid, F; the temperature of one or more of the lubricant, L, and the fluid, F, may be communicated in the form of a signal that is sent from the from one or more of the lubricant temperature sensor 106*d*''''' and the fluid temperature sensor 112*d*''''' to the controller 108*d*'''''. Accordingly, if an operator of the of lubrication conditioning systems 100*d*''''' is aware of the type of lubricant, L, arranged within the lubricant reservoir 102*d*''''', and, if the operator of the lubrication conditioning system 100*d*''''' is aware of a desired second temperature (e.g., a temperature that is greater than "room temperature"/"ambient temperature") that the lubricant, L, should be arranged at, the operator may de/actuate the on/off switch provided by the controller 108*d*''''' in order to manually maintain control over the temperature of the lubricant, L.

In another example, the controller 108*d*''''' may include logic that permits automatic control over the lubrication conditioning system 100*d*'''''. In an example, a processor provided by the controller 108*d*''''' may be programmed with a desired second temperature (e.g., a temperature that is greater than "room temperature"/"ambient temperature") of the lubricant, L. After actuating the lubrication conditioning system 100*d*''''', the temperature of the lubricant, L, may be communicated in the form of a signal that is sent from one or more of the lubricant temperature sensor 106*d*''''' and the fluid temperature sensor 112*d*''''' to the controller 108*d*'''''. Accordingly, the controller 108*d*''''' may maintain the burner 104*d*''''' in an 'on state' until the temperature of the lubricant, L, has been increased to the second temperature; upon reaching the lubricant, L, reaching the second temperature, the controller 108*d*''''' may automatically switch the burner 104*d*''''' to an 'off state.'

Further, in an embodiment, automatic control over the lubrication conditioning system 100d'''''' may be executed by providing the controller 108d'''''' with a data lookup table that associates a particular lubricant, L (e.g., a substantially semi-solid paste lubricant, a substantially semi-solid petroleum-based lubricant, a substantially liquid soap lubricant, or the like), with a desired second temperature (e.g., a temperature that is greater than "room temperature"/"ambient temperature") of a selected lubricant, L. In an example, the controller 108d'''''' may be provided with a user interface that permits an operator to inform the controller 108d'''''' which type of lubricant, L, is deposited into the lubricant reservoir 102d''''''. Once the operator informs the controller 108d'''''' which type of lubricant, L, is deposited into the lubricant reservoir 102d'''''', the controller 108d'''''' will refer to the data lookup table and automatically select the desired second temperature (e.g., a temperature that is greater than "room temperature"/"ambient temperature") associated with the lubricant, L, that was entered/selected by the operator at the user interface of the controller 108d''''''. Accordingly, upon the operator actuating the lubrication conditioning system, the burner 104d'''''' will remain in the 'on state' until the temperature of the lubricant, L, has been adjusted to the temperature associated with the lubricant, L, in the data lookup table.

In a somewhat similar fashion to the exemplary embodiment described above at FIG. 5G, the lubricant reservoir 102d'''''' of the exemplary embodiment described above at FIG. 9G does not include an opening (such as a vent to atmosphere) that permits the lubricant, L, to be in direct communication with surrounding atmosphere, A. As such, the lubricant reservoir 102d'''''' is defined by an enclosure that does not permit the lubricant, L, to be in direct communication with surrounding atmosphere, A.

Although the lubricant reservoir 102d'''''' may be defined by an enclosure that does not permit the lubricant, L, to be in direct communication with surrounding atmosphere, A, the lubricant reservoir 102d'''''' may include several ports 120d'''''', 122d'''''' and 124d'''''', which may be referred to as one or more fluid communication ports. In some instances, the fluid communication port 120d'''''' may permit a source of pressurized fluid 126d'''''' to pressurize the cavity 105d'''''' formed by the lubricant reservoir 102d''''''; movement of the pressurized fluid from the source of pressurized fluid 126d'''''' to the cavity 105d'''''' is permitted when a flow control valve 128d'''''' is arranged in an open orientation. In other instances, the fluid communication port 122d'''''' may permit a pressure sensor 130d'''''' to detect a pressurization level of the cavity 105d'''''' formed by the lubricant reservoir 102d''''''.

In other examples, the fluid communication port 124d'''''' may permit the lubricant, L, contained in the cavity 105d'''''' to be evacuated from the lubricant reservoir 102d''''''. A proximal end 132d₁'''''' of a conduit member 132d'''''' may be fluidly-connected to the fluid communication port 124d'''''', and, a distal end 132d₂'''''' of the conduit member 132d'''''' may be connected to one or more of the wheel lubricating sub-station 16a, 16a" and the tire lubricating sub-station 16b', 16b". In some instances, one or more heating elements 134d'''''' may be connected to the conduit member 132d'''''' for selectively adjusting the temperature of the conduit member 132d''''''. In other examples, a temperature sensor 136d'''''' may be disposed upon the conduit member 132d'''''' for determining the temperature of the conduit member 132d''''''.

As seen in FIG. 9G, the controller 108d'''''' may also be communicatively-coupled to one or more of the source of pressurized fluid 126d'''''', the flow control valve 128d'''''', the pressure sensor 130d'''''', the one or more heating elements 134d'''''' and the temperature sensor 136d''''''. In an example, the controller 108d'''''' may send and/or receive signals to one or more of the source of pressurized fluid 126d'''''', the flow control valve 128d'''''', the pressure sensor 130d'''''', the one or more heating elements 134d'''''' and the temperature sensor 136d'''''' as follows.

The controller 108d'''''' may send a signal to the flow control valve 128d'''''' for arranging the flow control valve 128d'''''' in a closed orientation, thereby denying the pressurized fluid contained by the source of pressurized fluid 126d'''''' to be in communication with the cavity 105d'''''' by way of the fluid communication port 124d''''''. Upon the controller 108d'''''' sending a signal to the flow control valve 128d'''''' for arranging the flow control valve 128d'''''' in the open orientation, the pressurized fluid contained by the source of pressurized fluid 126d'''''' may be directed into the cavity 105d'''''' and thereby registering an amount of pressure within the cavity 105d'''''' that is detected by the pressure sensor 130d''''''; the pressure sensor 130d'''''' may communicate a signal to the controller 108d'''''' indicating the amount of pressure within the cavity 105d''''''.

After pressurizing the cavity 105d'''''' with the pressurized fluid contained by the source of pressurized fluid 126d'''''', and, upon actuation of the applicator, S (e.g., a spray nozzle), of the wheel lubricating sub-station 16a, 16a" and/or tire lubricating sub-station 16b', 16b", the lubricant, L, may be expelled from the cavity 105d'''''' by way of the pressurized fluid pushing the lubricant, L, out of the fluid communication port 124d'''''' and through the conduit member 132d''''''. In some instances, if the controller 108d'''''' learns (e.g., from the signal sent from the pressure sensor 130d'''''') that the cavity 105d'''''' is insufficiently pressurized, which may impair a desired amount of expelled fluid from the applicator, S, the controller 108d'''''' causes the source of pressurized fluid 126d'''''' to increase the amount or flow rate of pressurized fluid provided to the cavity 105d'''''' by way of the fluid communication port 120d''''''. In other examples, if the conduit member 132d'''''' is not sufficiently heated (which is determined by the controller 108d'''''' by way of a temperature signal sent from the temperature sensor 136d'''''' to the controller 108d''''''), and, thereby cools the lubricant, L, flowing there-through, the controller 108d'''''' may actuate one or more heating elements 134d'''''' for raising the temperature of the conduit member 132d''''''; upon increasing the temperature of the conduit member 132d'''''', the temperature of the lubricant, L, may be maintained as the lubricant, L, is expelled from the cavity 105d'''''' and into the conduit member 132d'''''' prior to exiting the applicator, S.

The source of pressurized fluid 126c-126d'''''' may be any desirable component that pressurizes the lubricant, L, within the cavity 105c-105d'''''' for the purpose of pushing the lubricant, L, out of the cavity 105c-105d'''''' and into the conduit member 132c-132d'''''' and out of the applicator, S. In some implementations, the source of pressurized fluid 126c-126d'''''' may pressurize the cavity 105c-105d'''''' to a pressure between approximately 25 psi and 30 psi. In some examples, the source of pressurized fluid 126c-126d'''''' may be a pressurized air source, an inert has source or the like. In other examples, the source of pressurized fluid 126c-126d'''''' may be a piston, an air cylinder or the like.

Figure 10A:
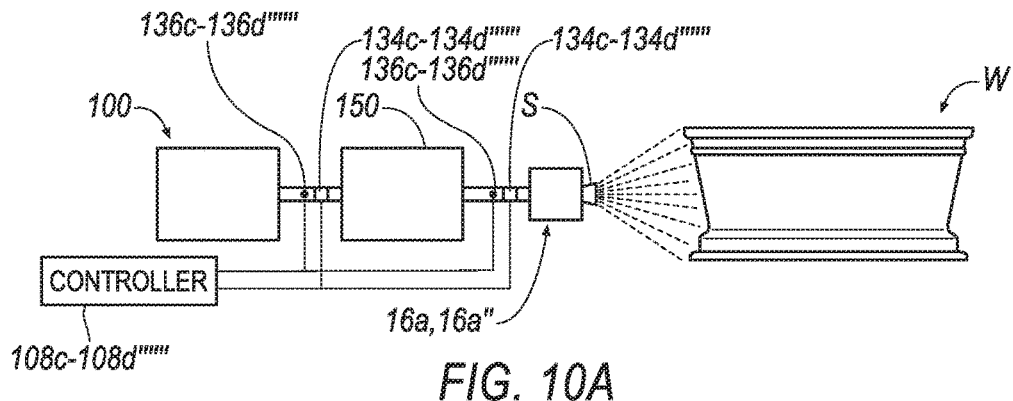
FIG. 10A is a view of any of the lubrication temperature control systems of FIGS. 8A-9G fluidly connected to a wheel lubricating sub-station for lubricating an upper beat seat and a lower beat seat of a wheel in accordance with an exemplary embodiment of the invention.

Referring to FIG. 10A, a lubrication conditioning system 100 connected to the wheel lubricating sub-station 16a, 16a" is shown according to an embodiment. Any of the lubrication conditioning systems 100c, 100c', 100d, 100d', 100d", 100d''', 100d'''', 100d''''', 100d'''''' shown and described at FIGS. 8A-9G may be arranged at the location of the lubrication conditioning system 100 of FIG. 10A such that any of the lubrication conditioning systems 100c, 100c', 100d, 100d', 100d'', 100d''', 100d'''', 100d''''', 100d'''''' may be fluidly-coupled to the wheel lubricating sub-station 16a, 16a''.

In some implementations, a fluid-moving device (e.g., a pump) 150 may be arranged between the lubrication conditioning system 100 and the wheel lubricating sub-station 16a, 16a'' for drawing fluid from the lubrication conditioning system 100 to the wheel lubricating sub-station 16a, 16a''. The fluid-moving device 150 may be a component of either of the lubrication conditioning system 100 and the wheel lubricating sub-station 16a, 16a''.

In some implementations, the fluid-moving device 150 may also dispense the lubricant, L, from an applicator, S, of the wheel lubricating sub-station 16a, 16a''. In an embodiment, the applicator, S, may be a spray nozzle for spraying/misting the lubricant, L, upon the wheel, W. Upon being dispensed from the applicator, S, the lubricant, L, may be deposited upon at least one or more of the upper and lower the bead seats $W_{SU}$, $W_{SL}$ of the wheel, W.

As seen in FIG. 10A, a conduit is shown fluidly-connecting the lubrication conditioning system 100 to the fluid-moving deice 150, and, a conduit is shown fluidly-connecting the fluid-moving device 150 to the applicator, S. Each of these conduits may be substantially similar to the conduit member 132c-132d''''' in that the conduits may include one or more heating elements (substantially similar to the one or more heating elements 134c-134d''''') and temperature sensor (substantially similar to the one or more temperature sensors 136c-136d''''') connected to the controller 108c-108d''''' such that the temperature of the lubricant, L, may be maintained as the lubricant, L, travels through the conduits.

Figure 10B:
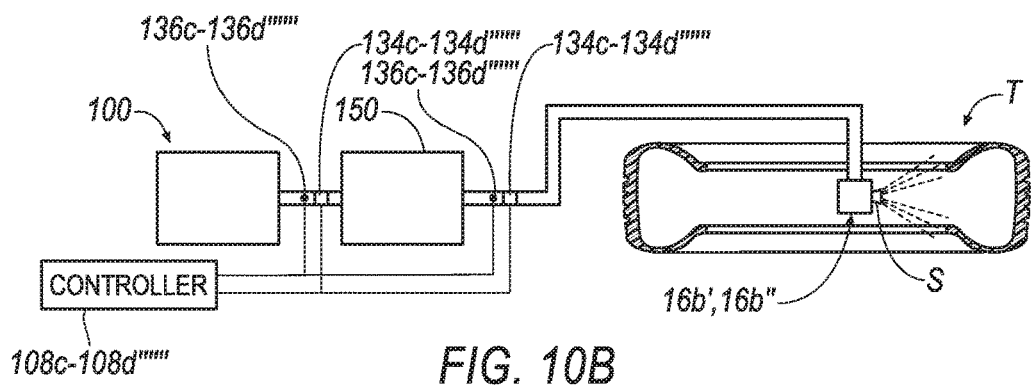
FIG. 10B is a view of any of the lubrication temperature control systems of FIGS. 8A-9G fluidly connected to a tire lubricating sub-station for lubricating an upper beat and a lower beat of a tire in accordance with an exemplary embodiment of the invention.

Referring to FIG. 10B, a lubrication conditioning system 100 connected to the tire lubricating sub-station 16b', 16b'' is shown according to an embodiment. Any of the lubrication conditioning systems 100c, 100c', 100d, 100d', 100d'', 100d''', 100d'''', 100d''''', 100d'''''' shown and described at FIGS. 8A-9G may be arranged at the location of the lubrication conditioning system 100 of FIG. 10B such that any of the lubrication conditioning systems 100c, 100c', 100d, 100d', 100d'', 100d''', 100d'''', 100d''''', 100d'''''' may be fluidly-coupled to the tire lubricating sub-station 16b', 16b''.

In some implementations, a fluid-moving device (e.g., a pump) 150 may be arranged between the lubrication conditioning system 100 and the tire lubricating sub-station 16b', 16b'' for drawing fluid from the lubrication conditioning system 100 to the tire lubricating sub-station 16b', 16b''. The fluid-moving device 150 may be a component of either of the lubrication conditioning system 100 and the tire lubricating sub-station 16b', 16b''.

In some implementations, the fluid-moving device 150 may also dispense the lubricant, L, from an applicator, S, of the tire lubricating sub-station 16b', 16b''. In an embodiment, the applicator, S, may be a spray nozzle for spraying/misting the lubricant, L, upon the tire, T. Upon being dispensed from the applicator, S, the lubricant, L, may be deposited upon at least one or more of the upper and lower the beads $T_{BU}$, $T_{BL}$ of the tire, T.

As seen in FIG. 10B, a conduit is shown fluidly-connecting the lubrication conditioning system 100 to the fluid-moving deice 150, and, a conduit is shown fluidly-connecting the fluid-moving device 150 to the applicator, S. Each of these conduits may be substantially similar to the conduit member 132c-132d''''' in that the conduits may include one or more heating elements (substantially similar to the one or more heating elements 134c-134d''''') and temperature sensor (substantially similar to the one or more temperature sensors 136c-136d''''') connected to the controller 108c-108d''''' such that the temperature of the lubricant, L, may be maintained as the lubricant, L, travels through the conduits.

Figure 11A:
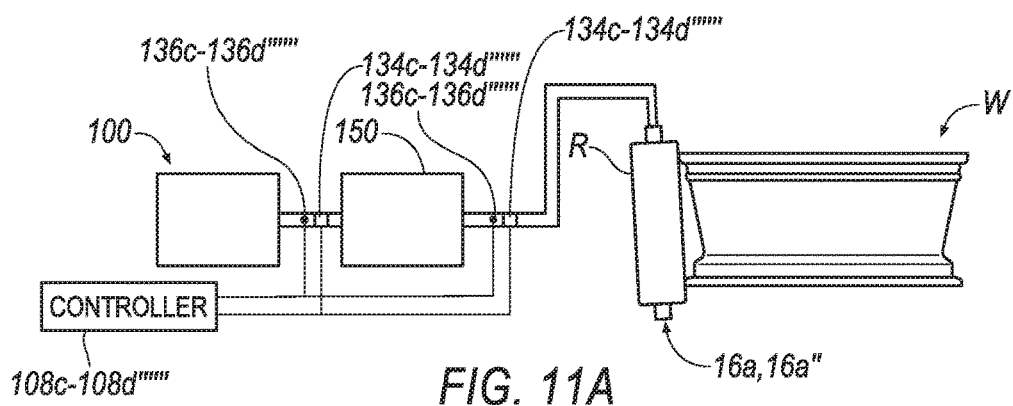
FIG. 11A is a view of any of the lubrication temperature control systems of FIGS. 8A-9G fluidly connected to a wheel lubricating sub-station for lubricating an upper beat seat and a lower beat seat of a wheel in accordance with an exemplary embodiment of the invention.

Referring to FIG. 11A, a lubrication conditioning system 100 connected to the wheel lubricating sub-station 16a, 16a'' is shown according to an embodiment. Any of the lubrication conditioning systems 100c, 100c', 100d, 100d', 100d'', 100d''', 100d'''', 100d''''', 100d'''''' shown and described at FIGS. 8A-9G may be arranged at the location of the lubrication conditioning system 100 of FIG. 11A such that any of the lubrication conditioning systems 100c, 100c', 100d, 100d', 100d'', 100d''', 100d'''', 100d''''', 100d'''''' may be fluidly-coupled to the wheel lubricating sub-station 16a, 16a''.

In some implementations, a fluid-moving device (e.g., a pump) 150 may be arranged between the lubrication conditioning system 100 and the wheel lubricating sub-station 16a, 16a'' for drawing fluid from the lubrication conditioning system 100 to the wheel lubricating sub-station 16a, 16a''. The fluid-moving device 150 may be a component of either of the lubrication conditioning system 100 and the wheel lubricating sub-station 16a, 16a''.

In some implementations, the fluid-moving device 150 may also dispense the lubricant, L, from an applicator, R, of the wheel lubricating sub-station 16a, 16a''. In an embodiment, the applicator, R, may be a roller for wiping the lubricant, L, upon the wheel, W. Upon being dispensed from the applicator, R, the lubricant, L, may be deposited upon at least one or more of the upper and lower the bead seats $W_{SU}$, $W_{SL}$ of the wheel, W.

As seen in FIG. 11A, a conduit is shown fluidly-connecting the lubrication conditioning system 100 to the fluid-moving deice 150, and, a conduit is shown fluidly-connecting the fluid-moving device 150 to the applicator, S. Each of these conduits may be substantially similar to the conduit member 132c-132d''''' in that the conduits may include one or more heating elements (substantially similar to the one or more heating elements 134c-134d''''') and temperature sensor (substantially similar to the one or more temperature sensors 136c-136d''''') connected to the controller 108c-108d''''' such that the temperature of the lubricant, L, may be maintained as the lubricant, L, travels through the conduits.

Figure 11B:
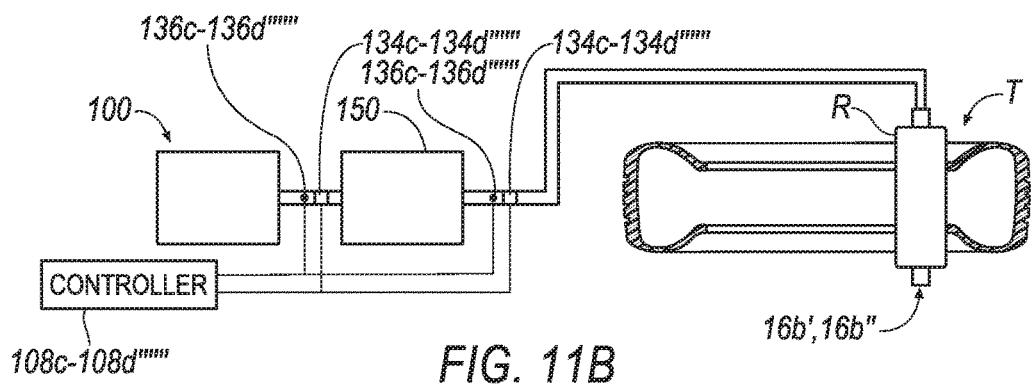
FIG. 11B is a view of any of the lubrication temperature control systems of FIGS. 8A-9G fluidly connected to a tire lubricating sub-station for lubricating an upper beat and a lower beat of a tire in accordance with an exemplary embodiment of the invention.
Figure 10A:
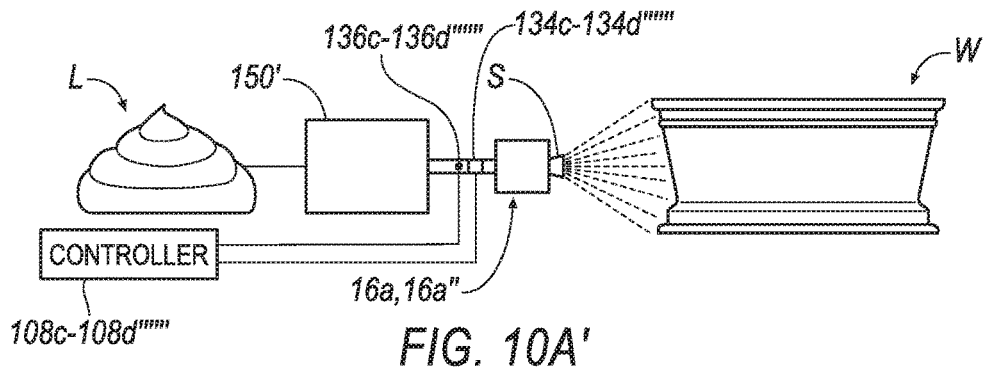
Figure 10B:
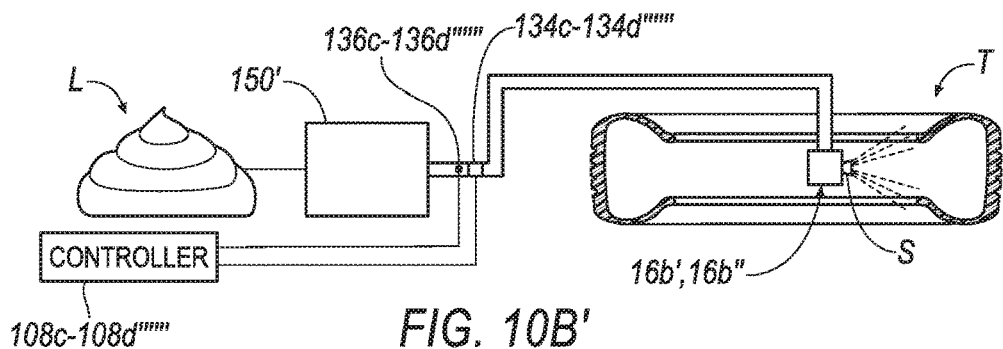
Figure 11A:
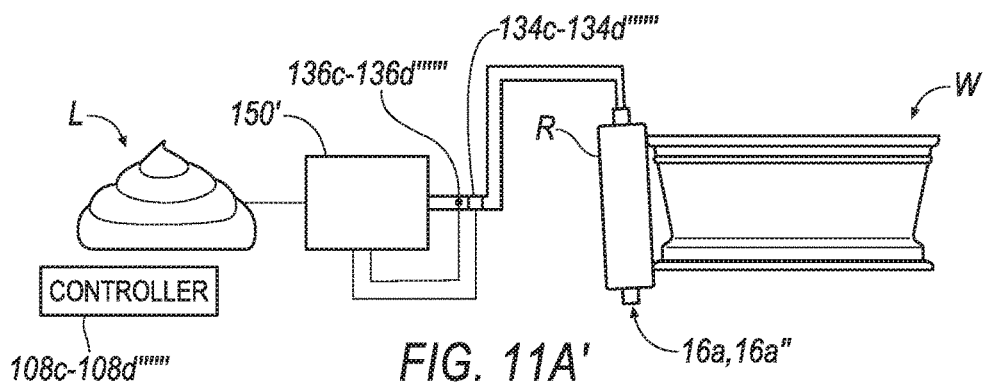
Figure 11B:
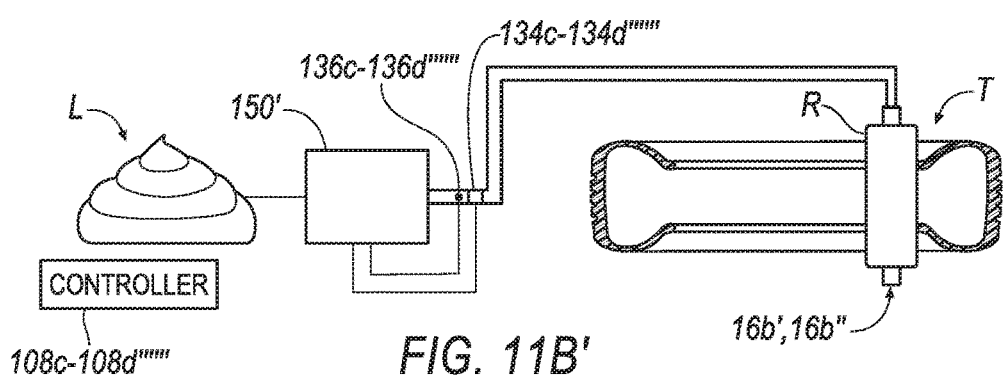

Referring to FIG. 11B, a lubrication conditioning system 100 connected to the tire lubricating sub-station 16b', 16b'' is shown according to an embodiment. Any of the lubrication conditioning systems 100c, 100c', 100d, 100d', 100d'', 100d''', 100d'''', 100d''''', 100d'''''' shown and described at FIGS. 8A-9G may be arranged at the location of the lubrication conditioning system 100 of FIG. 11B such that any of the lubrication conditioning systems 100c, 100c', 100d, 100d', 100d'', 100d''', 100d'''', 100d''''', 100d'''''' may be fluidly-coupled to the tire lubricating sub-station 16b', 16b''.

In some implementations, a fluid-moving device (e.g., a pump) 150 may be arranged between the lubrication conditioning system 100 and the tire lubricating sub-station 16b', 16b'' for drawing fluid from the lubrication conditioning system 100 to the tire lubricating sub-station 16b', 16b''. The fluid-moving device 150 may be a component of either of the lubrication conditioning system 100 and the tire lubricating sub-station 16b', 16b''.

In some implementations, the fluid-moving device 150 may also dispense the lubricant, L, from an applicator, R, of the tire lubricating sub-station 16b', 16b''. In an embodiment, the applicator, R, may be a roller for wiping the lubricant, L, upon the tire, T. Upon being dispensed from the applicator, R, the lubricant, L, may be deposited upon at least one or more of the upper and lower the beads $T_{BU}$, $T_{BL}$ of the tire, T.

As seen in FIG. 11B, a conduit is shown fluidly-connecting the lubrication conditioning system 100 to the fluid-moving deice 150, and, a conduit is shown fluidly-connecting the fluid-moving device 150 to the applicator, S. Each of these conduits may be substantially similar to the conduit member 132c-132d'''' in that the conduits may include one or more heating elements (substantially similar to the one or more heating elements 134c-134d'''') and temperature sensor (substantially similar to the one or more temperature sensors 136c-136d'''') connected to the controller 108c-108d'''' such that the temperature of the lubricant, L, may be maintained as the lubricant, L, travels through the conduits.

Referring to FIGS. 10A', 10B', 11A' and 11B', exemplary alternative systems for lubricating a wheel, W (see, e.g., FIGS. 10A', 11A'), and a tire, T (see, e.g., FIGS. 10B', 11B'), are shown. Unlike the systems shown and described above at FIGS. 10A, 10B, 11A and 11B, the systems shown and described at FIGS. 10A', 10B', 11A' and 11B' do not include a dedicated lubrication conditioning system 100 that increases the temperature of the lubricant, L; rather, the systems shown and described at FIGS. 10A', 10B', 11A' and 11B' include a high pressure pump 150' that inherently increases the temperature of the lubricant, L, by virtue of pressurizing the lubricant during the process of ejecting the lubricant upon the tire, T, and/or wheel, W, at the lubricating sub-station 16a, 16a", 16b', 16b" as the lubricant, L, is drawn through the high pressure pump 150'. As described above, when the temperature of the lubricant, L, is raised, the lubricant, L, undergoes a viscosity transition (e.g., a change from a substantially paste lubricant, L, to a substantially liquid lubricant, L) in order to arrange the lubricant, L, in a more suitable state for being ejected from an applicator, S (e.g., a spray nozzle), of a particular depositing (e.g., "spraying") application upon one or more of the tire, T, and the wheel, W, at one or more of the wheel lubricating sub-station 16a, 16a", a tire lubricating sub-station 16b', 16b". Therefore, by inducing a viscosity transition of the lubricant, L, to occur, one or more of the wheel lubricating sub-station 16a, 16a" and the tire lubricating sub-station 16b', 16b" that is tooled for spraying lubricant, L, from a spray nozzle, S, may not be limited to a particular (e.g., viscosity) lubricant, L, that is arranged in at a first temperature (e.g., "room temperature"/"ambient temperature")); accordingly, by permitting a viscosity transition of the lubricant, L, to occur as a result of inclusion of the high pressure pump 150', lubricants, L, having, for example, a non-liquid state of matter (such as, e.g., a semi-solid paste lubricant) at the first temperature (e.g., "room temperature"/"ambient temperature") may be utilized by one or more of the wheel lubricating sub-station 16a, 16a" and the tire lubricating sub-station 16b', 16b" that is tooled for spraying lubricant, L. Further, as seen in FIGS. 10A', 10B', 11A', 11B', a conduit is shown fluidly-connecting the fluid-moving device 150' to the applicator, S; the conduit may be substantially similar to the conduit member 132c-132d'''' in that the conduit may include one or more heating elements (substantially similar to the one or more heating elements 134c-134d'''') and temperature sensor (substantially similar to the one or more temperature sensors 136c-136d'''') connected to the controller 108c-108d'''' such that the temperature of the lubricant, L, may be maintained as the lubricant, L, travels through the conduit.

Figure 12:
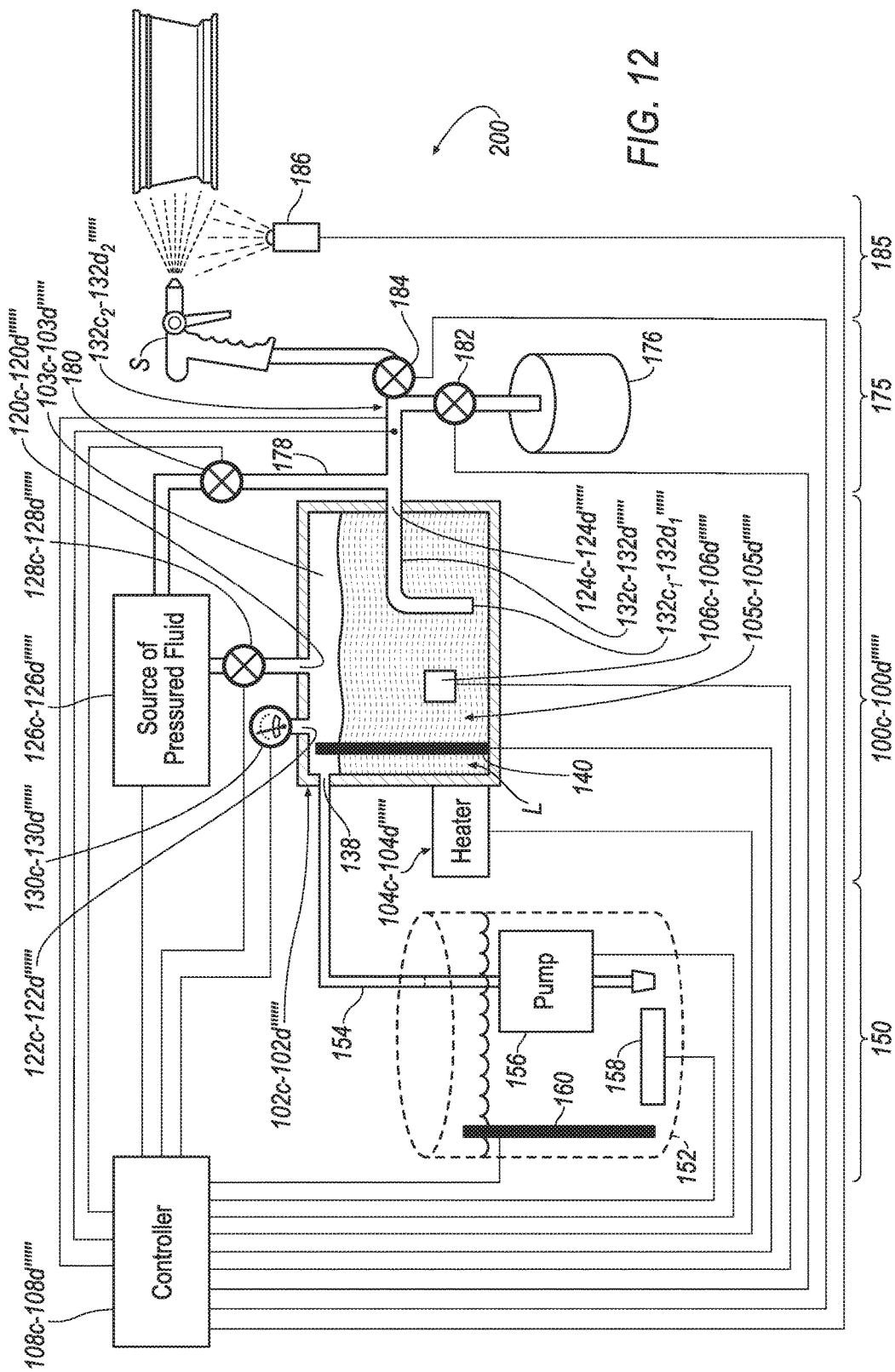
FIG. 12 is a view of a lubrication temperature control system for directly heating a lubricant contained by a lubricant reservoir that is fluidly connected to a wheel lubricating sub-station for lubricating an upper beat seat and a lower beat seat of a wheel in accordance with an exemplary embodiment of the invention in accordance with an exemplary embodiment of the invention.

Referring to FIG. 12, a fluid circuit 200 including any of the lubrication conditioning systems 100c-100d'''' is shown according to an exemplary embodiment. The fluid circuit 200 generally includes a lubricant supply system 150 connected upstream of the lubrication conditioning system 100c-100d'''', a lubricant purge system 175 connected downstream of the lubrication conditioning system 100c-100d'''' and upstream of the applicator, S. The fluid circuit 200 may also include a lubricant output detection portion 185 arranged proximate the applicator, S. As will be described in the following disclosure, each of the lubricant supply system 150, the lubricant purge system 175 and the lubricant output detection portion 185 are communicatively-coupled to the controller 108c-108d''''.

The lubricant supply system 150 includes a lubricant supply container 152 and a lubricant supply conduit 154 that fluidly connects the lubricant supply container 152 to a lubricant supply port 138 formed by the lubricant reservoir 102c-102d'''' of the lubrication conditioning system 100c-100d''''. The lubricant supply conduit 154 includes a pump 156 that permits lubricant, L, contained within the lubricant supply container 152 to be transported to the cavity 105c-105d'''' of the lubricant reservoir 102c-102d'''' of the lubrication conditioning system 100c-100d''''. In some instances, a lubrication amount detection device 140 may be disposed within the cavity 105c-105d'''', and, when controller 108c-108d'''' determines that the amount of lubricant, L, disposed within the cavity 105c-105d'''' falls to a predetermined level (as a result of the controller 108c-108d'''' being communicatively-coupled to the lubrication amount detection device 140), the controller 108c-108d'''' may send a signal to the pump 156 for causing the lubricant, L, contained within the lubricant supply container 152 to be transported to the cavity 105c-105d'''' of the lubricant reservoir 102c-102d'''' of the lubrication conditioning system 100c-100d''''.

Like any of the lubricant temperature modifiers 104c-104d'''' of the lubrication conditioning systems 100c-100d'''' described above, the lubricant supply system 150 may also include a lubricant temperature modifier 158 for the purpose of maintaining, increasing or decreasing the temperature of the lubricant, L, disposed within the lubricant supply container 152. In an example, the lubricant temperature modifier 158 may be disposed within the lubricant supply container 152 and may be in direct contact with the lubricant, L, disposed within the lubricant supply container 152.

In some instances, the lubricant supply system 150 may also include a lubrication amount detection device 160 that detects an amount of lubricant, L, disposed within the lubricant supply container 152. The lubrication amount detection device 160 may be communicatively-coupled to the controller 108c-108d'''', and, when controller 108c-108d'''' determines that the amount of lubricant, L, disposed within the lubricant supply container 152 falls to a predetermined level (as a result of the controller 108c-108d'''' being communicatively-coupled to the lubrication amount detection device 160), the controller 108c-108d'''' may actuate an alert device (that produces, for example, an audible sound, flashing light, etc.) in order to notify an operator that the lubricant supply container 152 needs to be refilled with additional lubricant, L.

The lubricant purge system 175 includes a purge conduit member 178 that is fluidly-connected to both of the source of pressurized fluid 126c-126d'''' and the conduit member 132c-132d'''' that is fluidly-connected to the fluid communication port 124c-124d'''' formed by the lubricant reservoir 102c-102d''''. The purge conduit member 178 is fluidly-connected to the conduit member 132c-132d'''' such that the purge conduit member 178 is arranged downstream of the proximal end $132c_1$-$132d_1''''$ of the conduit member $132c$-$132d''''$ and upstream of the distal end $132c_2$-$132d_2''''$ of a conduit member $132c$-$132d''''$.

The purge conduit member 178 includes a plurality of valves 180, 182 184 that are communicatively-coupled to the controller $108c$-$108d''''$. The valve 180 may be referred to as a purge conduit member pressurization valve. The valve 182 may be referred to as a lubricant purge reservoir access valve. The valve 184 may be referred to as an applicator access valve.

The purge conduit member pressurization valve 180 is arranged downstream of the source of pressurized fluid $126c$-$126d''''$ and will permit or deny movement of pressurized fluid from the source of pressurized fluid $126c$-$126d''''$ into the purge conduit member 178. The lubricant purge reservoir access valve 182 is arranged downstream of both of the proximal end $132c_1$-$132d_1''''$ of the conduit member $132c$-$132d''''$ and the purge conduit member pressurization valve 180. The lubricant purge reservoir access valve 182 is also arranged upstream of a lubricant purge reservoir 176. The applicator access valve 184 is arranged downstream of both of the proximal end $132c_1$-$132d_1''''$ of the conduit member $132c$-$132d''''$ and the purge conduit member pressurization valve 180.

The lubricant purge system 175 may function according to the following exemplary embodiment. In some circumstances, if previously temperature-modified lubricant remains within the conduit member $132c$-$132d''''$ after a previous use of the fluid circuit 200, the previously temperature-modified lubricant may return to approximately room temperature, thereby potentially creating an obstruction or clog within the conduit member $132c$-$132d''''$. Therefore, after a previous use of the fluid circuit 200, the lubricant purge system 175 may be actuated for the purpose of evacuating the previously temperature-modified lubricant from with the conduit member $132c$-$132d''''$ and into the lubricant purge reservoir 176, thereby removing the potential for a subsequent obstruction or clog. Therefore, in a situation when there is a desired to purge lubricant remaining with the conduit member $132c$-$132d''''$, the controller $108c$-$108d''''$ may selective control the orientation of the valves 180, 182, 184.

In an example, the lubricant purge system 175 may operate as follows. Firstly, the controller $108c$-$108d''''$ may arrange: (1) the purge conduit member pressurization valve 180 in a closed orientation, (2) the lubricant purge reservoir access valve 182 in an open orientation, and (3) the applicator access valve 184 in a closed orientation. Then, the controller $108c$-$108d''''$ may arrange the purge conduit member pressurization valve 180 in an open orientation in order to expose the conduit member $132c$-$132d''''$ (and the previously temperature-modified lubricant disposed therein) to the pressurized fluid arising from the source of pressurized fluid $126c$-$126d''''$. The pressurized fluid firstly enters the purge conduit member 178 for subsequent entry into the conduit member $132c$-$132d''''$ such that the previously temperature-modified lubricant disposed within the conduit member $132c$-$132d''''$ is evacuated into the lubricant purge reservoir 176 as a result of the lubricant purge reservoir access valve 182 being arranged in the open orientation. Because the applicator access valve 184 is arranged in the closed orientation, the previously temperature-modified lubricant disposed within the conduit member $132c$-$132d''''$ is prevented from travelling toward the applicator, S; however, in some circumstances, it may be desirable to also arrange the applicator access valve 184 in an open orientation (in a substantially similar manner as the lubricant purge reservoir access valve 182) such that an operator may elect to selectively arrange the applicator, S, in an open orientation to thereby purge the previously temperature-modified lubricant out of the applicator, S, in addition to discharging the previously temperature-modified lubricant into the lubricant purge reservoir 176. Upon completing the lubricant-purging process described above, then controller $108c$-$108d''''$ may: (1) return the purge conduit member pressurization valve 180 in a closed orientation, (2) arrange the lubricant purge reservoir access valve 182 in a closed orientation and (3) the arrange the applicator access valve 184 in an open orientation for a subsequent use of the fluid circuit 200. By arranging the lubricant purge reservoir access valve 182 in the closed orientation, during a subsequent use of the fluid circuit 200, temperature modified lubricant is prevented from flowing into the lubricant purge reservoir 176, but, rather, toward the applicator, S, as a result of the applicator access valve 184 being arranged in the open orientation.

With continued reference to FIG. 12, the lubricant output detection portion 185 includes a lubricant spray sensor 186 communicatively-coupled to the controller $108c$-$108d''''$. The lubricant spray sensor 186 determines if the applicator, S, is spraying lubricant upon the wheel, W, and, in some circumstances, if the lubrication conditioning systems $100a$, $100a'$, $100b$, $100b'$, $100b''$, $100b'''$, $100b''''$, $100b'''''$, $100b''''''$, $100c$, $100c'$, $100d$, $100d'$, $100d''$, $100d'''$, $100d''''$, $100d'''''$, $100d''''''$ is depleted of lubricant, or, if the applicator, S, is clogged by lubricant, which would effectively stop or inhibit a full flow of lubricant from the applicator, S, the lubricant spray sensor 186 will detect the lacking or non-existence of lubricant spray and communicate the detected condition to the controller $108c$-$108d''''$. Upon receiving the signal at the controller $108c$-$108d''''$, the controller $108c$-$108d''''$ may cease the spraying operation until an operator resolves the spray issue.

Figure 13:
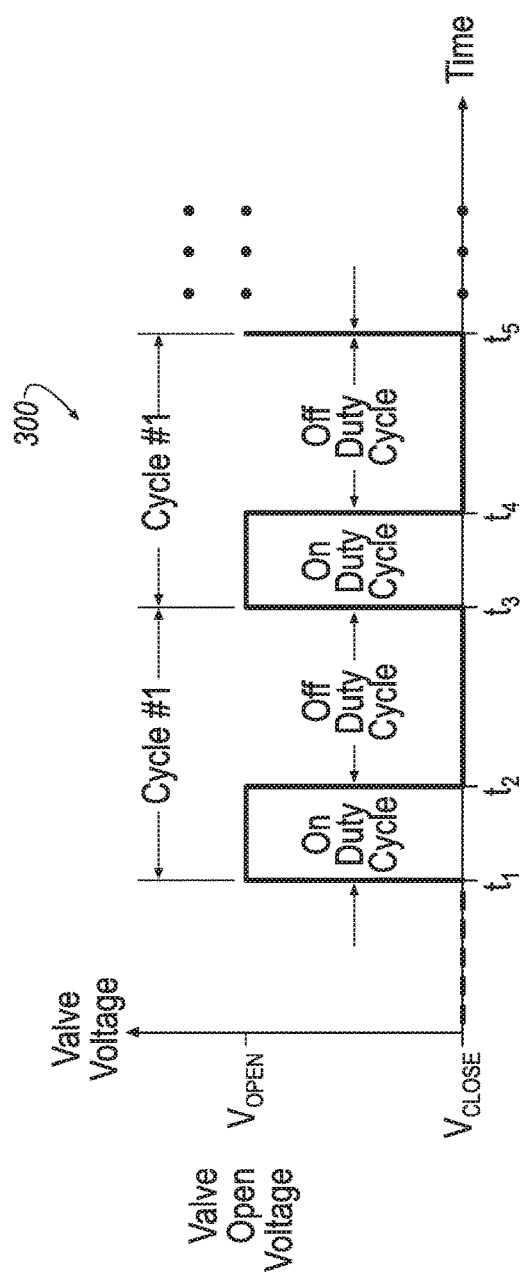
FIG. 13 is an exemplary graph illustrating an operating cycle of the wheel lubricating sub-station.
Figure 14:
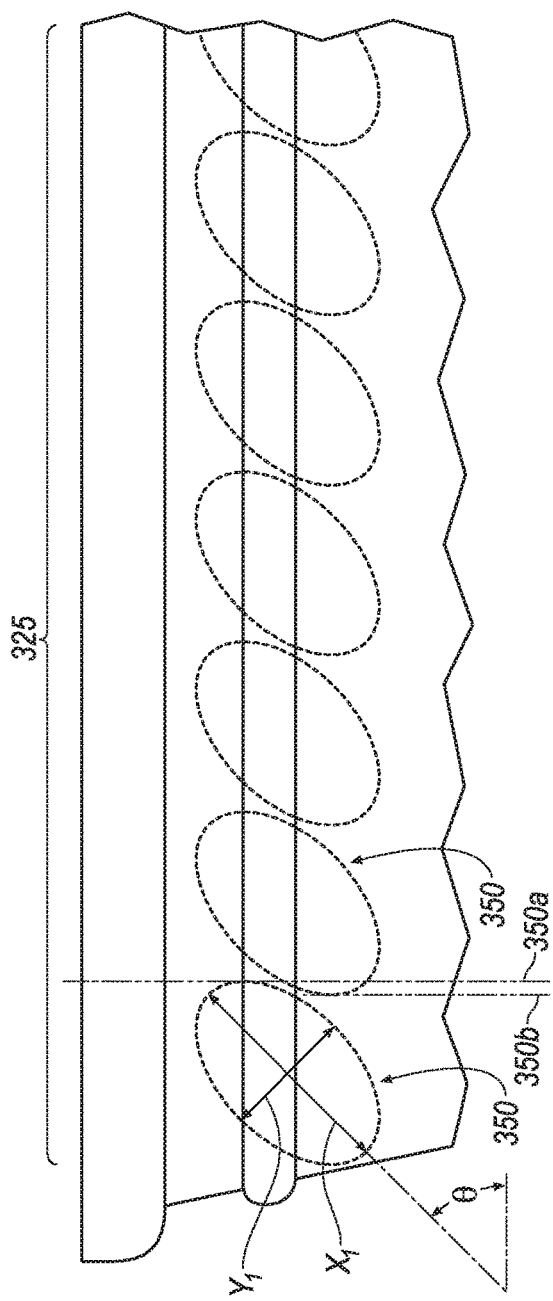
FIG. 14 is an enlarged view of a portion of a wheel including a plurality of lubricated regions performed by the lubricating sub-station.

Referring to FIGS. 13-14, a method of utilizing an applicator, S, fluidly-connected to any of the lubrication conditioning systems $100a$, $100a'$, $100b$, $100b'$, $100b''$, $100b'''$, $100b''''$, $100b'''''$, $100b''''''$, $100c$, $100c'$, $100d$, $100d'$, $100d''$, $100d'''$, $100d''''$, $100d'''''$, $100d''''''$ is described according to an exemplary embodiment; in some instances, the applicator, S, may be communicatively-connected to and automatically controlled by the controller $108c$-$108d''''$, as follows.

In some instances, the applicator, S, may include a solenoid valve (not shown) that receives an electrical pulse 300 (see, e.g., duty cycle pulse of FIG. 13) that automatically opens and closes the solenoid valve on a periodic basis. In some implementations, the duty cycle 300 may include a duty cycle pulse that is equal to approximately 10 millisecond on and approximately 30 milliseconds off. The periodic opening and closing of the valve results in a periodic spray pattern 325 of the lubricant (as seen in, e.g., FIG. 14) being disposed upon at least a portion of the circumference of the wheel, W. In an example, spray patter 325 comprises a plurality of diagonally-arranged (see, e.g., angle, θ, of FIG. 14) oval areas 350 with each oval area 350 being defined by a major axis, $X_1$, and a minor axis, $Y_1$.

As seen in FIG. 14, a trailing edge 350a and a leading edge 350b of neighboring oval areas 350 slightly overlaps. The purpose of the shape of each over area 350 and the placement of each oval area 350 upon an entire circumference of the wheel, W, contributes to a reduced amount of lubricant applied to the wheel, W, without 'over-applying' the lubricant to the wheel, W. In some instances, if lubricant is over-applied, an undesirable cost may arise from wasted lubricant material; further, if the lubricant was to be over-applied, additional lubricant may subsequently become trapped between the bead seats, $W_{SU}$, $W_{SL}$, of the wheel, W, and the beads, $T_{BU}$, $T_{BL}$, of the tire, T, thereby requiring a subsequent processing procedure for removing the trapped lubricant, which increases production time, thereby contributing to increased production costs. Therefore, as a tire, T, is slid across the wheel, W, for the purpose of joining the tire, T, to the wheel, W, the beads, $T_{BU}$, $T_{BL}$, of the tire, T, may be adequately lubricated with a minimal amount of lubricant as the beads, $T_{BU}$, $T_{BL}$, of the tire, T, wipe the lubricant across, for example, all of the circumference of the wheel, W, in order to facilitate lubricated mounting of the tire, T, upon the wheel, W. Therefore, as the beads, $T_{BU}$, $T_{BL}$, of the tire, T, wipe the lubricant across the wheel, W, the overlapping arrangement of neighboring trailing edges 350a and leading edges 350b of the oval patterns 350 results in the gaps between each oval pattern 350 about the circumference of the wheel, W, being lubricated during the tire-wheel lubricated mounting procedure. Further, it has been discovered that the diagonally-arrangement, θ, of the oval areas 350 provides an improved uniformity to the wiping of the lubricant across the wheel, W, when the beads, $T_{BU}$, $T_{BL}$, of the tire, T, wipe the lubricant across the wheel, W. In some examples, the angle, θ, defining the diagonal arrangement of the oval patterns 350 may be any angle between approximately 30° and approximately 45°.

The spray pattern 325 may be disposed about the circumference of the wheel, W, by, for example: (1) rotating the wheel, W, and spatially holding the applicator, S, in place, (2) spatially holding the wheel, W, in place and moving the applicator, S, about the circumference of the wheel, W, and (3) rotating the wheel, W, and spatially moving the applicator, S, about the circumference of the wheel, W, but in opposite directions.

In some instances, if the wheel, W, is rotated while being sprayed by the applicator, S, the amount of rotation of the wheel, W, may be determined by the number of applicators, S, if, for example, the entire circumference of the wheel, is to be sprayed with the lubricant. For example, if one applicator, S, is included, the wheel, W, may be rotated 360°. In another example, if two applicators, S, are included (and, if the applicators are arranged directly opposite each other), the wheel, W, may be rotated 180°.

Referring to FIGS. 18A and 18B, in some implementations, a lubricant supply system 1500 fluidly connected upstream of any of the lubrication conditioning systems 100, 100c-100d'''' is operable to whip or agitate the lubricant, L, prior to dispensing the lubricant, L, to the lubrication conditioning system 100. As mentioned above, the lubricant, L, is generally in a substantially semi-solid (e.g., "paste") state of matter while cold at the first temperature (e.g., "room temperature"/"ambient temperature"), and thus, is not suitable for dispensing (e.g., pumping via a pump 1560) to the lubrication conditioning system 100. While the lubricant temperature modifier 158 shown in FIG. 12 can be used to lower the viscosity of the lubricant, L, by increasing the temperature thereof to enable dispensing of the lubricant, L, from the lubricant supply system 1500 to the lubrication conditioning system 100, pre-heating the lubricant, L, in this manner incurs increased costs due to energy expenditures required to pre-heat the lubricant, L, as well as the amount of time required to increase the temperature of the lubricant, L, to a temperature suitable for transporting (e.g., pumping) the lubricant, L, from the lubricant supply system 1500 to the lubrication conditioning system 100. For example, pre-heating the lubricant, L, at the lubricant supply system 1500 may cause the one or more of the other sub-stations 12-24, 12'-24', 12"-24" that form the tire-wheel assembly, TW, to sit idle until the lubricant, L, reaches a temperature suitable for being dispensed.

The lubricant supply system 1500 includes a container 1502 that stores a quantity of lubricant, L, that dispenses to the lubricant conditioning system 100. The container 1502 may include a metal drum containing the lubricant, L, from a supplier. For example, the container 1502 may include a 15 gallon cylindrical steel drum. To allow for the lubricant, L, to dispense from the container cold (e.g., "ambient temperature"), a whipping device 1510 inserts into the container 1502 to whip or blend the lubricant, L, such that the lubricant, L, is transformed from the substantially semi-solid (e.g., "paste") state into a whipped state which is less viscous than the pre-whipped state. The whipping device 1510 may include devices such as mechanical agitators, blenders, stirrers, or air bubblers sufficient for whipping or blending the lubricant, L, while stored in the container 1502. Referring to FIG. 18A, the whipping (a.k.a. agitating) device 1510 includes an impeller 1512 driven by a motor 1514 to whip or blend the cold lubricant, L, into the whipped state from the semi-solid (e.g., "paste") state. Here, the impeller 1512 may be connected to an end of a shaft 1516 inserted proximate to the bottom of the container 1502, while the motor 1514 connected to the other end of the shaft 1516 may drive the impeller 1512, thereby causing impeller 1512 in contact with the lubricant, L, to vigorously rotate in a manner that suitably whips or blends the lubricant, L, into the whipped state. In other configurations, the whipping device 1510 may include a shaking apparatus that supports and retains the container 1502 while being operable to undergo vibratory or shaking motions to whip, blend, or otherwise significantly agitate the lubricant, L, stored within the container 1502 such that the state of the lubricant, L, is transformed to the whipped state. Additionally or alternatively, the whipping device 1510 may include ultrasonic devices inserted into the container 1502 and configured to provide ultrasonic impulses through the lubricant, L, to whip or blend the lubricant, L, into the whipped state from the semi-solid state. The whipping device 1510 may be manually operated. Alternatively, the whipping device 1510 may be automated to insert into the container 1502 and whip the lubricant, L, into the whipped state when the container 1502 is received at the lubricant supply station 1500.

Upon whipping the lubricant, L, stored within the container 1502 into the whipped state, the viscosity of the cold lubricant, L, is lowered and suitable for dispensing from the container 1502 to the lubrication conditioning system 100. As mentioned above, the lubrication conditioning system 100 may heat the lubricant, L, from the first temperature (e.g., "room temperature"/"ambient temperature") to the second temperature (e.g., a temperature greater than "ambient temperature") to transform the lubricant, L, to a substantially liquid state more suitable for depositing ("e.g., spraying") the lubricant, L, from a spray nozzle, S, upon one or more of the tire, T, and the wheel, W, at one or more of the of the wheel lubricating sub-station 16a, 16a", a tire lubricating sub-station 16b', 16b". Accordingly, a portion of the pre-whipped lubricant, L, may be transported in batches, or continuously (such as by electrically pumping), directly from the container 1502 of the lubricant supply system 1500 to any of the lubricant reservoirs 102, 102c-102d'''' of the lubrication conditioning systems 100, 100c-100d''''. In some implementations, the lubricant reservoir 102 defines a smaller volume for holding the lubricant, L, than a volume defined by the container 1502 at the lubricant supply system

1500. Accordingly, the lubrication conditioning system 100 may employ an appropriate lubricant temperature modifier (e.g., "heater") 104c, 104d'''''' to change (e.g., increase) the temperature of the lubricant, L, from a first temperature (e.g., "room temperature"/"ambient temperature") to a second temperature (e.g., a temperature that is greater than "room temperature"/"ambient temperature").

Referring to FIG. 18B, in some implementations, the lubricant supply system 1500 includes a pump 1560 configured to dispense a portion of the lubricant, L, in the whipped state from the container 1502 to the lubrication conditioning system 100 without pre-heating the lubricant, L. That is to say, blending or whipping the lubricant, L, with the whipping device 1510 to transform the lubricant, L, from the semi-solid state to the whipped state, allows the lubricant, L, to be pumped into the lubrication conditioning system cold (e.g., "ambient temperature"). The pump 1560 is associated with the lubricant supply conduit 154 (also shown in FIG. 12) which includes a first end inserted into the container 1502 and a second end fluidly coupled to the lubricant supply port 138 (also shown in FIG. 12) formed by the lubricant reservoir 102c-102d'''''' of the lubrication conditioning system 100c-100d''''''. During operation of the pump 1560, the portion of the lubricant, L, in the whipped state is pumped out of the container 1502 and dispensed or transported to the lubricant reservoir 102c-102d'''''' via the lubricant supply conduit 154. In some implementations, the pump 1560 is a piston-type pump that includes a circumferential disc 1564 received within the container 1502 upon a top surface of the lubricant, L, that translates downward relative to the lubricant supply conduit 154 (and relative to the container 1502) to cause at least a portion of the lubricant, L, in the whipped state to flow into the lubricant supply conduit 154 and out of the container 1502 for dispensing to the lubricant reservoir 102c-102d''''''. In some examples, the pump 1560 includes a prime mover to cause the circumferential disc 1564 to translate relative to the lubricant supply conduit 154 for pumping the lubricant, L, out of the container 1502. In other examples, the pump 1560 includes an electrical motor electrically connected to an external power source or a battery to cause the circumferential disc 1564 to translate relative to the lubricant supply conduit 154 for pumping the lubricant, L, out of the container 1502. The circumferential disc 1564 may include a diameter that creates a fluid-tight seal with inner circumferential surfaces of the container 1502. In other configurations, the lubricant supply system 1500 may employ one or more other types of pumps other devices suitable for drawing the lubricant, L, out of the container 1502. The lubricant supply system 1500 may also include the lubrication amount detection device 160 of FIG. 12 that detects the amount of lubricant, L, stored within the container 1502.

FIG. 18B shows the lubricant reservoir 102, 102c-102d'''''' of the lubrication conditioning system 100, 100c-100d'''''' defining a smaller volume than the volume of the container 1502, and thus, the lubricant reservoir 102, 102c-102d'''''' contains a smaller quantity of lubricant, L, received from the container 1502 than the quantity of the lubricant, L, stored within the container 1502. Accordingly, the lubrication conditioning system 100, 100c-100d'''''' may employ the lubricant temperature modifier 104c-104d'''''' (e.g., "heater") to change the temperature of the lubricant, L, within the lubricant reservoir 102, 102c-102d'''''' from the first temperature (e.g., "room temperature"/"ambient temperature") to the second temperature (e.g., a temperature greater than "ambient temperature"). In some implementations, the fluid circuit 200 of FIG. 12 replaces the lubricant supply system 1500 with the lubricant supply system 1500 that employs the whipping device 1510 to pre-whip or blend the lubricant, L, into the whipped state before the lubricant, L, is dispensed to the lubrication conditioning system 100.

Figure 19:
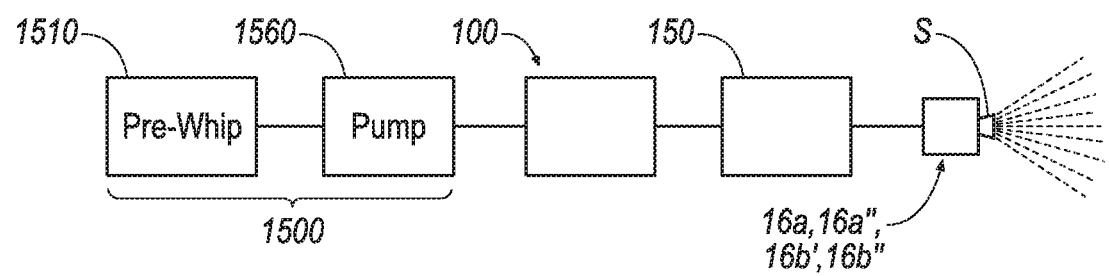
FIG. 19 is a view of a lubrication conditioning system in fluid communication with a lubrication supply system and a lubricating sub-station for lubricating a wheel or a tire.

Referring to FIG. 19, a schematic view 1900 shows lubricant supply system 1500 in fluid communication with the lubrication conditioning system 100 and the lubrication conditioning system 100 in fluid communication with the wheel lubricating sub-station 16a, 16a'' and/or the tire lubricating sub-station 16b', 16b''. The lubricant supply system 1500 stores a quantity of lubricant, L, in a substantially semi-solid (e.g., "paste") state within the storage container 1502 and inserts the whipping device 1510 into the container 1502, whereby the whipping device 1510 is controlled to pre-whip or blend the quantity of lubricant, L, into the whipped state from the substantially semi-solid state. Thereafter, the pump 1560 of the lubricant supply system 1500 pumps out a portion of the quantity of lubricant, L, cold (e.g., "ambient temperature") out of the container 1502 and provides the lubricant, L, to the lubricant supply system 1500 via the lubricant supply conduit 154.

The lubrication conditioning system 100 may increase the temperature of the lubricant, L, from the first temperature to the second temperature using any of the aforementioned heating techniques. The fluid-moving device (e.g., a pump) 150 may be arranged between the lubrication conditioning system 100 and the lubricating sub-station 16a, 16'', 16b', 16'' for drawing the now substantially liquefied lubricant, L, from the lubrication conditioning system 100 to the lubricating sub-station 16a, 16'', 16b', 16''.

In some implementations, the fluid-moving device 150 dispenses the lubricant, L, from the applicator, S, of the lubricating sub-station 16a, 16'', 16b', 16''. In some examples, the applicator, S, includes a spray nozzle operable to spray/mist the lubricant, L, upon the wheel, W, and/or the tire, T.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. For example most embodiments shown herein depict engaging a wheel (by way of a robotic arm) and manipulating the wheel to mount a tire thereon. However, nothing herein shall be construed to limit the scope of the present invention to only manipulating a wheel to mount a tire thereon. The exemplary embodiments are merely illustrative and should not be considered restrictive in any way. The scope of the invention is defined by the appended claims and their equivalents, rather than by the preceding description.

What is claimed is:

1. A method, comprising:
   pre-whipping a lubricant by:
      inserting a whipping device into a storage container containing the lubricant;
      controlling the whipping device to whip or blend the lubricant from a semi-solid state to a whipped state;
      pumping out a portion of the lubricant in the whipped state from the storage container using a pump, the pump inserted into the storage container and in fluid communication with the lubricant;
   providing the lubricant to a lubrication sub-station; and
   utilizing the lubrication sub-station for lubricating at least one of:
      a tire that is not joined to a corresponding wheel and a wheel that is not joined to a corresponding tire at the lubrication sub-station prior to joining:
the tire to the corresponding wheel or
the wheel to the corresponding tire to form a tire-wheel assembly.

2. The method of claim 1, further comprising, prior to providing the lubricant to the lubrication sub-station,
providing the pumped out portion of the lubricant in the whipped state to a lubricant reservoir, the lubricant reservoir operable to:
increase the temperature of the lubricant from a first temperature to a second temperature greater than the first temperature using a lubricant temperature modifier disposed within the lubricant reservoir; and
provide the lubricant to the lubrication sub-station.

3. The method of claim 2, wherein pumping out the portion of the lubricant in the whipped state comprises pumping out the portion of the lubricant in the whipped state from the storage container to the lubricant reservoir when the lubricant is at the first temperature.

4. The method of claim 2, wherein the lubricant reservoir defines a smaller volume than a volume defined by the storage container.

5. The method of claim 1, wherein the whipping device comprises:
an impeller attached to a first end of a shaft inserted into the storage container in contact with the lubricant; and
a motor attached to the second end of the shaft, the motor driving the impeller to cause whipping or blending of the lubricant.

6. The method of claim 1, wherein the whipping device comprises at least one of mechanical agitators, blenders, stirrers, a shaking device, ultrasonic devices, or air bubblers suitable for whipping or blending the lubricant into the whipped state.

7. The method of claim 1, wherein pumping out the portion of the lubricant in the whipped state comprises:
translating a circumferential disc associated with the pump and inserted into the storage container on top of the lubricant in the whipped state, the translating circumferential disc causing the portion of the lubricant in the whipped state to flow out of the storage container via a lubricant supply conduit.

8. The method of claim 1, wherein joining: the tire to the corresponding wheel or the wheel to the corresponding tire to form the tire-wheel assembly includes:
utilizing a mounting sub-station for mounting:
the tire to the corresponding wheel or the wheel to the corresponding tire for forming a non-inflated tire-wheel assembly.

9. The method of claim 8, wherein the method further includes:
utilizing an inflation sub-station for inflating the non-inflated tire-wheel assembly to define an inflated tire-wheel assembly.

10. The method of claim 9, wherein the method further includes:
utilizing a seating sub-station for seating beads of the tire or corresponding tire adjacent bead seats of, respectively, the corresponding wheel or the wheel.

11. A method, comprising:
providing one of:
a tire that is not mounted to a corresponding wheel and a wheel that is not mounted to a corresponding tire;
transitioning a lubricant from a semi-solid state to a whipped state;
lubricating one of:
the tire that is not mounted to the corresponding wheel with the lubricant transitioned to the whipped state and
the wheel that is not mounted to the corresponding tire with the lubricant transitioned to the whipped state; and
joining one of:
the lubricated tire to the corresponding wheel and
the lubricated wheel to the corresponding tire.

12. The method of claim 11, wherein the transitioning step includes:
inserting a whipping device into a storage container containing the lubricant that is in the semi-solid state;
controlling the whipping device to whip or blend the lubricant from the semi-solid state to the whipped state; and
pumping out a portion of the lubricant in the whipped state from the storage container using a pump, the pump inserted into the storage container and in fluid communication with the lubricant.

13. The method of claim 11, wherein the lubricating step includes
providing a processing station including at least one of:
a tire lubricating sub-station and
a wheel lubricating sub-station.

14. The method of claim 13, further comprising, prior to providing the lubricant to the processing station, providing the pumped out portion of the lubricant in the whipped state to a lubricant reservoir, the lubricant reservoir operable to:
increase the temperature of the lubricant from a first temperature to a second temperature greater than the first temperature using a lubricant temperature modifier disposed within the lubricant reservoir; and
provide the lubricant to the processing station.

15. The method of claim 14, wherein pumping out the portion of the lubricant in the whipped state comprises:
pumping out the portion of the lubricant in the whipped state from the storage container to the lubricant reservoir when the lubricant is at the first temperature.

16. The method of claim 14, wherein the lubricant reservoir defines a smaller volume than a volume defined by the storage container.

17. The method of claim 11, wherein the whipping device comprises:
an impeller attached to a first end of a shaft inserted into the storage container in contact with the lubricant; and
a motor attached to the second end of the shaft, the motor driving the impeller to cause whipping or blending of the lubricant.

18. The method of claim 11, wherein pumping out the portion of the lubricant in the whipped state comprises
translating a circumferential disc associated with the pump and inserted into the storage container on top of the lubricant in the whipped state, the translating circumferential disc causing the portion of the lubricant in the whipped state to flow out of the storage container via a lubricant supply conduit.

19. The method of claim 11, wherein joining one of: the lubricated tire to the corresponding wheel or the lubricated wheel to the corresponding tire includes:
utilizing a mounting sub-station for mounting:
the lubricated tire to the corresponding wheel or the lubricated wheel to the corresponding tire for forming a non-inflated tire-wheel assembly.

20. The method of claim 19, wherein the method further includes:

utilizing an inflation sub-station for inflating the non-inflated tire-wheel assembly to define an inflated tire-wheel assembly.

21. The method of claim 20, wherein the method further includes:
utilizing a seating sub-station for seating beads of the lubricated tire or corresponding tire adjacent bead seats of, respectively, the corresponding wheel or the lubricated wheel.

* * * * *